United States Patent
Zamierowski et al.

(10) Patent No.: US 9,892,659 B2
(45) Date of Patent: *Feb. 13, 2018

(54) MEDICAL DEVICE AND PROCEDURE SIMULATION AND TRAINING

(71) Applicant: Johnson County Community College Foundation, Inc., Overland Park, KS (US)

(72) Inventors: David S. Zamierowski, Overland Park, KS (US); Kathy A. Carver, Overland Park, KS (US); Lawrence E. Guerra, Mission, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/418,607

(22) Filed: Jan. 27, 2017

(65) Prior Publication Data

US 2017/0140673 A1    May 18, 2017

Related U.S. Application Data

(63) Continuation-in-part of application No. 14/607,013, filed on Jan. 27, 2015, which is a continuation-in-part
(Continued)

(51) Int. Cl.
 *G09B 23/26* (2006.01)
 *G09B 23/30* (2006.01)
 *G09B 23/24* (2006.01)

(52) U.S. Cl.
 CPC ............ *G09B 23/303* (2013.01); *G09B 23/24* (2013.01); *G09B 23/30* (2013.01)

(58) Field of Classification Search
 CPC .... G09B 23/303; G09B 23/30; G09B 23/288; G09B 5/06; G09B 23/285
 See application file for complete search history.

(56) References Cited

U.S. PATENT DOCUMENTS 2,582,234 A    1/1952  Conzelman
2,656,545 A *  10/1953 Conzelman, Jr. ....... A61F 2/586
                                                    623/57
(Continued)

FOREIGN PATENT DOCUMENTS

WO    2005122105    12/2005

OTHER PUBLICATIONS

"International Search Report and Written Opinion", PCT/US2015/013147, dated May 7, 2015, pp. 1-8.
(Continued)

*Primary Examiner* — Robert J Utama
*Assistant Examiner* — Lily M Del Valle
(74) *Attorney, Agent, or Firm* — Law Office of Mark Brown, LLC; Mark E. Brown

(57) ABSTRACT

A healthcare simulation system including a mannequin with active physiological characteristics, a display monitor adapted for displaying physiological parameters, and a computer for controlling the mannequin and the monitor. A healthcare simulation method including the steps of programming the computer with healthcare scenarios, operating active characteristics of the mannequin, and dynamically displaying physiological parameters corresponding to patient vital signs. Alternative aspects of the invention include tools, such as computers and other equipment, for obtaining and displaying information and for interconnecting and interfacing participants, subjects and controllers in training systems and methods. Additional aspects of the invention include systems and methods for glucometer simulation and training. An embodiment includes a simulated finger configured for holding simulated blood serum and for puncture with a lancet. The simulated finger is configured for sliding over a standardized patient or man-
(Continued)

nequin's finger. Alternative embodiments include simulated lifelike replicas of other body parts.

15 Claims, 64 Drawing Sheets

Related U.S. Application Data of application No. 14/594,126, filed on Jan. 10, 2015, which is a continuation-in-part of application No. 14/165,485, filed on Jan. 27, 2014, which is a continuation-in-part of application No. 13/597,187, filed on Aug. 28, 2012, now Pat. No. 9,280,916, which is a continuation-in-part of application No. 11/751,407, filed on May 21, 2007, now Pat. No. 8,251,703.

(56) References Cited

U.S. PATENT DOCUMENTS

| | | | |
|---|---|---|---|
| 2,689,415 A * | 9/1954 | Haver | G09B 23/285 434/272 |
| 4,072,856 A | 2/1978 | Eligehausen | |
| D293,379 S * | 12/1987 | Link | D24/190 |
| 4,726,772 A | 2/1988 | Amplatz | |
| 4,889,117 A | 12/1989 | Stevens | |
| 5,053,341 A | 10/1991 | Companion | |
| 5,099,424 A | 3/1992 | Schneiderman | |
| 5,344,611 A | 9/1994 | Vogler et al. | |
| 5,385,474 A | 1/1995 | Brindle | |
| 5,391,081 A | 2/1995 | Lampotang et al. | |
| 5,584,701 A | 12/1996 | Lampotang et al. | |
| 5,604,200 A | 2/1997 | Taylor-Mccord | |
| 5,605,837 A * | 2/1997 | Karimi | G01N 33/96 252/408.1 |
| 5,769,640 A | 6/1998 | Jacobus et al. | |
| 5,800,466 A | 9/1998 | Routh et al. | |
| 5,842,987 A | 12/1998 | Sahaderan | |
| 5,853,292 A | 12/1998 | Eggert et al. | |
| 6,074,213 A | 6/2000 | Hon | |
| 6,113,395 A | 9/2000 | Hon | |
| 6,126,450 A | 10/2000 | Mukai et al. | |
| 6,193,519 B1 | 2/2001 | Eggert et al. | |
| 6,236,878 B1 | 5/2001 | Taylor | |
| 6,283,763 B1 | 9/2001 | Matsuzaki et al. | |
| 6,351,671 B1 | 2/2002 | Myklebust et al. | |
| 6,517,354 B1 | 2/2003 | Levy | |
| 6,654,000 B2 | 11/2003 | Rosenberg | |
| 6,739,877 B2 | 5/2004 | Bailey et al. | |
| 6,773,263 B2 | 8/2004 | Nicholls | |
| 6,918,771 B2 | 7/2005 | Arington et al. | |
| 6,929,481 B1 | 8/2005 | Alexander et al. | |
| 7,119,810 B2 | 10/2006 | Sumanaweera et al. | |
| 7,156,664 B2 | 1/2007 | Wallaker | |
| 8,251,703 B2 | 8/2012 | Zamierowski et al. | |
| 8,548,778 B1 | 10/2013 | Hart et al. | |
| 8,944,825 B2 | 2/2015 | Reid-Searl et al. | |
| 2003/0216625 A1 | 11/2003 | Phipps | |
| 2004/0161732 A1 | 8/2004 | Stump | |
| 2006/0269906 A1 | 11/2006 | White | |
| 2007/0111174 A1 | 5/2007 | Kozmenko et al. | |
| 2007/0122785 A1 | 5/2007 | Eggert | |
| 2008/0059133 A1 * | 3/2008 | Edwards | G06Q 10/00 703/7 |
| 2009/0098522 A1 | 4/2009 | Marcovitz | |
| 2009/0187351 A1 | 7/2009 | Orr et al. | |
| 2009/0263775 A1 | 10/2009 | Ullrich | |
| 2009/0291421 A1 | 11/2009 | Duprez et al. | |
| 2012/0197619 A1 | 8/2012 | Yelin et al. | |
| 2013/0052626 A1 | 2/2013 | Hoskins | |
| 2014/0065589 A1 | 3/2014 | Zamierowski et al. | |

OTHER PUBLICATIONS

"www.mountguys.com", Golf Cart Holder Mount for Apple iPad.
B-Line Medical, "Production Information", B-Line Medical Production Information, Website www.blinemedical.com, Copyright 2005 B-Line Medical, LLC.
Datascope, Datascope Corp. Website, www.datascope.com, patient monitoring products, Copyright 2006 Datascope Corp.
Gaumard, "The Total Mobile Solution . . . for a new standard in simulation", Gaumard Simulators for Health Care Education Product Catalog, 2007, pp. 1-116.
Nasco, "Nasco Healthcare Educational Materials", Nasco 2007-2008 Catalog, 2007, pp. 1-164.

* cited by examiner

PARTICIPANT (e.g., STUDENT)
- Direct Contact
- Monitor
- Indicator
- Analyzer
- Physical Inputs
- Physical Outputs
- Equipment
- Remote
- Virtual I/O
- Progress Records
- Testing/Certification SUBJECT (e.g., PATIENT)
- Direct Contact
- Monitor
- Indicator
- Live Actor, Script
- High-Fidelity Mannequin
- Low-Fidelity Mannequin
- Avatar
- Hologram
- Virtual Patient CONTROLLER (e.g., INSTRUCTOR)
- Direct Contact
- Indicator
- Monitor
- Physical Inputs
- Physical Outputs
- "Smart" Equipment
- Remote
- Virtual I/O
- Progress Records
- Testing/Certification TOOLS / COMPUTER
- Direct Contact
- Network (LAN)
- Internet (Cloud-Based)
- Automated Response
- Inputs
- Outputs
- Preprogrammed Scenarios
- Memory
- Monitor
- Indicator
- Equipment
- Devices
- Instruments
- Analyzers
- Physical Inputs
- Physical Outputs
- Remote
- Virtual I/O
- Progress Records
- Testing/Certification
- Curriculum

*FIG. 16*

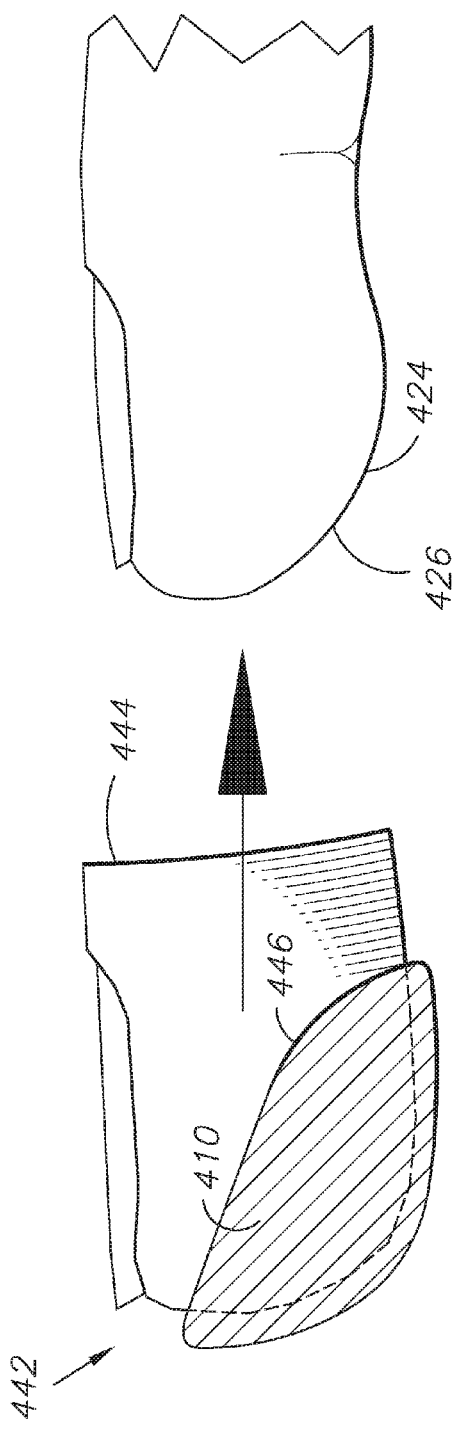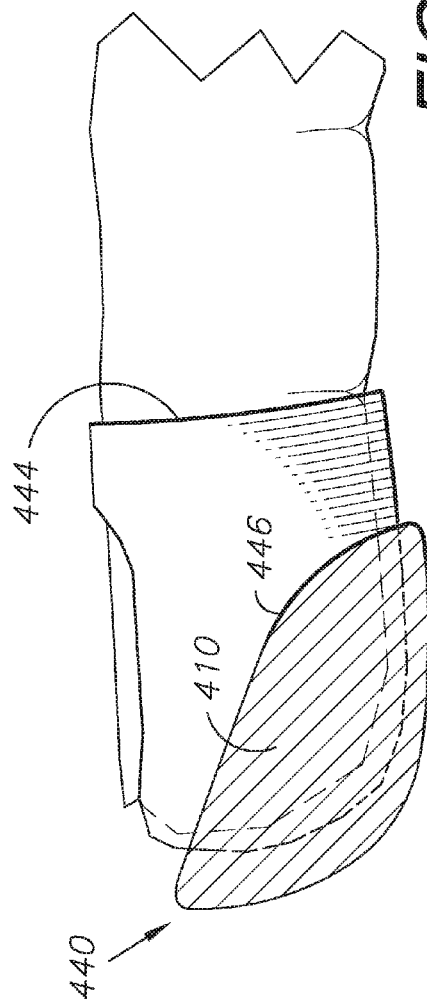

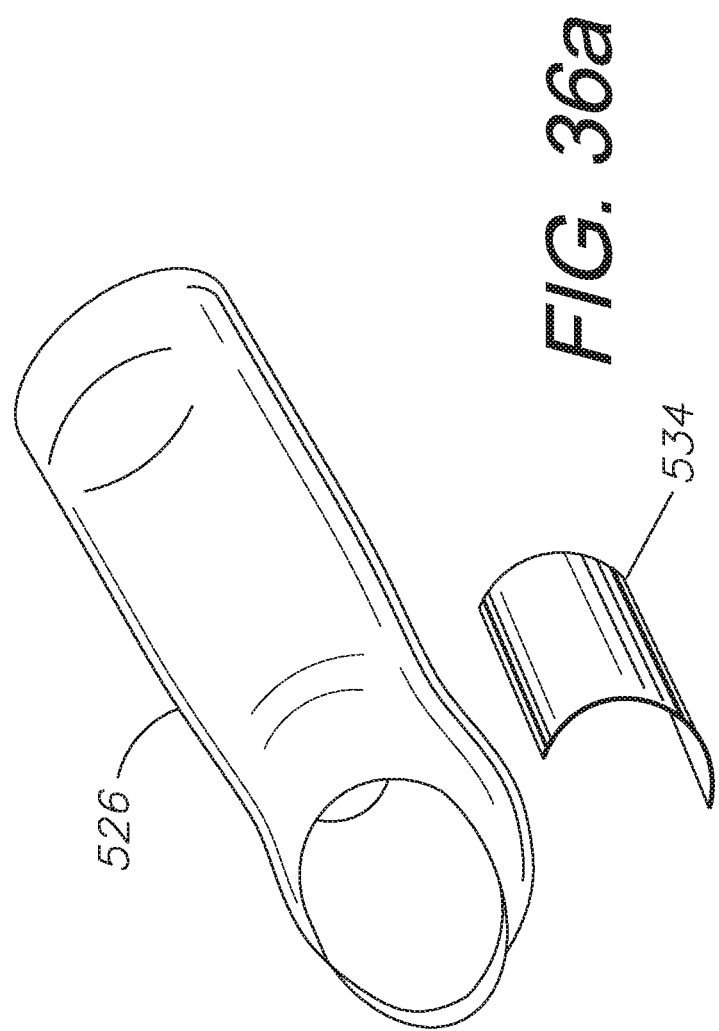

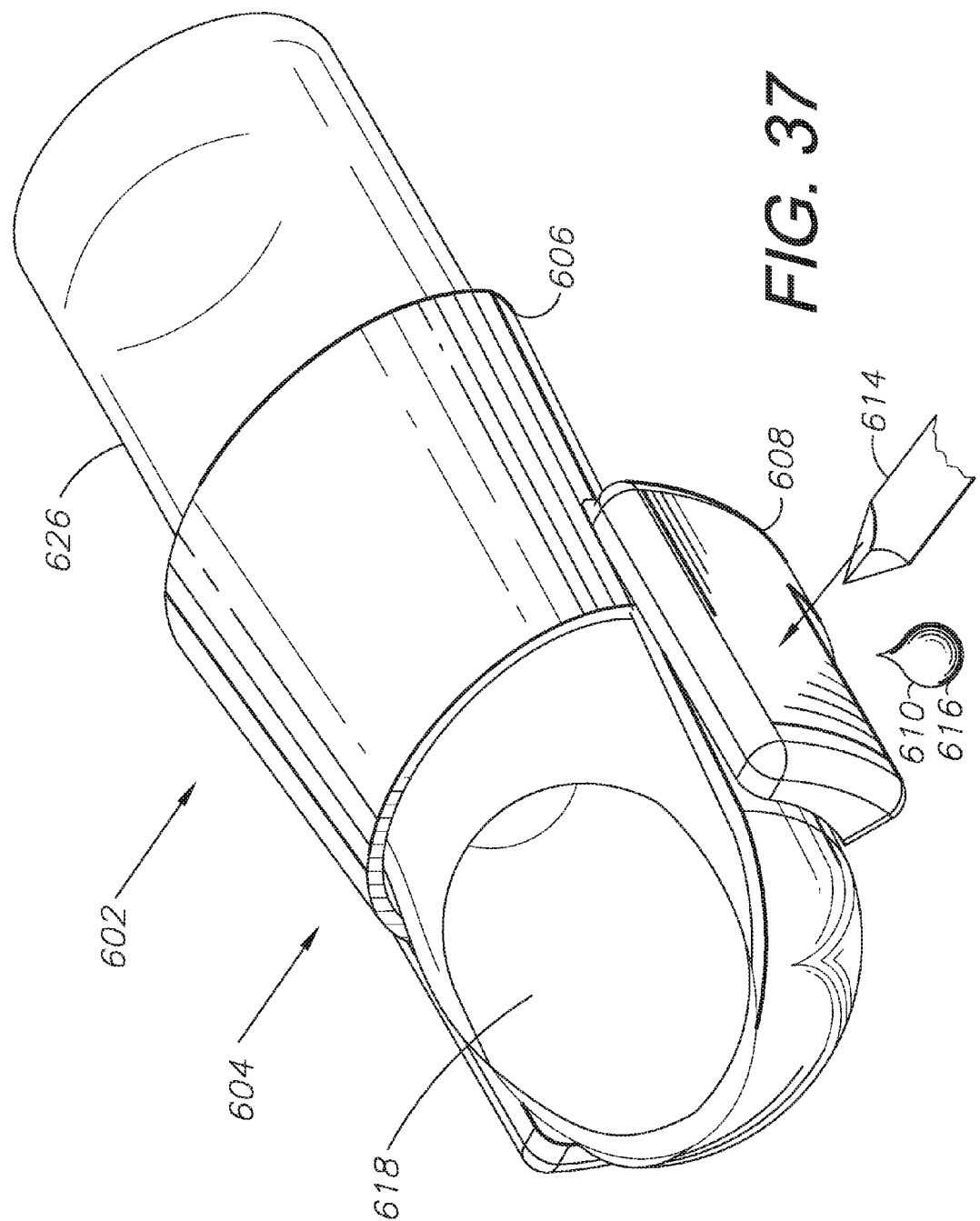

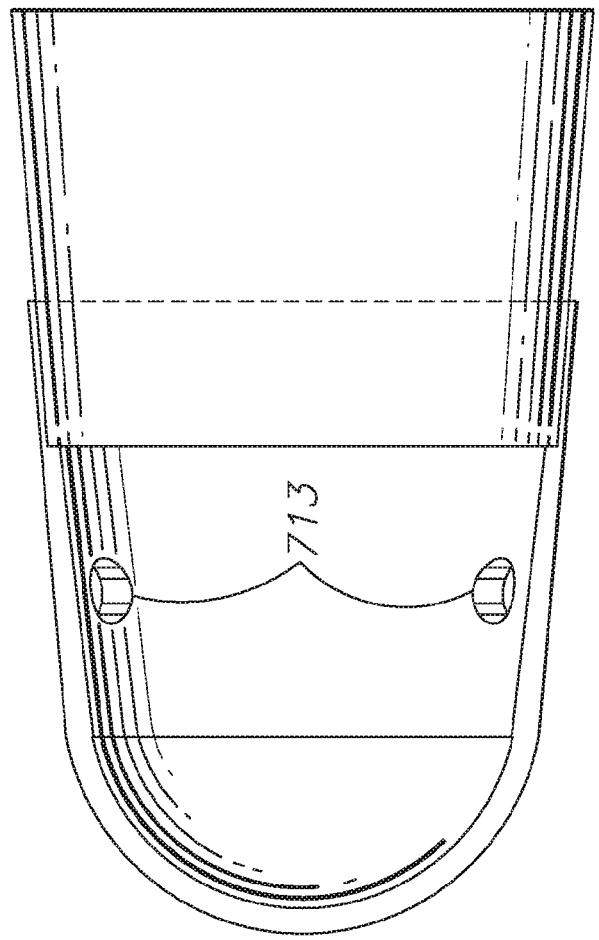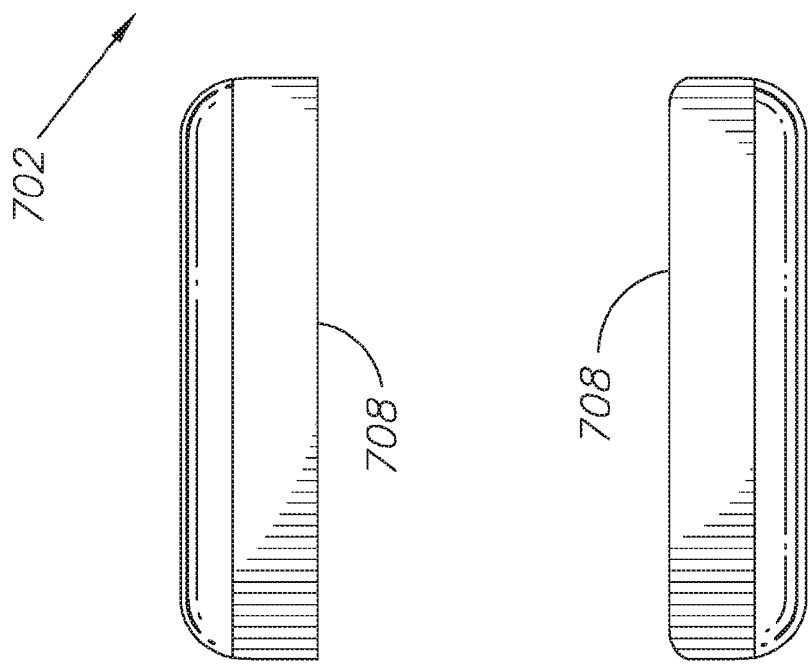
FIG. 51

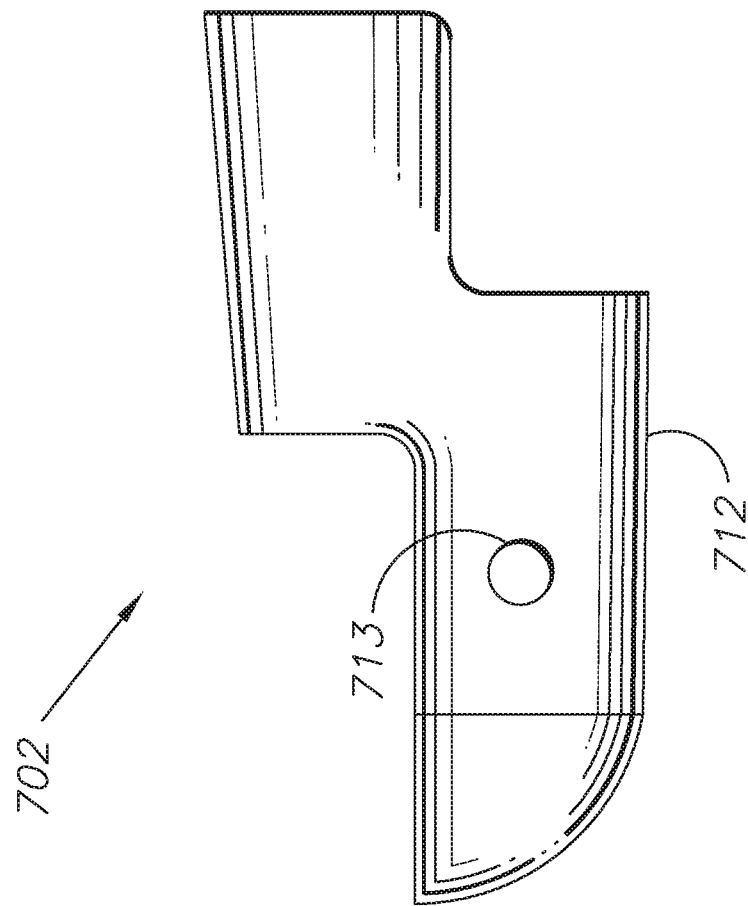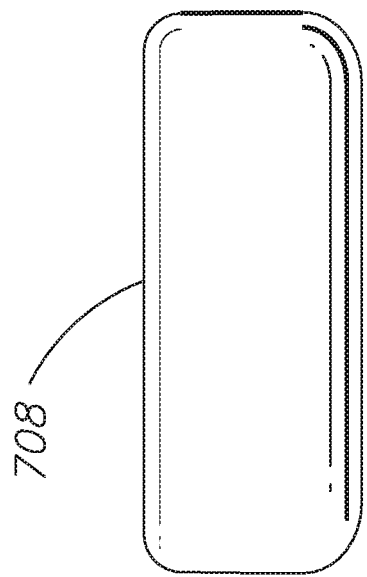
FIG. 52

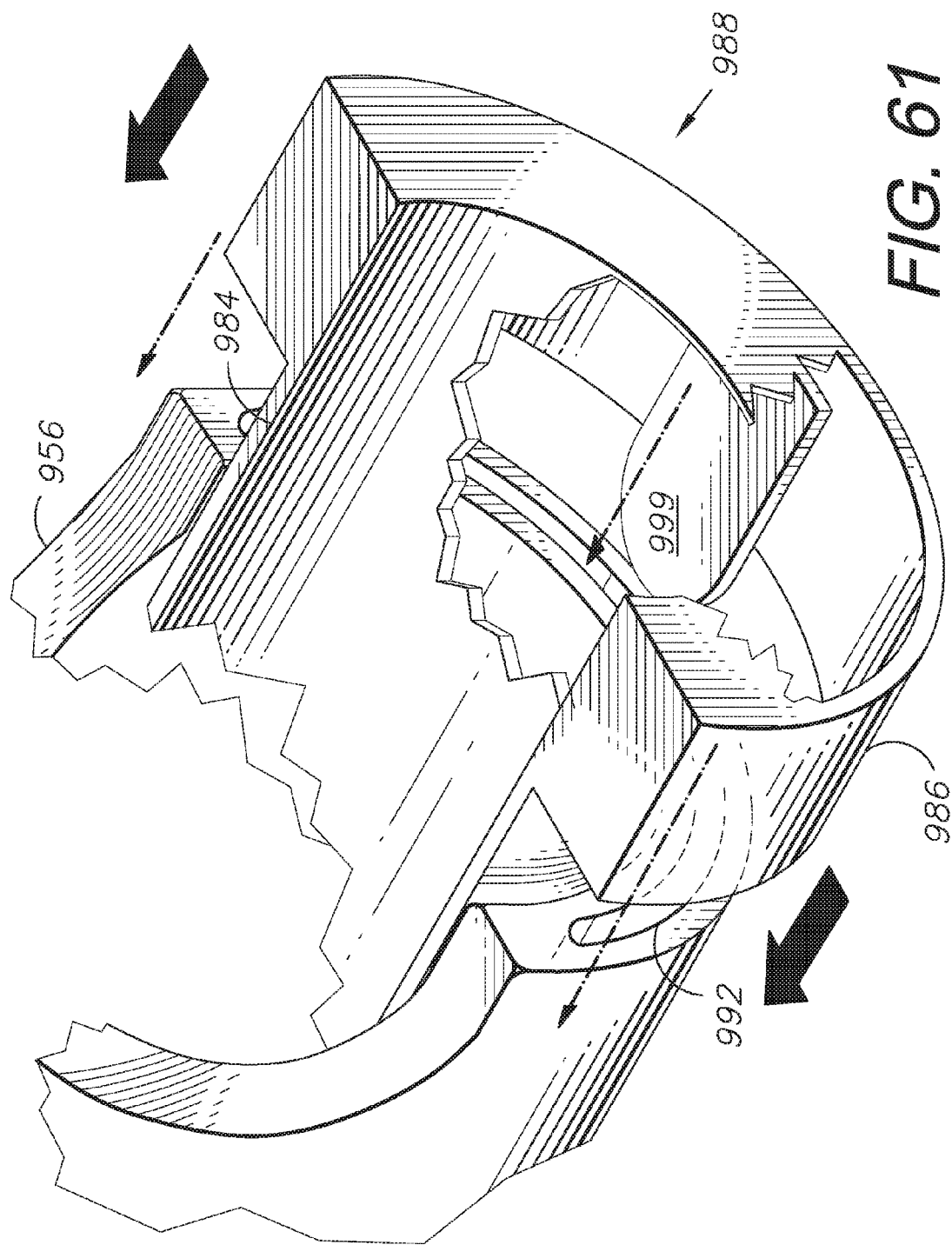

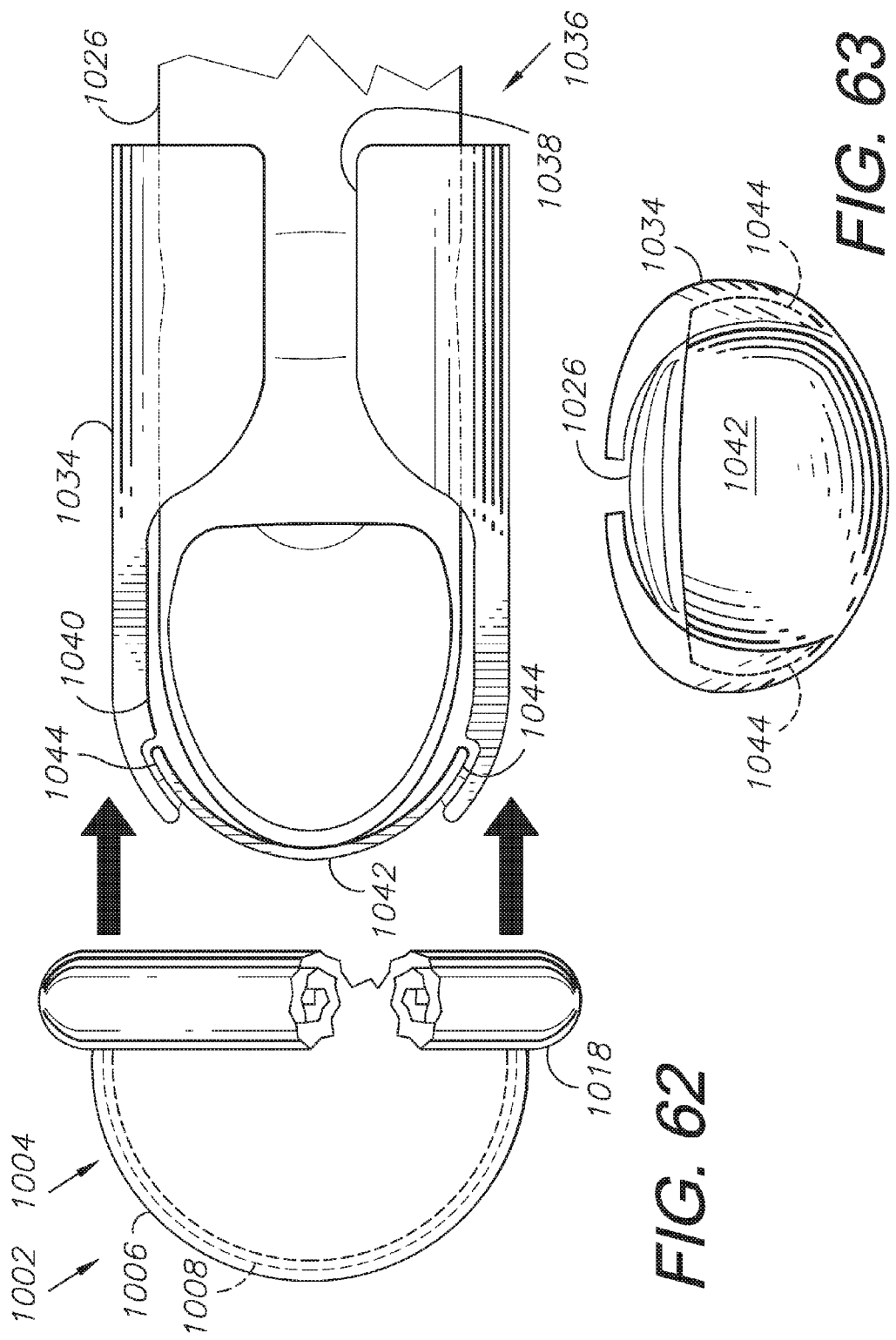

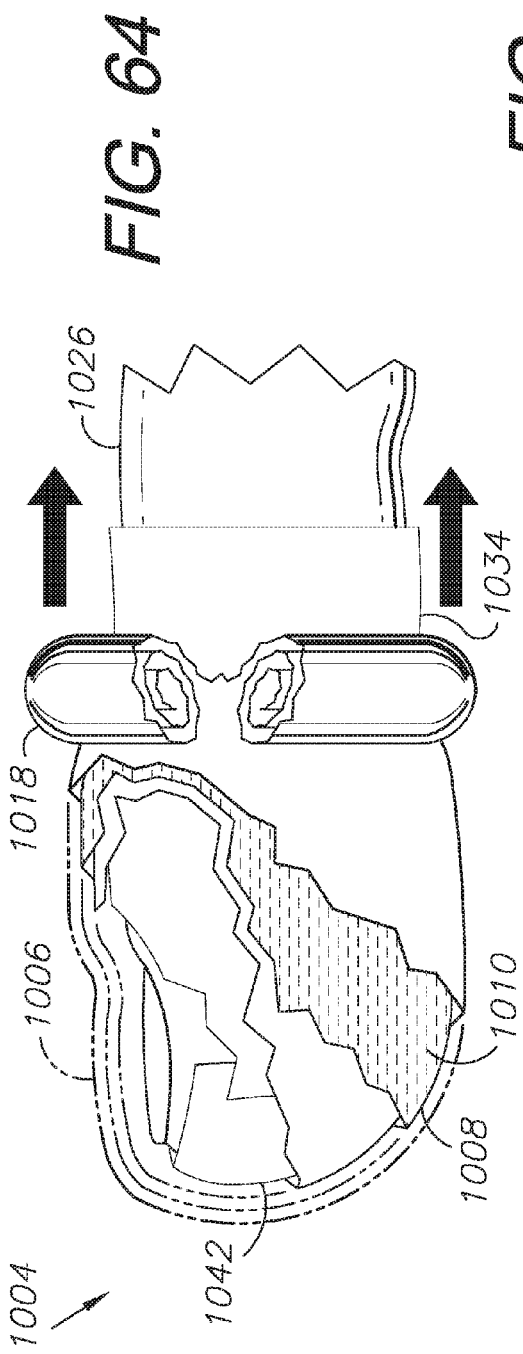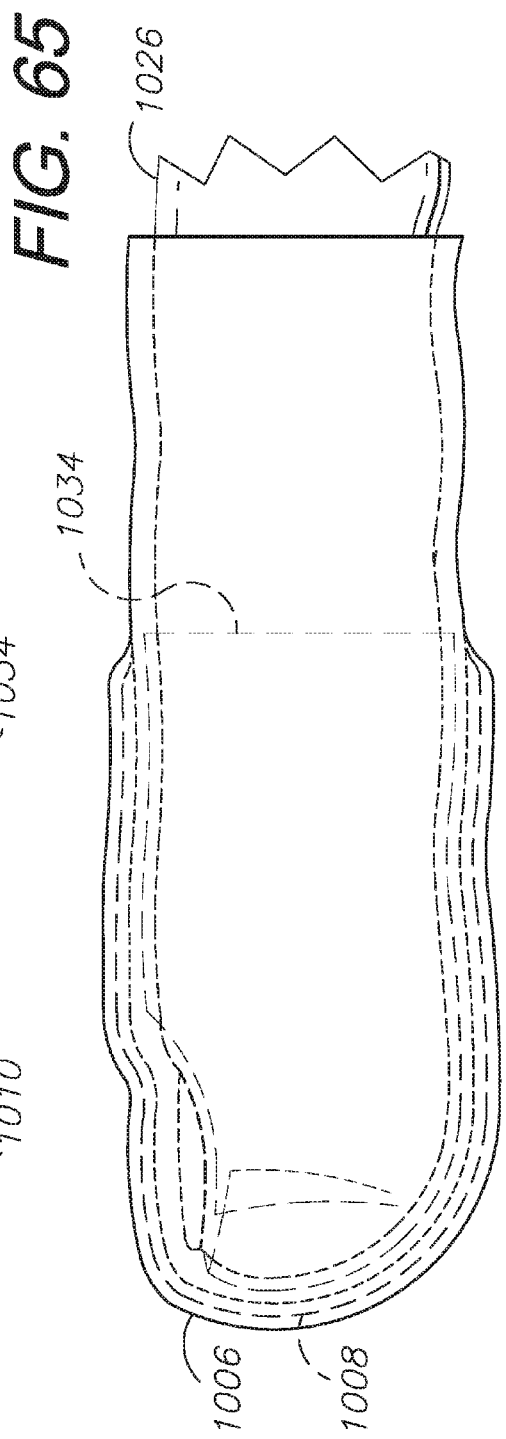

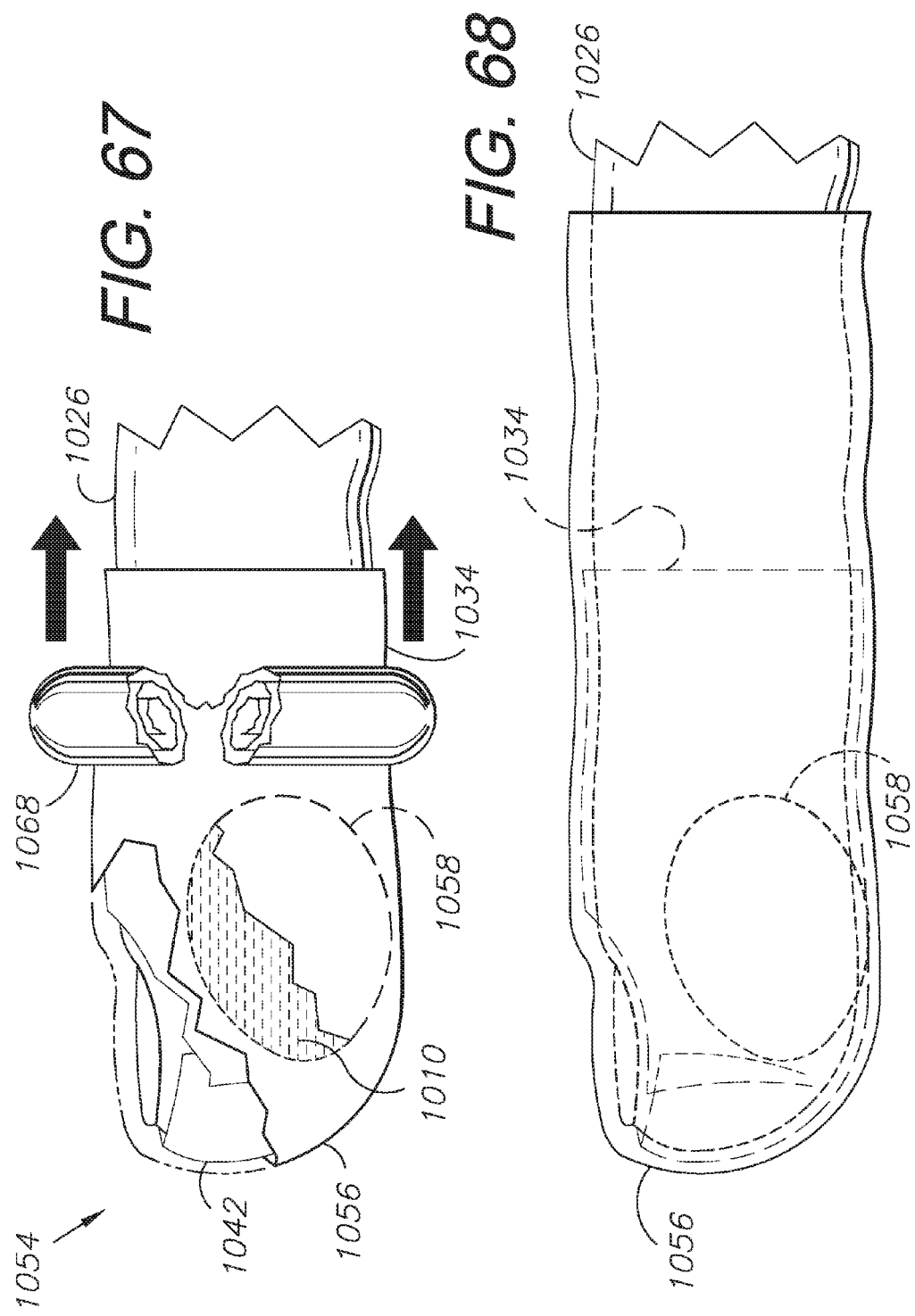

MEDICAL DEVICE AND PROCEDURE SIMULATION AND TRAINING

CROSS-REFERENCE TO RELATED APPLICATIONS

This application is a continuation-in-part of and claims priority in U.S. patent application Ser. No. 14/607,013, filed Jan. 27, 2015, which is a continuation-in-part of U.S. patent application Ser. No. 14/594,126, filed Jan. 10, 2015, which is a continuation-in-part of U.S. patent application Ser. No. 14/165,485, filed Jan. 27, 2014, which is a continuation-in-part of U.S. patent application Ser. No. 13/597,187, filed Aug. 28, 2012, now U.S. Pat. No. 9,280,916, issued Mar. 8, 2016, which is a continuation-in-part of U.S. patent application Ser. No. 11/751,407, filed May 21, 2007, now U.S. Pat. No. 8,251,703, issued Aug. 28, 2012. The contents of all of the aforementioned applications are incorporated by reference herein in their entireties.

BACKGROUND OF THE INVENTION

1. Field of the Invention

The present invention relates to healthcare simulation, and in particular to a portable, dedicated display device, such as a touch-screen monitor, for displaying simulated, noninvasively-obtained vital signs from a healthcare instructional scenario programmed into a computer for conducting the scenario and controlling the monitor display and the simulated physiological functions of a mannequin or other patient model corresponding to the displayed vital signs. The present invention also relates to medical devices and procedures, and more particularly to medical device and procedure simulation and training systems and methods.

2. Description of the Related Art

The field of patient monitoring with electronic display devices, such as bedside monitors, is well-developed and standard for critical (intensive) care units (ICUs) at many institutions and for many surgical procedures. Patient rooms in critical care units and operating rooms (ORs) at many institutions are equipped with monitors, which receive inputs from electrodes and other input instruments connected invasively and noninvasively to patients. The monitors commonly provide displays corresponding to patient data, such as blood pressure, pulse rate, temperature, electrocardiographic heart rhythm strips, central venous pressure, pulmonary artery pressure, cardiac output, intracranial pressure, pulmonary pressure and other signals from catheters and transducers. Ventilator pressure can be utilized in connection with ventilator monitoring. Gas content analyzers can directly display gas partial pressures for anesthesiology and measured and calculated ventilator pressures for pulmonary functions.

Patient physiological instrumentation and monitoring equipment can provide output in a wide variety of formats corresponding to instantaneous (real-time) and historical patient data and vital signs. Analog (e.g., continuous waveform) and digital readout displays and graphical user interfaces (GUIs) are utilized in existing equipment. Physiological variables can be sampled at predetermined intervals for tracking and displaying trends whereby healthcare practitioners can identify and appropriately respond to improving and deteriorating patient conditions.

Computer systems are currently used in the field of patient simulation for healthcare training and education. Mannequins (or manikins) are currently used for training exercises in which they are programmed to automatically model various lifelike symptoms and physiological responses to trainees' treatments, such as normal and abnormal cardiac and respiratory physiology and functions. They can be programmed with various scenarios for instructional simulation of corresponding physiological conditions and specific healthcare problems. For example, Medical Education Technology, Inc. (METI) of Sarasota, Fla.; Gaumard Scientific Company of Miami, Fla.; and Laerdal Medical Corporation (U.S.) of Wappingers Falls, N.Y. all provide patient simulator mannequins, which are adapted for simulating cardio-pulmonary performance with simulated electrocardiogram (EKG) outputs. Such simulation systems enable students to train and learn in settings that closely resemble actual clinical settings and enable practicing on inanimate mannequins. Training under conditions which closely approximate actual clinical patient scenarios will improve patient care and outcomes. Students will have increased levels of skill and competency prior to providing care to actual patients by training under conditions which closely approximate actual clinical patient scenarios. Such automated simulation systems have been successfully utilized in training for specialized procedures and settings, such as cardio-pulmonary, intensive care, anesthesiology, pilot training in flight simulation, etc.

More basic mannequins have been employed for instructing students on a wide range of procedures and treatment scenarios, and provide an alternative to instruction on "live" patients or "standard" patients (e.g., actors, other students and instructors). Thus, the patient models adaptable for use with the present invention range from such "live" patients acting roles to abstract, virtual patients, including avatars and holograms.

The use of glucometers measuring blood sugar (glucose) levels from blood samples has increased dramatically as the incidence and prevalence of diabetes has increased. Because of this trend, the need for a simulation model for a glucometer for teaching at all levels of care for diabetic patients has increased correspondingly. Simulation of testing blood sugar levels with a glucometer can be extremely valuable for training medical practitioners as well as for training diabetic patients to use a glucometer at home.

As the sophistication of simulation scenarios for healthcare teaching has increased in realism and fidelity, the perceived need to train in conditions closely simulating actual medical situations has become more generally recognized. The importance of and the need for these types of portable simulation adjuncts and auxiliaries has become more critical. For example, glucometers represent an example of a medical diagnostic instrument used routinely worldwide for the benefit of large numbers of patients. Diabetic patients tend to use glucometers frequently and regularly. They are also used for monitoring, diagnosing and facilitating the treatment of other blood-glucose level related conditions. Many glucometer users lack formal medical education and would benefit from practical, hands-on training. Anatomically and physiologically accurate simulation of pricking a finger, obtaining a blood droplet, and testing with a glucometer would be extremely valuable medical training.

Effective medical training in the use of glucometers and other devices could improve the overall quality of healthcare universally. The training systems and methods of the present invention are adapted for effective training in scenarios closely mimicking actual patient conditions and physiological responses. Such training scenarios can be reliably replicated for universally consistent training and for standardizing the medical training experiences of students and practitioners. For example, new procedures and treatment techniques can be quickly and easily distributed to all users of the present invention. Such distribution and appropriate software upgrades could occur wirelessly over the Internet "in the cloud." Training and testing results could also be efficiently distributed using the Internet. Student evaluations and training certifications can be handled remotely and efficiently via high-speed Internet connections and cloud-based computing, including data storage and transfer.

Medical device simulation can also benefit from current modeling technology, including 3-D printing. Equipment, medical device components and patient interfaces can be accurately and efficiently created and replicated using such technology. Customizable devices and patient-specific interfaces can be produced in 3-D model form for simulation and training. For example, patient-specific templates can be used by appropriate computer technology for producing customized medical devices. Patient fittings and adjustments can thus be handled efficiently and accurately. Equipment components can also be modeled for familiarizing students with their general configurations and operational characteristics.

SUMMARY OF THE INVENTION

In the practice of an aspect of the present invention, a portable healthcare simulation system and method are provided that utilize a mannequin, from a passive doll to a high-fidelity simulator for displaying certain physiological characteristics obtained noninvasively. A display device comprising a monitor displays vital signs in continuous (real-time) or digital time line modes of operation. The system is controlled by a computer, which can be programmed with various scenarios including outputs responding to various treatment procedures and mannequin control signals. Alternative aspects of the invention include a finger cot or finger splint for providing simulated blood serum and a wide variety of tools for interconnecting participants, components and information, all for use in connection with the present invention.

In the practice of other aspects of the present invention, a medical device simulation and training system includes a computer programmed with medical scenarios, including the inputs and outputs corresponding to a variety of patient conditions. Time-varying parameters can correspond to patient condition improvement and deterioration. Moreover, changes in patient conditions can be time-compressed, time-expanded and paused for training purposes. For example, students can observe immediate patient responses to various treatments, which might develop over hours or days in real-time. Instructors can pause exercises and training procedures as needed to emphasize certain patient physiological condition trends and revise treatments as necessary to affect and determine outcomes.

In the practice of alternative aspects of the present invention, a computer simulation can be implemented via a mannequin or a live subject, such as a volunteer. "Standard Patient" ("SP") physiological parameters and conditions can be preprogrammed. Student interface can be accomplished via devices for conveying simulated patient conditions. Actual diagnostic and monitoring devices can be employed for realism. For example, a stethoscope can be modified with speakers for simulating the audible indicators of physiological parameters, including cardio, pulmonary, gastro-intestinal ("GI"), etc.

Controllers, e.g., instructors, can remotely manipulate the training exercises via touch-screen inputs and other control devices. Patient models can be projected on screen for activating touch-screen selection of particular patient conditions. Intensity, timing and other variables can likewise be instructor-controlled.

In other aspects of the present invention, simulated substances, such as blood serum, can be extracted for analysis with actual devices, such as glucometers. The aspects and embodiments discussed below can accommodate punctures by lancets with corresponding extraction of simulated blood serum. In an embodiment of the invention, a finger splint is utilized with a blood serum-filled bleb on each of the right and left sides of the finger splint for simulation of testing blood-glucose levels without actually puncturing a mannequin or subject's finger. Student participants can thus experience the procedures in nearly real-time conditions. The timing of such condition changes can simulate patient conditions and provider inputs.

However, heretofore there has not been available an automated, portable simulation system and method utilizing a passive or semi-active mannequin with a dedicated monitor and a computer for conducting scenarios with concurrent (real-time) or time-delay display of basic vital sign physiological information, which can be obtained noninvasively, with the advantages and features of the present invention, nor has there been available a glucometer simulation and training system and method with the advantages and features of the present invention.

BRIEF DESCRIPTION OF THE DRAWINGS

FIG. 16 is a block diagram of multiple applications, equipment, participants and configurations of various aspects of the present invention.

FIGS. 19-27 show additional alternative embodiments of the present invention with finger cots, puncture-resistant shields and serum-filled blebs for glucometer training simulations embodying additional alternative aspects of the present invention.

FIG. 36a shows a perspective view of a protective shield for clipping over a finger under the interface.

FIGS. 37-43 show another modified embodiment of a blood serum interface including a finger splint mounting two fluid-holding blebs and a common fillable reservoir for training with a fluid analyzer.

FIGS. 50-52 show another modified embodiment of a blood serum interface.

FIG. 61 shows a partially-exploded, proximal, perspective view of a blood serum interface including a simulated finger and a protective shield, sealing cap, and sealing wedge combination.

FIG. 62 shows a dorsal, plan view of an embodiment of a blood serum interface embodying the present invention, including a protective shield and a penetrable cover.

FIG. 63 shows a distal, elevational view of the protective shield of the blood serum interface.

FIG. 64 shows a side, exploded, elevational view of an embodiment of the blood serum interface including a protective shield and a penetrable cover.

FIG. 65 shows a side, elevational view of the fully-assembled blood serum interface.

FIG. 67 shows a side, exploded, elevational view of the blood serum interface including a protective shield and a penetrable cover including fluid receptacles.

FIG. 68 is a side, elevational view of the fully-assembled blood serum interface.

DETAILED DESCRIPTION OF THE PREFERRED EMBODIMENTS

Figure 1:
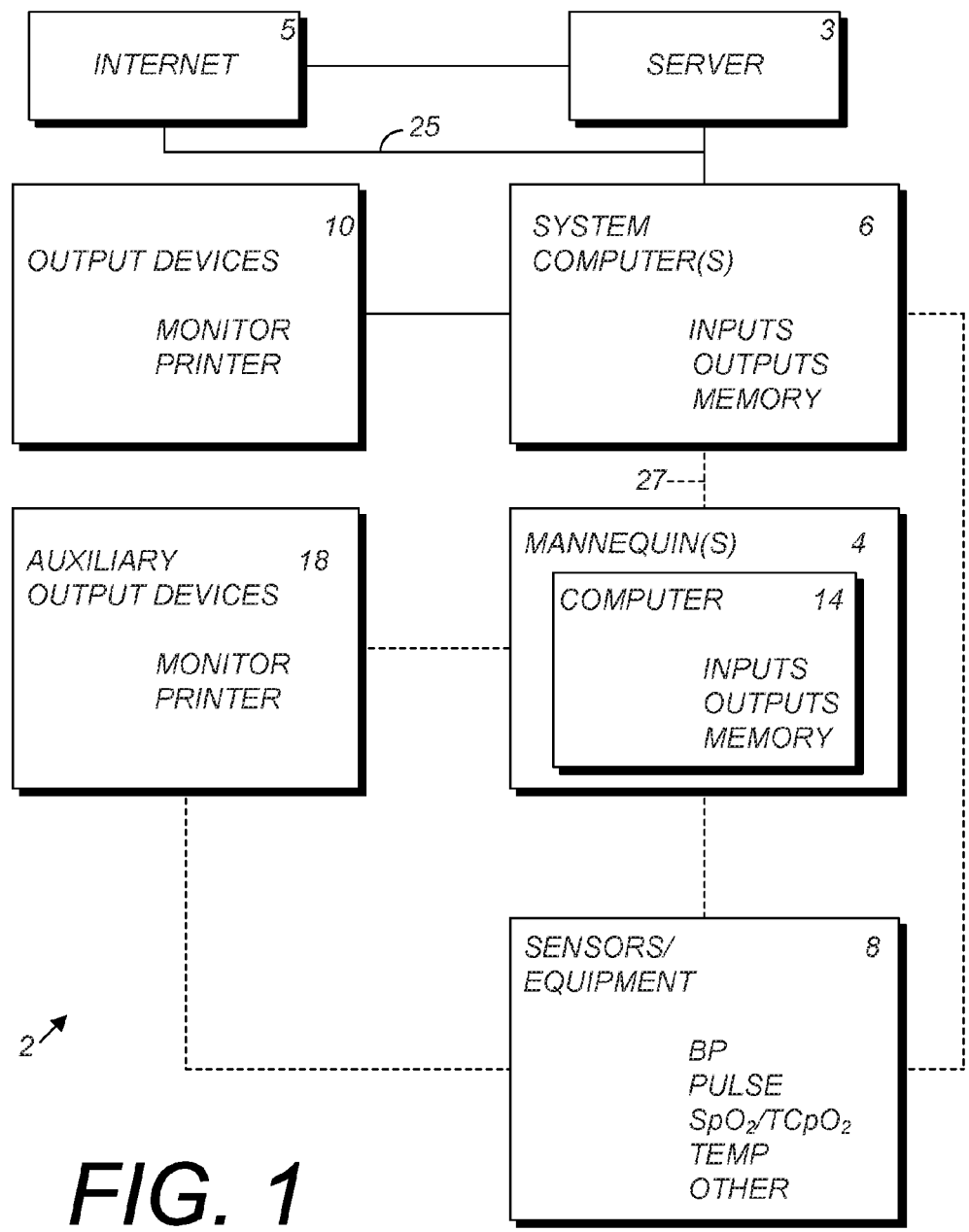
FIG. 1 is a block diagram of a healthcare training system embodying a first aspect of the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Said terminology will include the words specifically mentioned, derivatives thereof and words of similar meaning.

Referring to the drawings in more detail, the reference numeral 2 generally designates a portable healthcare simulator system embodying aspects of the present invention. Without limitation on the generality of useful applications of the system 2, it is particularly adapted for training healthcare practitioners in assessing and treating various patient conditions under replicated clinical conditions using programmed "scenarios" with a human-like patient simulator or mannequin 4 exhibiting vital signs and life-like physiological responses in an educational environment. The scenarios can be programmed into a system computer 6, which controls the mannequin 4 and provides output to system output devices 10.

The system 2 can be configured with various components and can operate standalone or be connected to other systems, e.g., via a server 3 connected to the Internet (worldwide web) 5 whereby multiple mannequins 4 can be linked and controlled in multiple institutions, which can be widely geographically distributed. The term "computer" is broadly used to encompass logic automated control devices, including microprocessors, personal computers, mainframes, etc. The computers disclosed herein typically include such components as memory, inputs and outputs for connection to various peripheral devices, such as the output devices 10, which can include monitors, printers, telecommunications, data storage, etc. The system computer 6 accepts inputs from various sources, including the mannequin 4 and various input devices, such as keyboards. Moreover, the scenarios and their corresponding patient condition sets can be programmed into the system computer 6 or downloaded to its memory via suitable media, such as CDs or DVDs, or via an Internet (worldwide web) connection.

One or more of the components of the system 2 can be portable for accommodating training needs in various locations, e.g. different rooms in particular facilities and in multiple facilities. Interconnections can be hardwired or wireless using various interconnectivity technologies, as appropriate.

The mannequin 4 can be provided with its own computer 14, which can be programmed to provide various, life-like physiological functions and corresponding outputs in response to corresponding inputs. For example, pulmonary and cardiac functions such as breathing and pulse can be programmed to vary as appropriate for various patient physiological "conditions." Other physiological functions, such as eye movement, can also be provided. Still further, the mannequin 4 can be interactive and can include an audio output source for speaking monologue patient comments and complaints concerning various symptoms. Such mannequins are capable of providing simulated EKG (electrocardiogram) output through lead attachment points to a suitable, external cardiac monitor. In addition to the EKG output, other "patient" physiological information comprising part of the outputs of the mannequin 4 can preferably be obtained noninvasively using sensors and equipment 8 for such physiological condition parameters as blood pressure, pulse, SpO2, TCpO2, temperature and others. Alternatively, such simulated patient physiological information can be generated and output to the output devices 10, 18 by the system computer 6, and in a training scenario would be virtually indistinguishable from comparable equivalent outputs from the mannequin 4 and its computer 14.

The mannequin 4 can also include a calibrated fluid pressure control pump mechanism capable of delivering fluid pressure corresponding to the patient blood pressures for the programmed scenarios. Various other physiological functions can be simulated with the mannequin 4 and incorporated in the scenarios. The mannequin computer 14 can control its various functionalities, e.g. in a standalone mode of operation or in conjunction with the system computer 6. Multiple mannequins 4 can be provided and their computers 14 networked to the system computer 6, which can function as a server in this system architecture. As noted above, the system computer 6 can be networked with other computers, including a server 3, and ultimately networked to the Internet 5. Components of the system 2 can be linked in an appropriate network, i.e. LAN or WAN, whereby scenarios can be shared among students, including remotely for virtual classroom types of applications.

The system output devices 10 can include a monitor connected to the computer 6. The term "monitor" is used in the broad sense to include various types of displays and GUIs appropriate for the particular applications of the system 2. Auxiliary output devices 18 can be hardwired (hardwired connections indicated at 25) or wirelessly connected (wireless connections indicated at 27) to the mannequin 4 or to the computer 6 directly as a supplement to or in place of the system computer output devices 10. For example, the auxiliary output devices 18 can display, print, record, transmit, etc. the simulated outputs of the sensors and equipment 8 corresponding to simulated physiological variables associated with the mannequin 4, which can include its own computer 14, or be completely passive. The sensors and equipment 8 can be hardwired or wirelessly connected to the auxiliary output devices 18, the mannequin computer 14 and/or the system computer 6. The sensors 8 are adapted to interface with the mannequin 4 and can comprise a wide variety of conventional medical instrumentation, such as: cuffs for blood pressure (BP); pulse oximetry sensors for clipping on a finger of the mannequin 4 and sensing pulse, SpO2 and TCpO2; thermometers; and other devices. The sensors 8 are preferably of the noninvasive type and either comprise actual medical instrumentation or are adapted for realistically interfacing with the mannequin 4.

Figure 2:
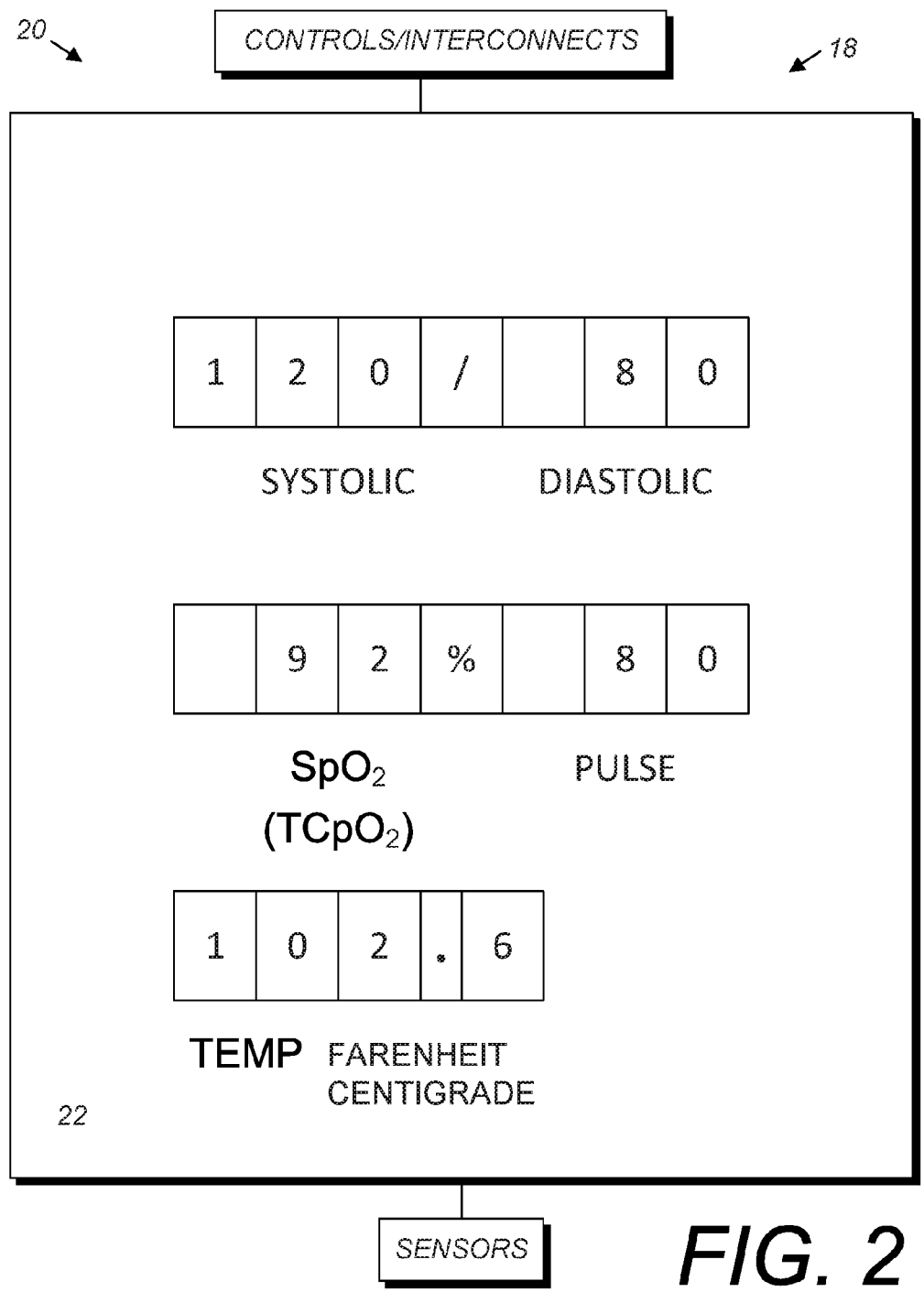
FIG. 2 is a view of a display of a monitor thereof, particularly showing digital display outputs corresponding to patient vital signs.

An example of an auxiliary monitor 20 is shown in FIG. 2 and can comprise, for example, a handheld unit with a display screen 22 for receiving the output of the mannequin computer 14 and/or the sensors 8. By way of example and without limitation on the generality of useful information that can be displayed on the auxiliary monitor 20, a basic set of vital signs comprising blood pressure (BP), pulse, oxygen saturation in percent (SpO2) and temperature is displayed on the monitor display 22, as shown in FIG. 2. A fifth parameter comprising transcutaneous oxygen tension (TCpO2) can be utilized in place of SpO2, particularly for pediatric scenarios. The use of these parameters will be described below.

Blood pressure is conventionally represented by systolic over diastolic. Digital readouts are shown for the vital sign parameters, but one or more could be replaced or supplemented with analog displays. The most recent blood pressure reading can be held on the display screen or GUI 22 of the monitor 20 until the next reading is "taken" (or computer-generated via computer simulation). A blood pressure sensing mechanism can be used for reading the actual pressure on the mannequin's arm or, alternatively, the system computer 6 or the mannequin computer 14 can inflate and deflate a blood pressure cuff, and generate an audible tone (i.e., "beep") with a simulated pulse in the usual manner, except that the blood pressure signals can be completely controlled and generated by the computers 6 and/or 14. In this configuration the mannequin 4 is passive, with the computer(s) generating all of the active commands, signals, inputs, outputs, etc.

The computer 6 can be programmed to obtain blood pressure values and display same at programmable intervals, e.g. 1-60 minutes. A simplified output would provide the most recent blood pressure readings only. As shown in FIG. 2, the BP acquisition time is displayed, along with the current time. The monitor 20 displays patient parameters obtained noninvasively and is preferably coupled to the mannequin 4 and the system computer 6 (e.g., hardwired, wireless or network) for interfacing (graphically and otherwise) with the users for simulation healthcare training.

The system 2 provides a "duality" whereby vital sign inputs and outputs can be obtained from the mannequin 4, the computer 6, or both. In a classroom setting, an instructor or instructors can oversee training exercises on the monitor output device 10 connected to the system computer 6, while the students/trainees directly observe mannequins 4 and/or vital sign readings on displays 22. Student/trainee performances can thus be monitored on site, or even remotely. Record and playback features of the system 2 permit post-scenario evaluations and critiques. Still further, a live subject could be utilized for one or more of the vital sign inputs, with others being computer-generated in order to simulate virtual medical conditions and output simulated virtual patient "responses" to various treatments.

Figure 3:
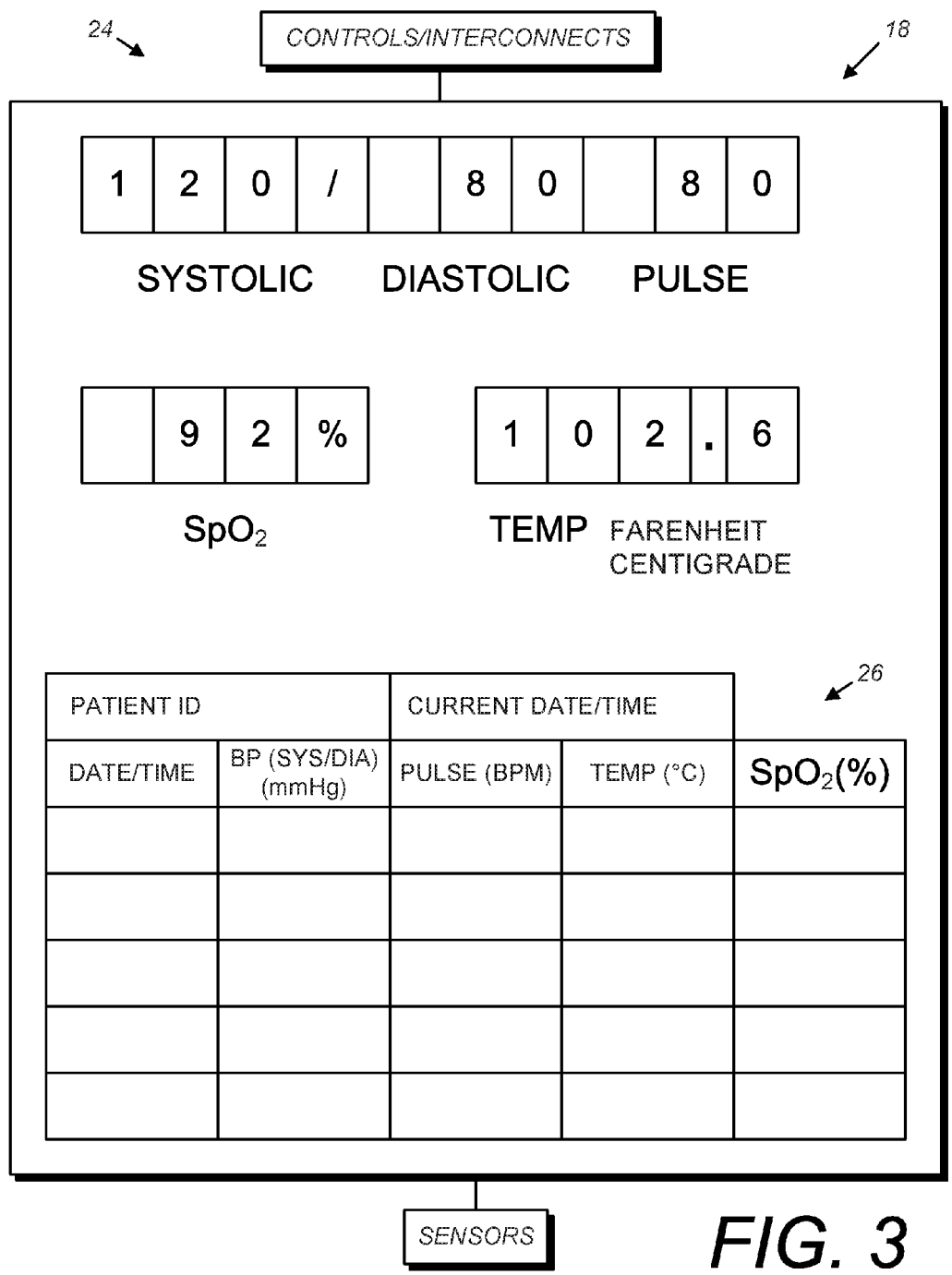
FIG. 3 is a view of a display of an alternative monitor thereof, particularly showing patient vital sign parameters at programmable intervals.

FIG. 3 shows a modified or alternative display 24 displaying a digital time line or history 26 indicating patient parameters taken at programmed intervals. For example, blood pressure readings can be "taken" (or generated by the computers 6, 14 according to the program or scenario being run) at suitable time intervals, which can be either predetermined or selected by the students as part of a training exercise. Along with the blood pressure readings, instantaneous values corresponding to the other patient parameters can be taken or computer-generated. In the example display 24 shown, the last five readings are displayed digitally at 26 to provide a recent patient history and identify trends, which could be symptomatic and provide indications of various assessment and intervention options. This feature enables detecting and tracking vital sign "trends," which can provide important information concerning the patient's improvement or declining condition based on his or her records over periods of time. All of the parameters/vital signs can be tracked with respect to time in this manner and the computer 6 can be programmed for suitable time intervals (t). More or fewer time line entries can be retained and/or displayed. The display 24 can comprise an auxiliary output device 18 (FIG. 1), or it can be incorporated in the system output devices 10, for example, as an optional screen display or window in a main monitor display accessible through a pull-down menu. The computer 6 can also be programmed to provide digital time lines specific to one or more patient parameters.

In addition to normal real-time operation of the display devices 10 and 18, the computer 6 can be programmed to compress or expand time in order to conduct efficient training exercises. For example, blood pressure readings that might normally change at hourly intervals can be programmed to change at 10-minute intervals in order to accelerate the simulated changes in patient condition and provide students and trainees with appropriate training on assessing and treating unstable patients in response to changes in their vital signs, including compressed reaction times to such trainee treatments. Other vital signs can be programmed to change at corresponding compressed or expanded intervals. Still further, intervals can be extended to provide a "slow-motion" or "freeze-frame" changing-condition experience as appropriate for particular training scenarios.

Still further, the computer 6 can perform a record-keeping function whereby such changes are recorded and stored to a patient's file. Saved data can be recalled and displayed in order to determine the patient's history and trends and for purposes of comparison with present readings. Users can trigger or initiate repeat vital sign reading procedures for determinations on-demand and in real-time at predetermined or desired time intervals. Predetermined numbers of prior readings can be recalled for comparison with current readings.

Although only a limited number of lines of data are displayed at a time, the system computer 6 memory can be designed to store large amounts of data for multiple virtual patients, which can be identified by patient number. Such data can be retrieved and displayed in various formats, including an interactive "scrolling" display whereby an operator can scroll forward and backward while displaying a limited amount of data at a time. The default display can be the current and the most recent values.

The computer 6 can store data applicable to different "patients" and scenarios. Thus, for training and education purposes patient profiles can be created and subjected to different scenarios in order to provide instructional variety and realism. Of course, some of the vital signs would change more or less quickly than others, whereby different time references for the different vital signs can be utilized as appropriate. Temperature and SpO2, for example, would tend to change relatively gradually, as compared to, for example, pulse and blood pressure.

A pulse-oximeter sensor function (mannequin 4, computer 6 or both) can emulate the performance of a helium-neon ("he—ne") laser light type of sensor, which is clipped on a fingertip. An intermittent mode of operation can be provided whereby the oximetry result can be displayed and the result recorded. The sensor 8 and the display monitor 10 can then be removed. Temperature, pulse, and SpO2 could be displayed continuously in real-time, or compared over time with blood pressure (BP) trends. The default timing for pulse, temperature, and SpO2 recording can be keyed on whenever a blood pressure value is also recorded, but different times for just these other readings can also be used.

The monitor display 22 content may be determined, at least in part, by the particular mannequin 4, which may include software for controlling its operation, i.e., active responses in the form of outputs to various procedures in the form of inputs. The healthcare simulation mannequin 4 preferably provides certain noninvasive patient monitoring functionalities and simulated physiological functions, such as breathing, heartbeat, blood pressure (BP), temperature, audible output, eye/eyelid movement, etc. Input and output signals for the various components of the system 2 can be transferred via connecting cables or wirelessly. Preferred hardwired connections are shown by continuous lines 25 and preferred wireless connections are shown by broken lines 27 in FIG. 1, although many other combinations of connections are possible.

The temperature function is preferably capable of both intermittent and continuous real-time display for this modality. Patient temperature generally corresponds physiologically to the other parameters of the program according to the particular scenario being utilized. In other words, temperature is an important indicator of physiological condition, and trends (both increasing and decreasing) can inform practitioners of changing conditions and treatment efficacies. Like blood pressure, it can be useful to display temperature in relationship to a time line (e.g., FIG. 3), including an indication of when it was last obtained. Also like blood pressure, the temperature can be controlled by existing scenario software loaded on the computer 6, which is not always the same as real-time and may be capable of manipulation. The mannequin 4 can be temperature-passive, i.e. providing no output signal corresponding to patient temperature. However, passive instruments, such as dummy tympanic membrane temperature probes can be provided for simulating the temperature-taking procedures in the scenarios. Sensors are available for quickly obtaining measurements (e.g., from the ear canal), which can be simulated by the scenario software and the computer 6.

The system 2 is preferably capable of incorporating continuous temperature displays associated with continuous monitoring, which can be achieved with existing equipment. It will be appreciated that the range of thermometers and temperature sensors is relatively large, whereby the system 2 can be programmed to simulate the operation and outputs associated with such a wide range of temperature input devices. The system 2 can be programmed for simulated temperature readings from different sources, such as axillary, oral, etc., and the scenarios can reflect temperature readings obtained by students from such different sources. Both Centigrade and Fahrenheit readings are available. Pediatric, neonatal, post-anesthesia, sensory depressed, comatose and medicated patients may require and will tolerate continuous temperature sensing from instruments which can be continuously left in place, such as a rectal temperature probe. Continuous temperature sensing in awake or awakening patients can be accomplished with suitable noninvasive surface equipment, such as forehead strips, axillary and skin-surface probes. Just as it is currently possible to use an actual working portable automated blood pressure monitor on existing mannequin models with controlled hydraulic conduits that simulate bronchial arteries, and just as it is possible to use current actual clinical intensive care monitors to pick up cardiac rhythms from predetermined electrical outlets on the mannequin, so it is possible to design a mannequin with vital sign outputs that would enable staff training with their own actual portable automated vinyl signed display devices (VSDD). All output points are controlled by the mannequin and system computer working in concert with the programmed scenario. The blood pressure would be projected by the hydraulic palms in the system as described above. The temperature signal would be transmitted by carefully controlled thermal plates located at strategic points. These can include a plate as the tympanic membrane producing a temperature control chamber in the ear for a scope-type thermal probe, and a plate against the lingual jaw inside and out for an oral probe and a spot on the forehead for a skin surface probe, etc. A specific mannequin model can be equipped with a single play or any combination. The same duality applies to the choices for all the signal output sides for all signals. The SpO2 output signal could be computer-controlled, synchronized infrared and red light output that would simulate the actual transmitted red signal for a specific level of saturation and pulse. This could be transmitted from the mannequin and a designated spot, e.g., the nailbed level of the ring finger. The sensing clip can be oriented so that the receptor signed his against the output sign of the finger. Alternatively, the output signal could be obtained from both the dorsal and the lingual sides of the mannequin finger so that, as in actual practice, it would not matter with the orientation and it is a "transmitted" through signal.

On-demand display of clock time (e.g., 24-hours or other suitable time period) can be coordinated to the time frame chosen for the scenario, or real-time. Preferably the scenario can be started at any chosen time, which "sets the clock" or starts the clock running to set in motion a series of programmed physiological occurrences affected by inputs corresponding to the treatment procedures and scenario plan. The computer 6 also preferably enables "pause" functionalities whereby immediate instruction and feedback can be provided in order to facilitate the instructional aspect of the exercise. Thus, instruction can be timely provided with the simulated patient's condition suspended in pause mode without further deterioration of the patient's physiology. Of course, such deteriorating (or improving) patient conditions can be programmed into the scenarios in real-time for greater realism, or even accelerated to demonstrate the consequences to the patient of various conditions and/or treatments. Also, by selecting key moments and running them in sequence, a cycle which would normally occur over several days can be time-compressed into hours.

As an alternative or supplement to SpO2, transcutaneous oxygen tension (TCpO2) can be modeled by the software. The TCpO2 value is obtained by determining the actual partial pressure of oxygen in the blood at the skin surface, as opposed to the "saturation" percentage of hemoglobin in the SpO2. TCpO2 is determined by heating the skin surface in a small sealed chamber and reading the change in the oxygen level as the gas escapes the skin. TCpO2 sensors are therefore noninvasive surface probes. The computer program of the system 2 provides SpO2 output, for which TCpO2 can be substituted. The scenarios can include the steps of attaching passive SpO2 and TCpO2 detection and monitoring equipment to the mannequin 4, with the computer 6 providing the actual output signals corresponding to these vital signs.

Figure 4:
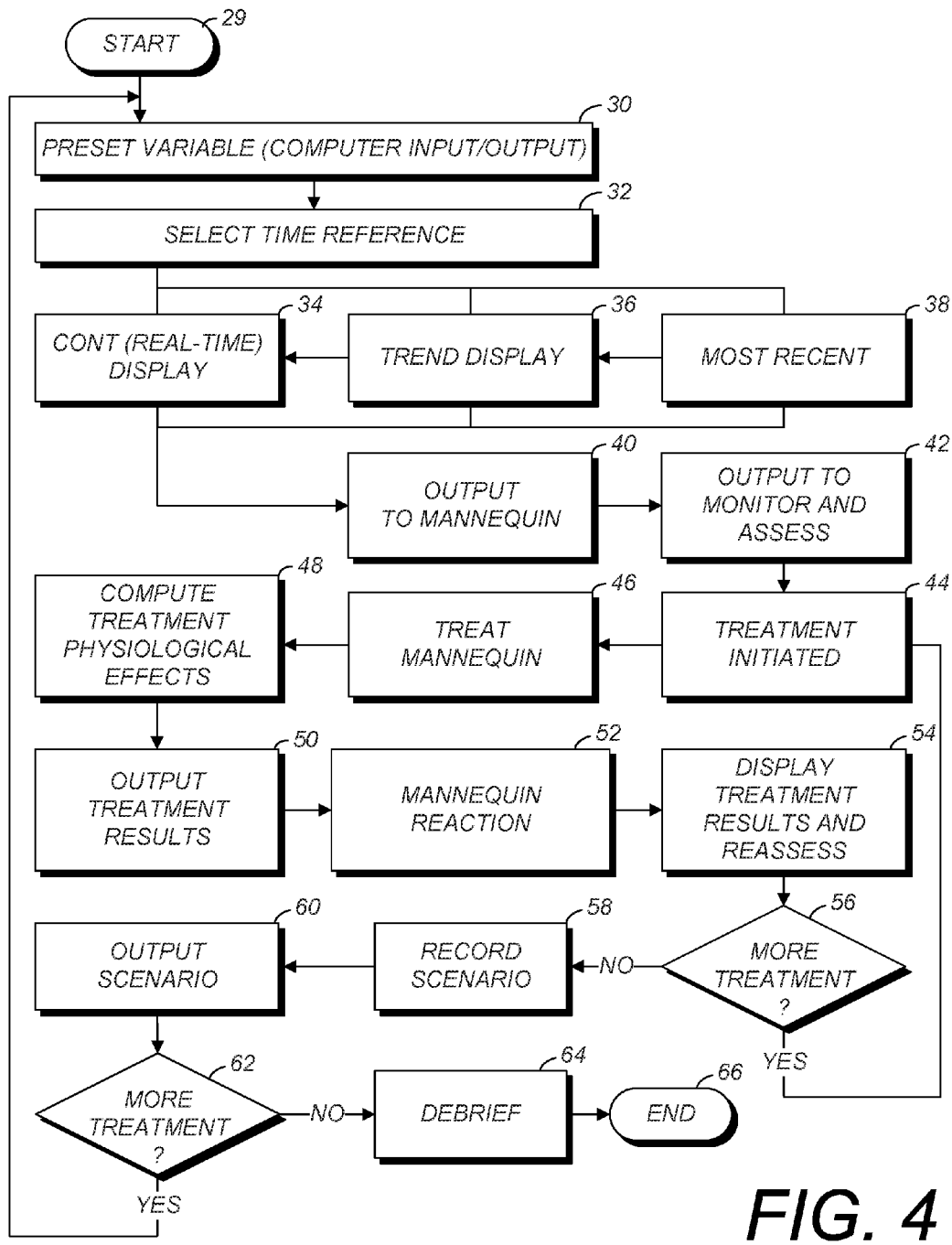
FIG. 4 is a flowchart showing a simulation scenario embodying an aspect of the method of the present invention, which can be adapted to various condition-specific and patient-specific scenarios.

FIG. 4 is a flowchart showing a healthcare educational method of the present invention. Beginning with a start 29, variables are preset at 30 and correspond to computer inputs and outputs. A time reference is selected at 32 and can be based on continuous (real-time) display 34, trend display 36, and most recent 38. Output is provided to a mannequin at 40, which in turn provides output to a monitor at 42. Treatment is initiated at 44, the mannequin is treated at 46 and the physiological effects of the treatment are computed at 48. The treatment results are output at 50, and can include mannequin reactions such as audible output and changes in physical condition at 52. The treatment results are displayed and mannequin condition is reassessed at 54. An affirmative decision at "More Treatment?" decision box 56 leads to a repeat of the treat mannequin step and sequence beginning at 46. A negative decision at 56 leads to recording the scenario at 58, outputting the scenario at 60 and a decision box for "Another Scenario?" at 62, with an affirmative decision leading to a repeat of the sequence beginning at 30 and a negative decision leading to a debrief of the simulation results 64 and ending the exercise 66.

Figure 5:
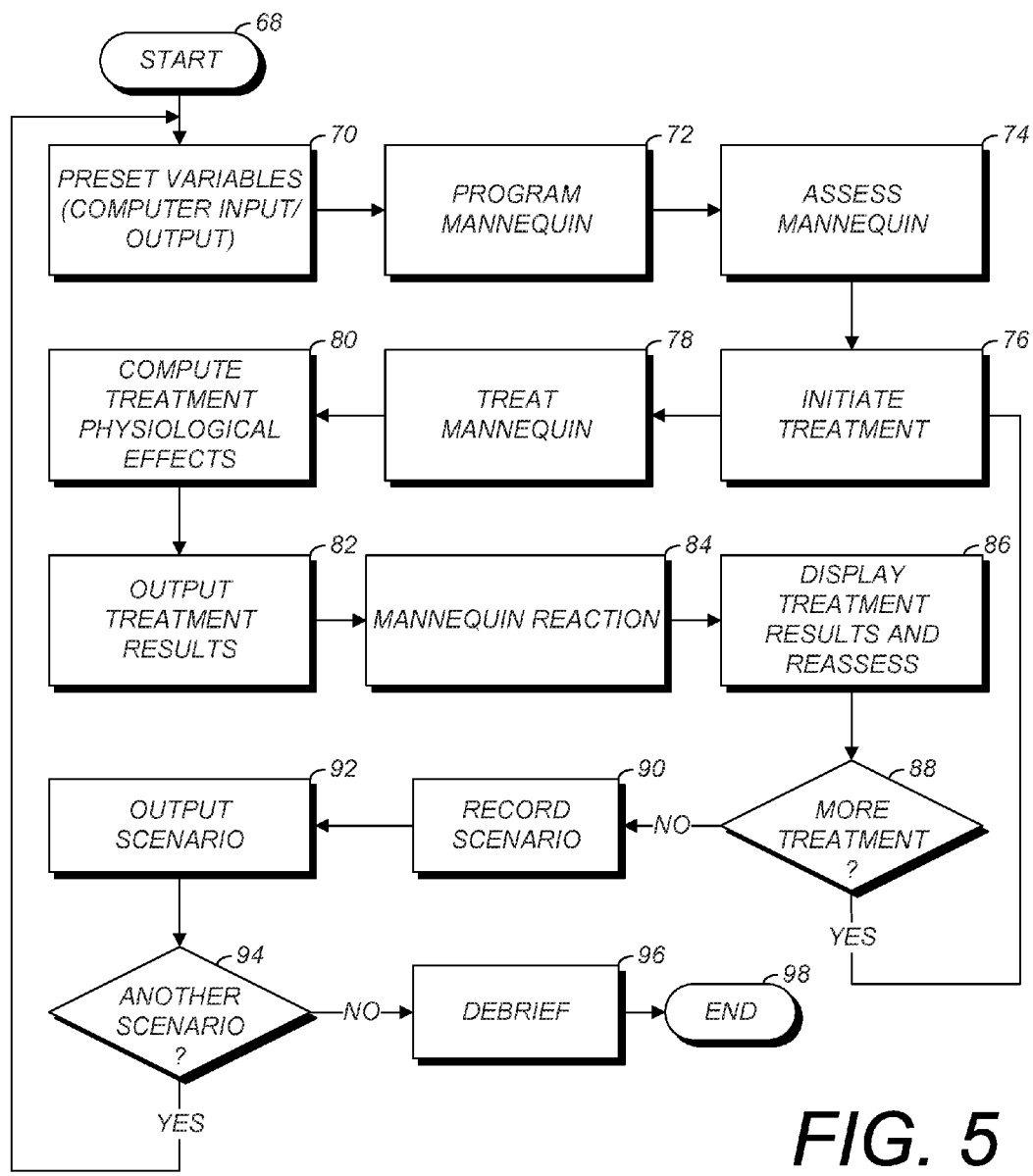
FIG. 5 is a flowchart showing another simulation scenario involving an initial student trainee assessment of the conditions associated with the mannequin.

FIG. 5 is a flowchart of another procedure or scenario embodying the method of the present invention. Beginning with a start 68, variables are preset at 70 and the mannequin is programmed at 72. A trainee or student assesses the mannequin condition at 74 and initiates treatment at 76 by treating the mannequin at 78. The treatment physiological effects are computed at 80 and output at 82. The mannequin reacts at 84 and the treatment results are displayed and mannequin condition is reassessed at 86. An affirmative decision at "More Treatment" decision box 88 repeats the cycle beginning at the "Treat Mannequin" step 78. A negative decision leads to the record scenario step 90, the output scenario step 92 and the "Another Scenario" decision box 94, from which an affirmative decision repeats the cycle beginning at "Preset Variables" 70 and a negative decision leading to a debrief of the simulation results 96 and ends the exercise 98.

An exemplary training exercise practicing the method of the present invention using the system 2 could include wheeling the "patient" (i.e., mannequin 4) into a training room, which can consist of or be modeled after a hospital room. The student or trainee can attach noninvasive sensors, such as a blood pressure cuff, thermometer, finger-clip pulse/SpO2 sensor, etc. If the initial reading is considered ineffective or erroneous, the student/trainee has the option of canceling or deleting it and retaking the initial reading. The computers 6, 14 and/or the sensors/equipment 8 can be configured to detect incorrect applications of the sensors/equipment 8 to the mannequin 4, e.g., improper blood pressure cuff wrappings or SpO2 sensor placements. The system 2 can provide appropriate outputs alerting the students to the incorrect applications. The computer 6 can initiate a training scenario with programmed outputs and responses to various inputs corresponding to "treatment." The initial readings obtained by the system 2 can be output on the display 18 (FIG. 2) and can also comprise the first time line entries on the display 18 (FIG. 3). Thereafter the scenario can present predetermined changes in the physiological variables in order to simulate a deteriorating patient condition, prompting the trainee to react with appropriate treatment protocols. As shown in FIG. 3, additional memory line values are obtained and displayed at intervals, which can be predetermined or set by the students as part of the training exercises. For example, blood pressure readings taken once an hour can correspond to the updates in the other physiological values whereby trends can be identified from the display 18. Thus, even if the initial readings are relatively normal, subsequent changes can indicate a deteriorating condition necessitating treatment.

Figure 6:
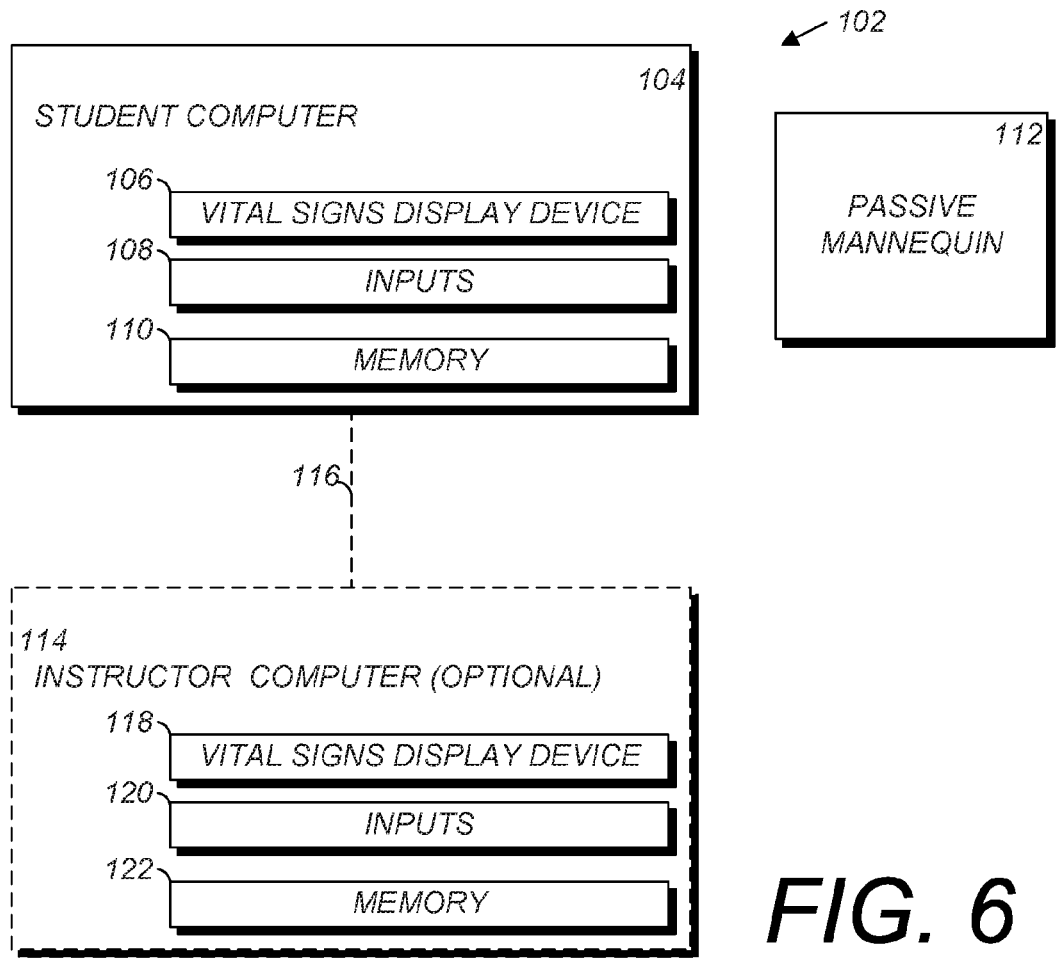
FIG. 6 is a block diagram of a healthcare training system embodying a second aspect of the present invention.

FIG. 6 shows a block diagram of a system 102 comprising a second aspect of the invention and including a student computer 104 with a vital signs display device (VSDD) 106, inputs 108 and memory 110. A passive mannequin 112 can be placed in proximity to the student computer 104 for simulated "treatment" in response to the VSDD 106 output. These components can operate in a standalone mode. Alternatively, an optional instructor computer 114 can be provided and linked to the student computer 104 by connection 116. The instructor computer can include a VSDD 118, inputs 120 and memory 122. The functionalities of the student and instructor computers 104, 114 can be combined and separate VSDDs 106, 118 can be provided on opposite sides of an enclosure housing the computer whereby the student's VSDD 106 is in the student's field of vision, but the instructor's VSDD 118 is concealed from the student either by its orientation or by a removable cover.

Figure 7:
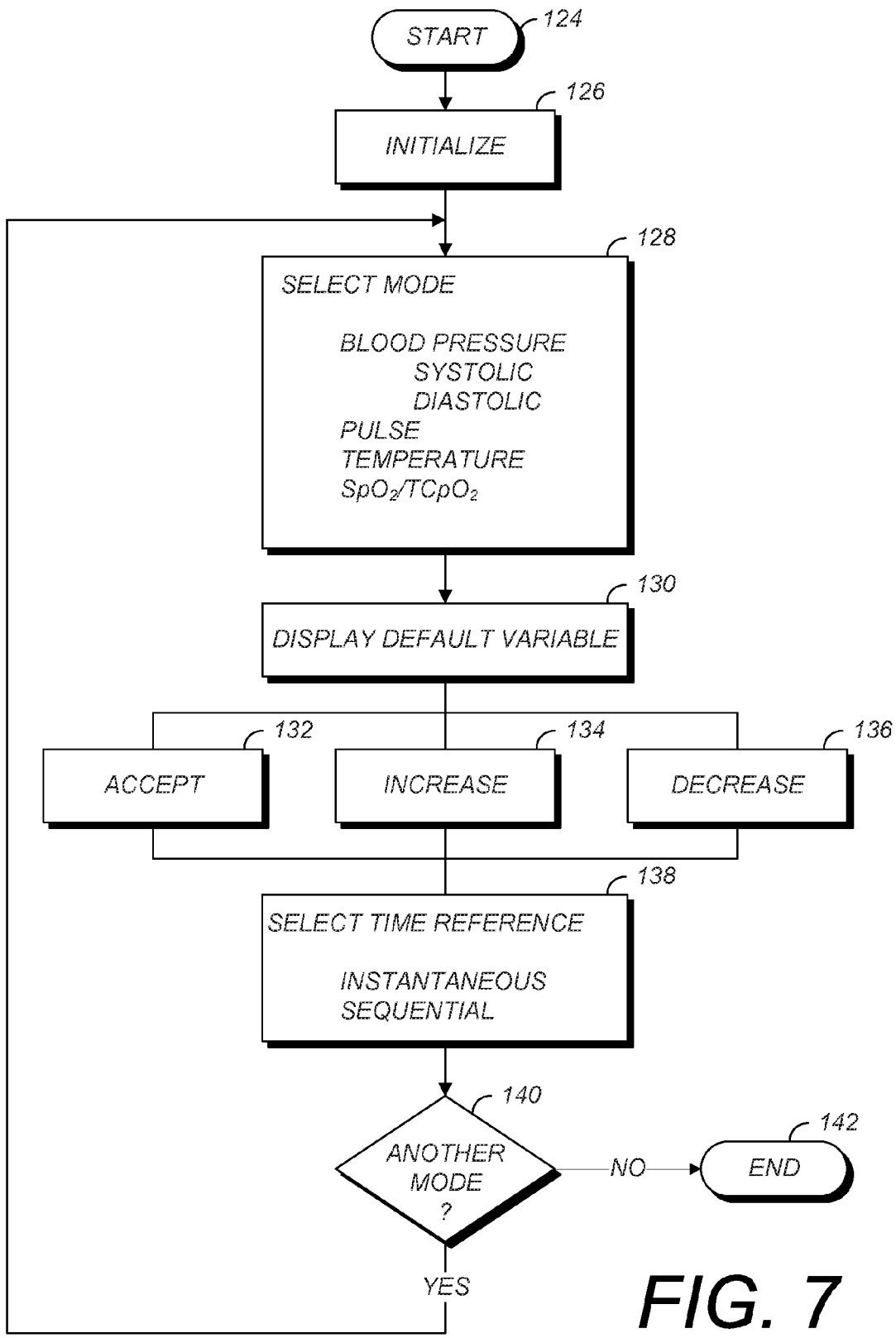
FIG. 7 is a flowchart showing a training session variable initialization procedure therefor.

FIG. 7 shows a flowchart for a procedure for setting variables for the system 102. Beginning with a start 124, the system then initializes at 126 and proceeds to a select mode step at 128. The vital signs can be associated with default variables, which are displayed at step 130. The variables can be accepted at 132, increased at 134, or decreased at 136. Thereafter the method proceeds to selecting the time reference at 138, which is generally an instantaneous (real-time) or sequential (time history) value. A positive answer at decision box 140 leads to the select mode step at 128. A negative answer at 140 leads to an end 142.

Figure 8:
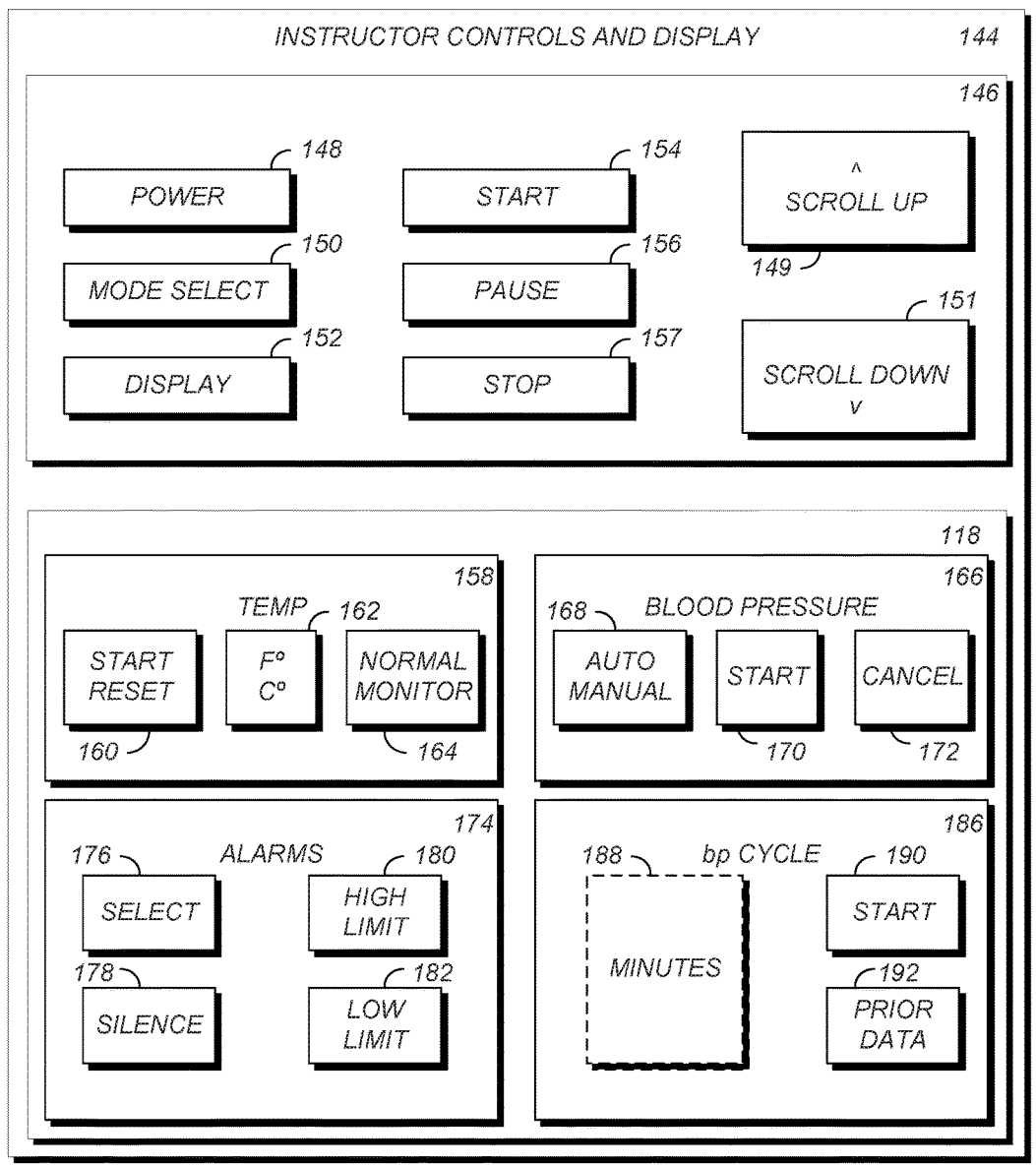
FIG. 8 shows the instructor controls and display therefor.

FIG. 8 shows an instructor controls and display 144 for the optional instructor computer 114 with a controls section 146 and the VSDD 118. Suitable controls for power 148, mode (e.g., blood pressure systolic/diastolic, pulse, temperature, SpO2 and/or TCpO2) select 150, display 152, start 154, pause 156, stop 157, scroll up 149 and scroll down 151 can be provided as shown.

The VSDD 118 includes a temperature module 158 with a start/reset switch 160, a Fahrenheit/Centigrade switch 162 and a normal/monitor switch 164. A blood pressure module 166 includes an auto/manual switch 168, a start switch 170, and a cancel switch 172. An alarms module 174 includes a select switch 176, a silence (mute) switch 178, a high limit switch 180, and a low limit switch 182. The limit switches 180,182 permit entry of values corresponding to high and low blood pressure (or other variable) values which, when exceeded, cause an alarm to be output. A blood pressure (BP) cycle module 186 includes an interval select switch 188 for inputting time units (e.g., minutes) between readings. A start switch is provided at 190 and a prior data switch 192 causes prerecorded data to be displayed.

Figure 9:
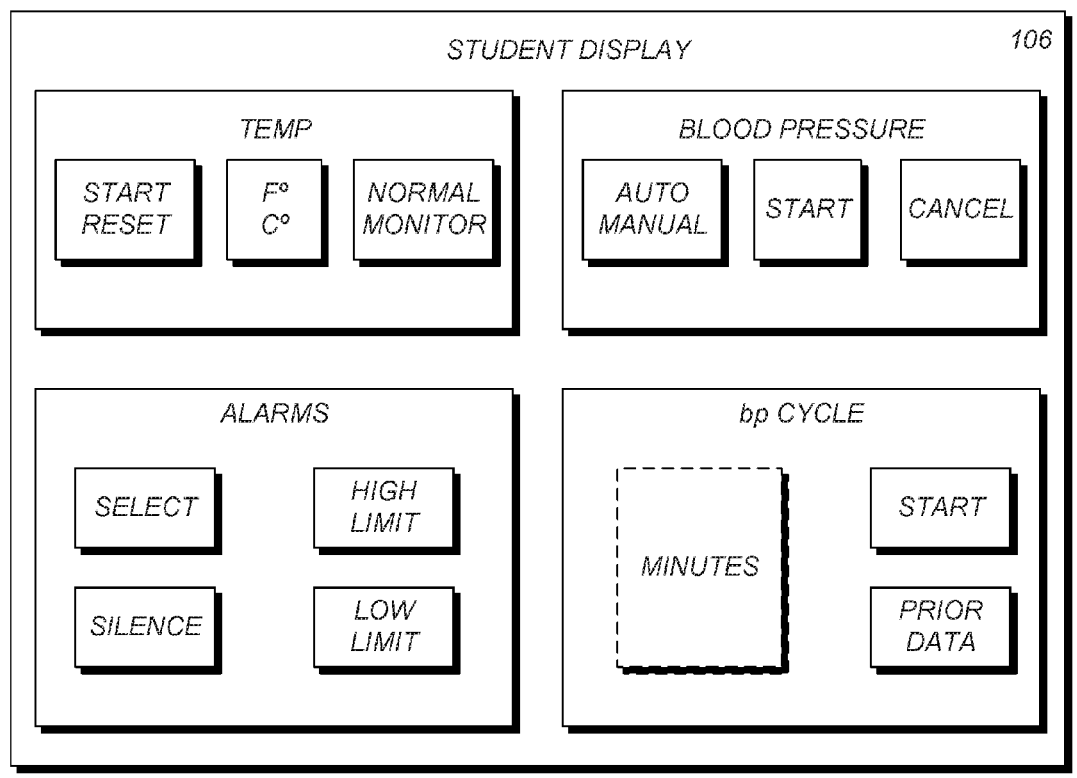
FIG. 9 shows the student display therefor.
Figure 10:
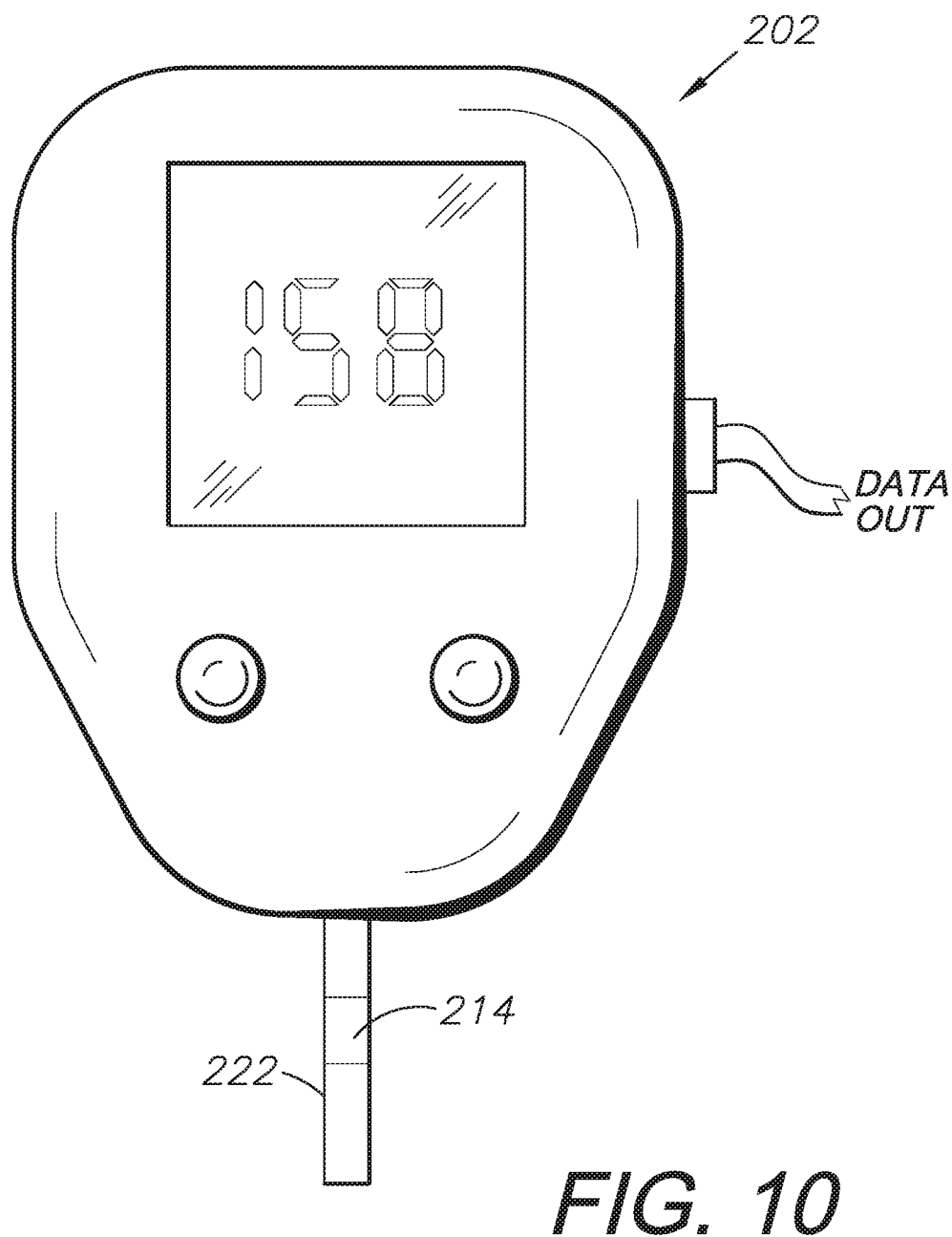
FIG. 10 shows a typical prior art glucometer, which can be used in connection with an alternative aspect of the present invention.
Figure 11:
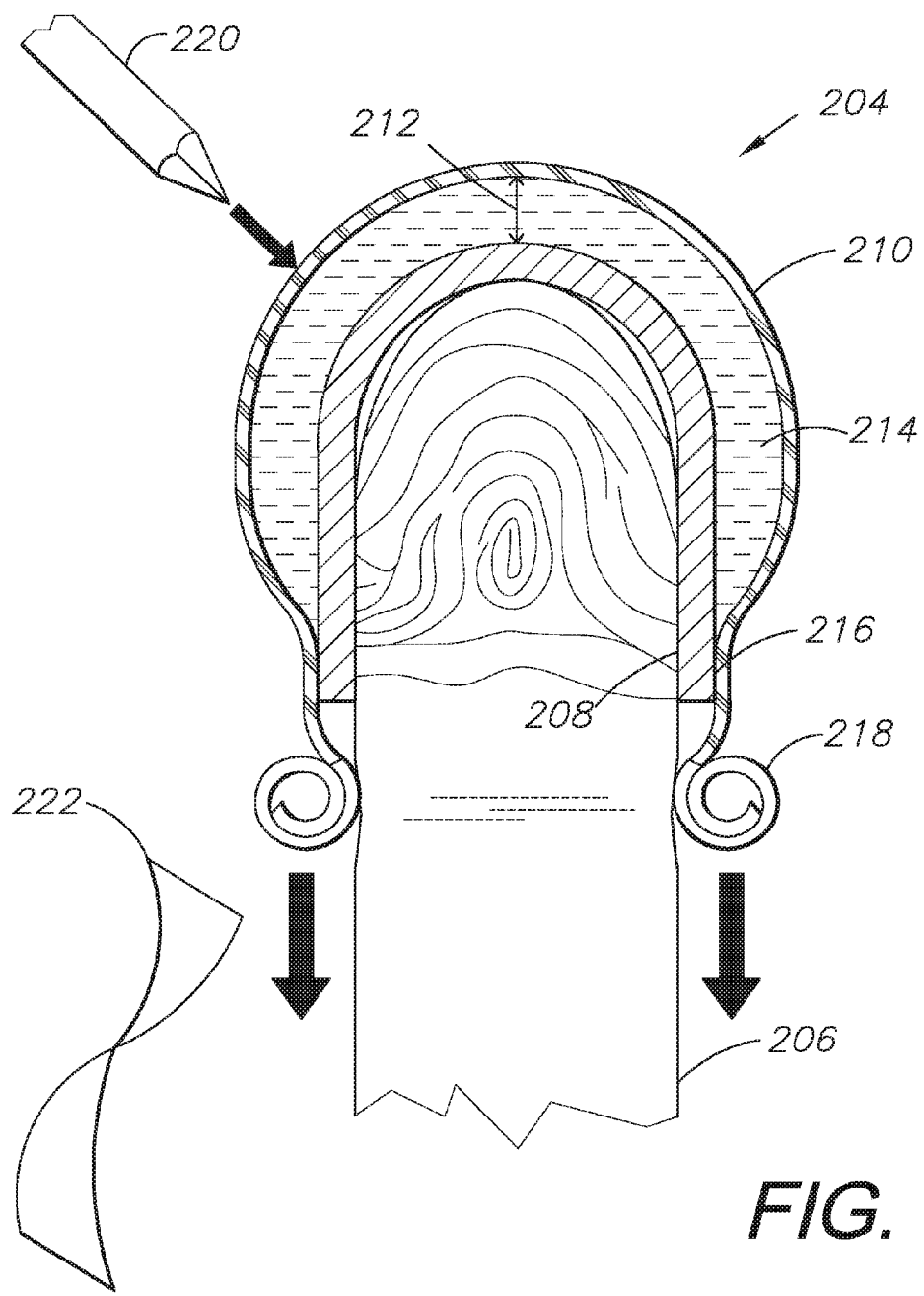
FIG. 11 shows a finger cot, which can optionally be used for simulated patient blood serum modeling in connection with an alternative aspect of the present invention.
Figure 12:
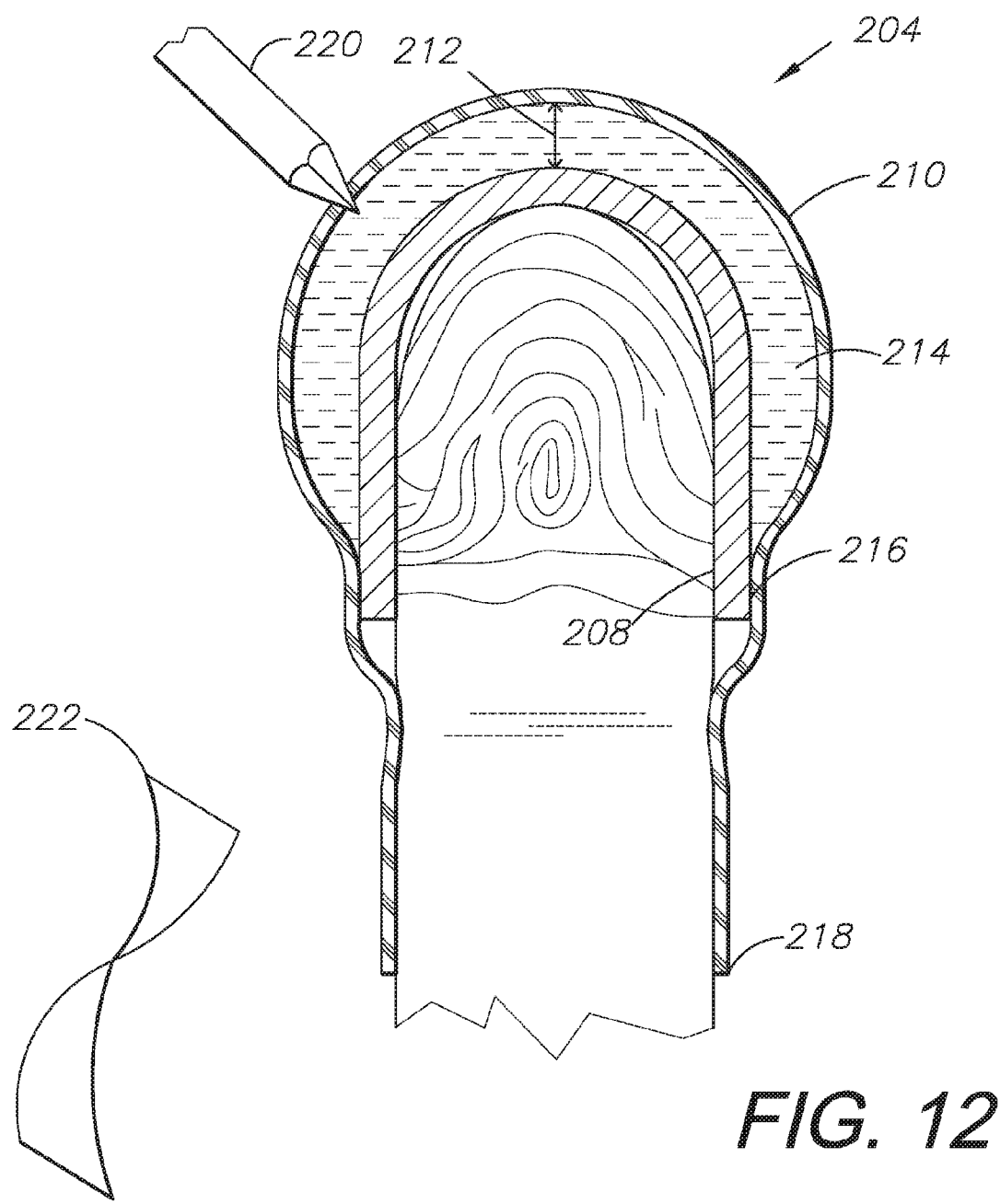
FIG. 12 shows the finger cot being punctured by a lancet instrument for obtaining a simulated blood serum sample on a reagent strip.
Figure 13:
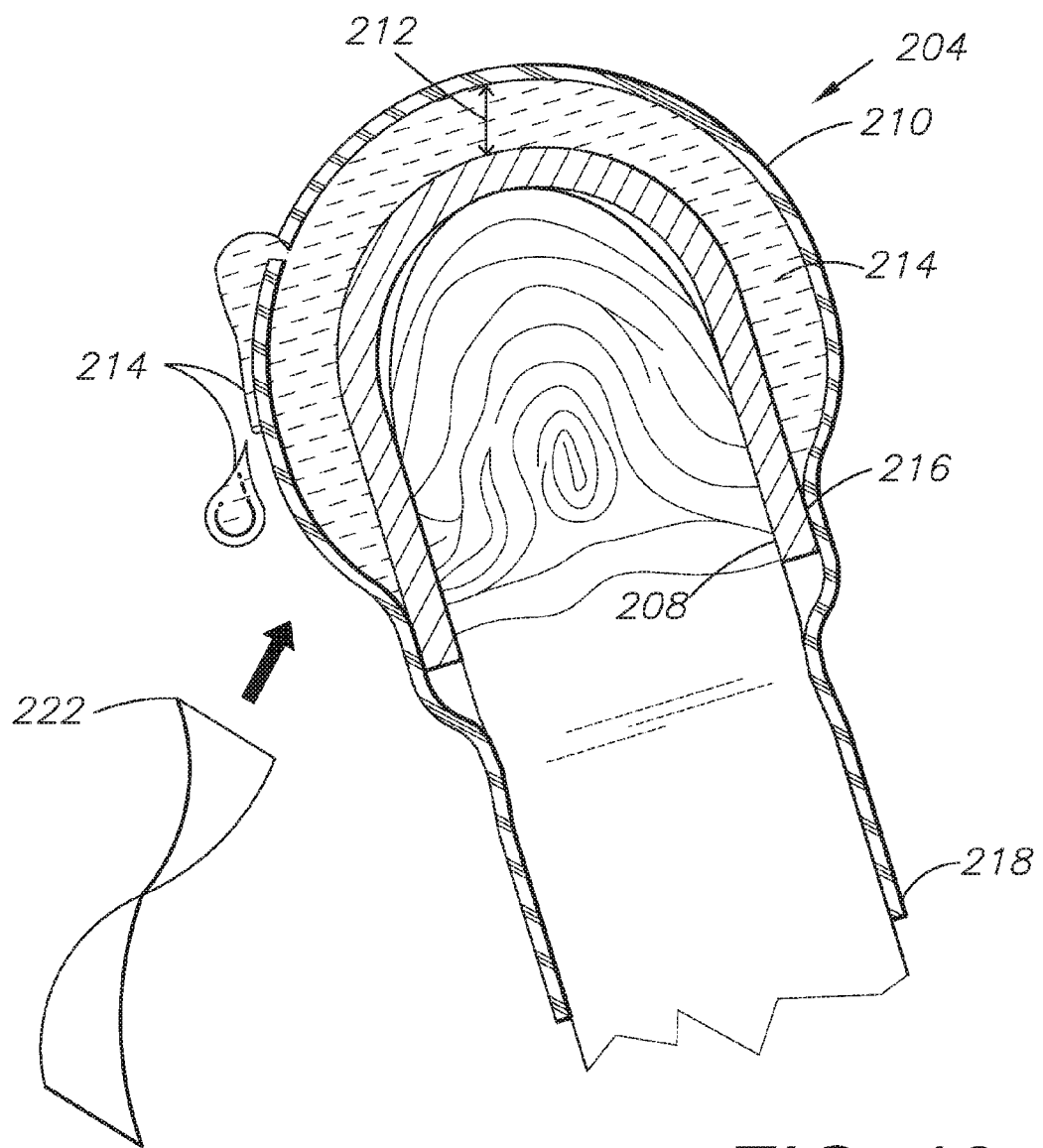
FIG. 13 shows a simulated blood serum sample being drawn for application to the reagent strip.
Figure 14:
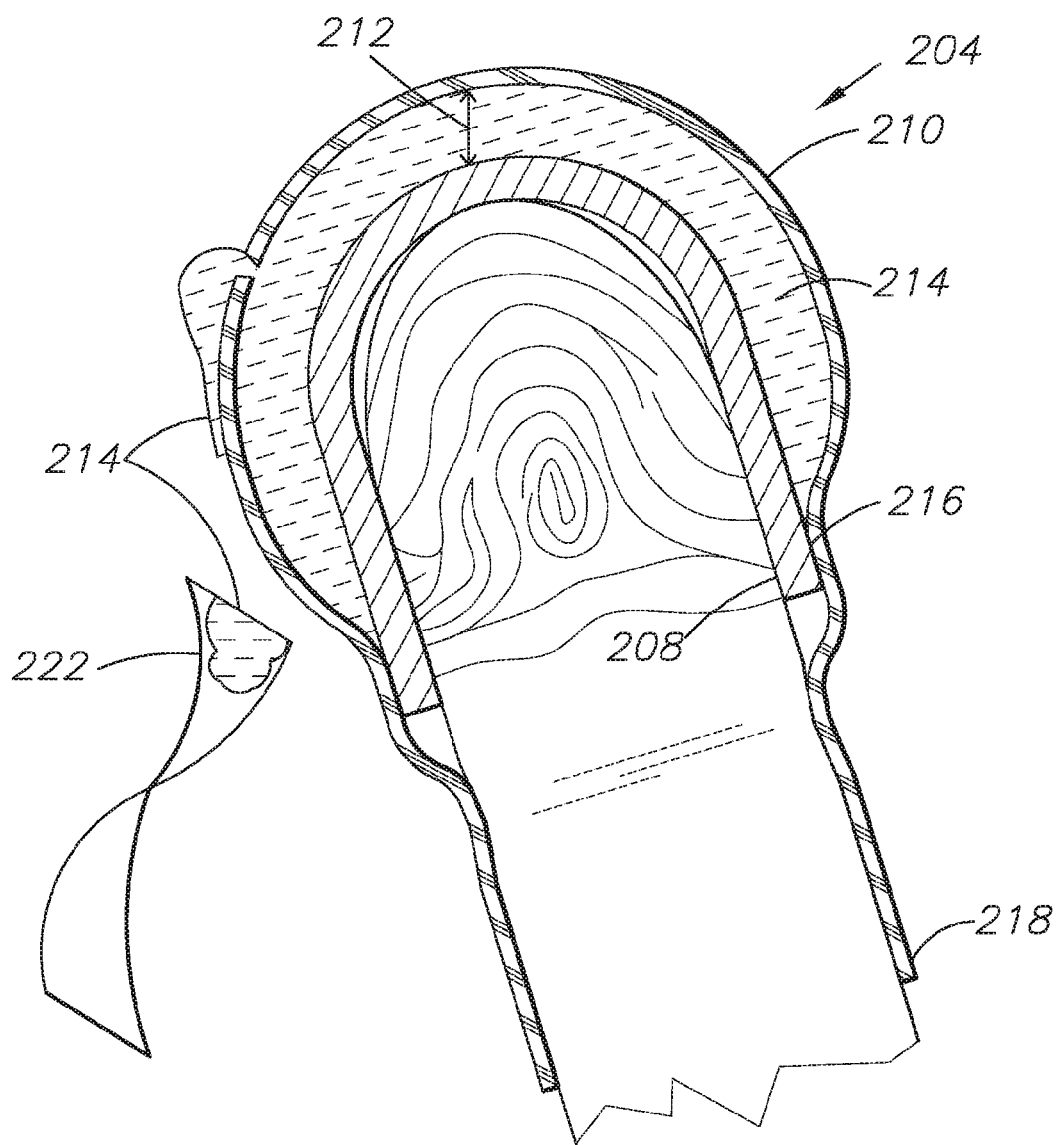
FIG. 14 shows the simulated blood serum sample on the reagent strip.

FIG. 9 shows the student VSDD 106, which can be essentially identical to the instructor VSDD 118. In operation, the instructor can program the system 102 and interactively control its operation while monitoring the instructor VSDD 118. The student can assess and treat the passive mannequin 112 while observing the student VSDD 106.

FIGS. 10-14 show an alternative aspect of the present invention being used in connection with a glucometer 202, comprising a standard instrument used for measuring blood glucose levels. Blood sugar concentration or blood glucose level is the amount of glucose (sugar) present in the blood, which is normally tightly regulated as part of metabolic homeostasis. Hyperglycemia is a common indicator of a diabetic medical condition. Long-term hyperglycemia can cause health problems associated with diabetes, including heart disease, eye, kidney, and nerve damage.

Conversely, hypoglycemia is a potentially fatal medical condition, which can be associated with lethargy, impaired mental function, muscular weakness and brain damage. Patients with such medical conditions are commonly carefully monitored at frequent intervals in order to avoid serious medical complications. Simulating blood glucose levels can thus be useful in training healthcare providers in the assessment and treatment of various medical conditions indicated by abnormal blood glucose levels.

FIGS. 11-14 show a finger cot 204 adapted for placement over a finger 206 of a simulated patient, which can be an individual assuming the role of a patient, or a mannequin. The cot 204 includes a protective, puncture-resistant thimble 208 and a latex-like or rubber-like, penetrable cover 210 placed over the thimble 208 and forming an intermediate space 212 adapted for receiving simulated blood serum 214, which can be retained by a perimeter seal 216 located at a proximate end of the thimble 208. The cover 210 can be rolled at its proximate end 218 and unrolled to an appropriate length to cover part of the finger 206 and thus retain the finger cot 204 securely thereon. The finger cot 204 can also be secured with adhesive or tape.

In operation the cover 210 is penetrated by an instrument, such as a lancet 220, and a small quantity, such as a single drop, is applied to a reagent strip 222. The reagent strip 222 can be placed in the glucometer 202, which provides a glucose level reading.

Figure 15:
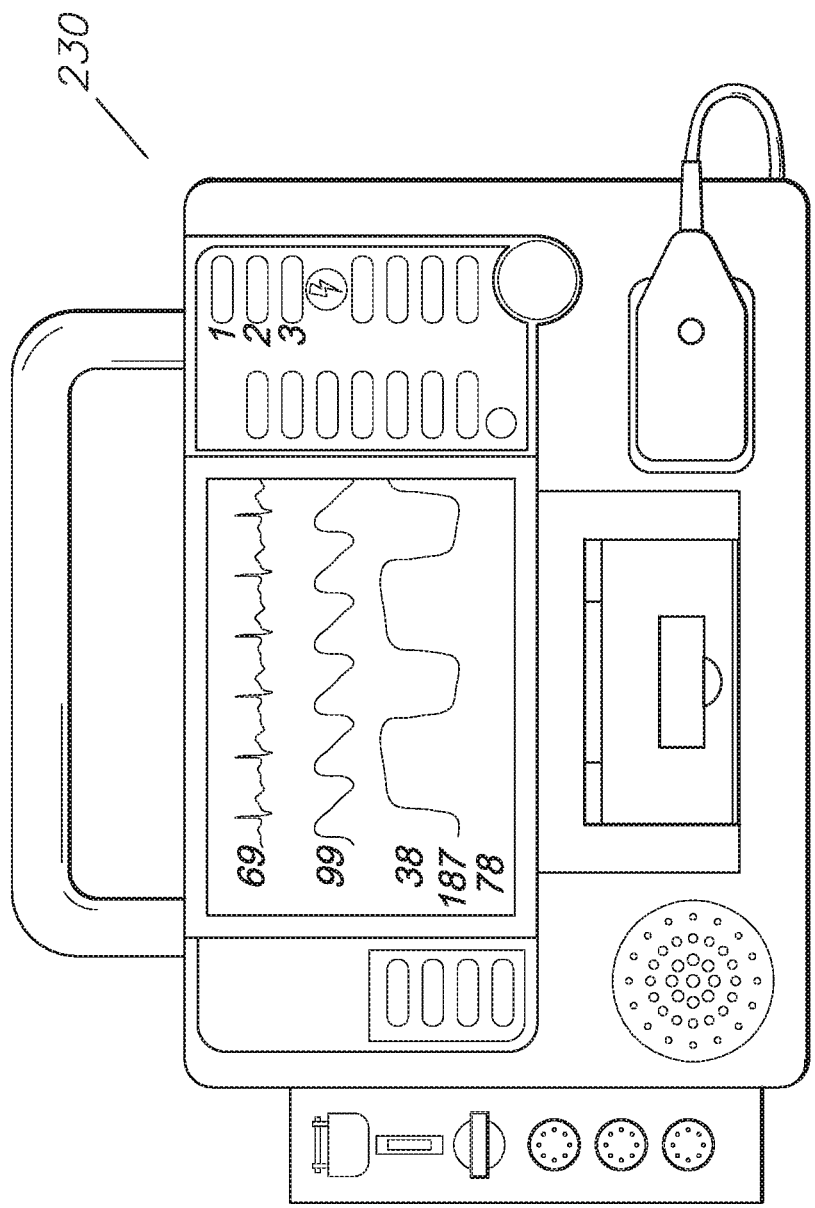
FIG. 15 shows a prior art monitor/defibrillator adapted for use in connection with an alternative aspect of the present invention.

FIG. 15 shows a monitor/defibrillator 230 adapted for use in connection with an alternative aspect of the present invention. Without limitation on the generality of useful equipment, the monitor/defibrillator 230 can comprise a LifePak model, which is available from Physio-Control, Inc. of Redmond, Wash. The monitor/defibrillator 230 can optionally be connected to the system computer 6 and/or a patient model, such as the mannequin 4. Alternatively, the monitor/defibrillator 230 can be configured as a "smart" unit with an internal processor programmed for simulating procedures corresponding to patient conditions and responses. Individuals can interact with the monitor/defibrillator 230 by administering simulated treatments in response to simulated patient outputs, such as physiological conditions and vital signs, as described above.

Such monitor/defibrillators 230 are commonly used in emergency procedures, and are typical equipment on emergency vehicles, such as ambulances, "Med-Act" vehicles, and "Life Flight" helicopters and other aircraft. For training purposes, students can practice interactive procedures with mannequins or live actors using the monitor/defibrillators 230. Alternatively, "smart" monitor/defibrillators can be used in a "standalone" mode for interacting with students and displaying appropriate outputs in response to different conditions and treatments. Various other types of equipment can be used in connection with the system and method of the present invention. For example, chest drainage systems can be monitored and/or simulated in operation. Pleur-Evac chest drainage systems are available from Teleflex Medical OEM of Kenosha, Wis.

FIG. 16 is a block diagram showing various alternative configurations and functions of the aspects of the present invention. For example, the patient model can be a live actor with a script, a mannequin (interactive or passive), an avatar, a hologram or a virtual patient existing only in computer memory and represented visually as a still photo, a video clip or an animated or graphic image. Still further, student interfaces with both the patient model and the tools can range from direct contact to remote, on-line interaction. Likewise, the instructor interface can assume a wide variety of contact and communication media and methods. Automated interfaces can be substituted for or supplement direct, human interaction.

Figure 17:
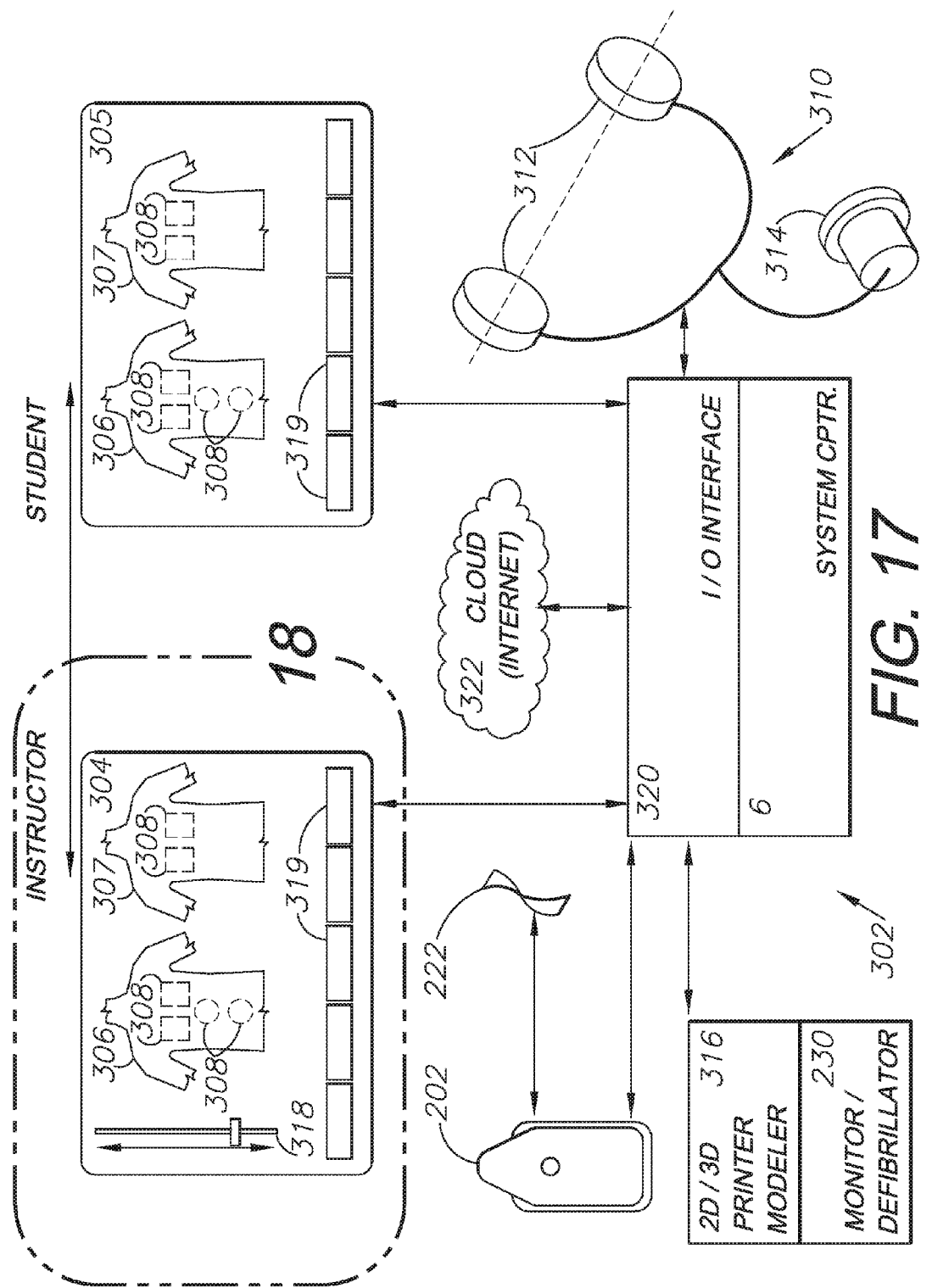
FIG. 17 is a schematic diagram of a device and procedure simulation and training system embodying another aspect of the present invention, with instructor and student touchscreen monitors.
Figure 18:
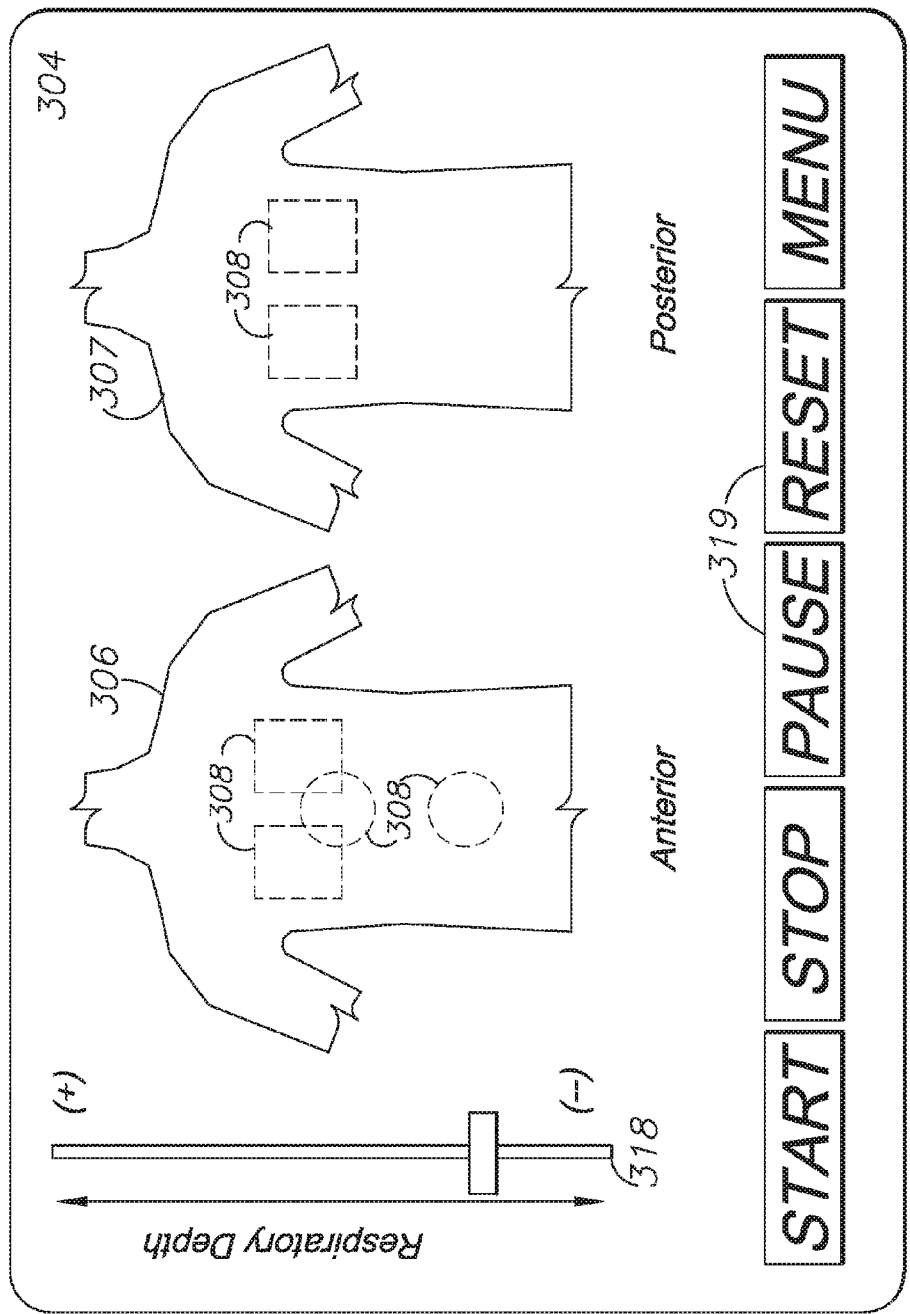
FIG. 18 is an enlarged diagram of an instructor touchscreen monitor comprising an input/output (I/O) device for use with the system, taking generally within area 18 in FIG. 17.

FIG. 17 shows a diagram of a simulation system 302 including instructor and student touchscreen monitors 304, 305 for use as input/output (I/O) components. The monitors 304, 305 are connected to a system computer(s) 6 (FIG. 1), which can be preprogrammed with various simulation training and educational scenarios. For example, the monitors 304, 305 can display anterior and posterior patient images 306, 307 with predetermined touch-screen areas 308 for initiating interaction. Additional inputs can be entered via touch-screen buttons 319 (FIGS. 17 and 18). The monitors 304, 305 can also be used in conjunction with a student interface configured like a stethoscope 310, which can comprise a "smart" device providing audible output signals via headphone-type speakers 312. Input signals can be provided by placing an input 314 of the stethoscope 310 on the touchscreen areas 308, whereby the computer 6 provides corresponding responses. Alternatively, the stethoscope input 314 can be placed on a mannequin or an individual portraying a patient. The output of the stethoscope 310 can be preprogrammed on the system computer 6, or controlled in real-time by an instructor. A suitable input/output (I/O) interface component 320 is connected to the system computer 6 for interfacing with the various input and output (I/O) devices. For example, the I/O interface component 320 can include analog-to-digital (A/D) converters, filters, amplifiers, data compression, data storage, etc. The stethoscope 310 output can be "On Demand," i.e., placement determining the output sounds via the touchscreen whereby variants of chosen heart rates and breathing sounds can be preprogrammed and altered, e.g., by a rheostat-type sliding scale control 318.

By way of example and without limitation, a preprogrammed scenario can involve placing the stethoscope input 314 on lung areas 308 whereby audible output corresponding to patient breathing sounds are delivered via the headphone speakers 312. The scenarios and the corresponding output signals, including the stethoscope 310 outputs, can be controlled via an instructor monitor 304 displaying a patient image 306, which is similar to that shown on the student monitor 305. For example, the instructor monitor 304 can include the rheostat-type sliding scale control 318 for adjusting a parameter of an output signal, such as volume, intensity and frequency. Breathing patterns, i.e., shallow-to-deep, slow-to-rapid, etc. can be controlled by an instructor for simulating various patient medical conditions. Such audio outputs can be made self-sensing by placing a band around the chest of the mannequin or SP which senses the respiration rate and depth and signals this to the controlling computer 6. These audio signals and pulses can be coupled to an EKG strip displayed on a vital sign monitor control by the controlling computer 6, which senses all of these effects. The system computer 6 can also interface with and output to a monitor/defibrillator 230 (FIG. 15) and a 2-D/3-D printer modeler 316.

Other instructor-to-student audio applications include cardiac and gastro-intestinal (G.I.). Instructors can present patient distress indications via the interface monitor 304, with appropriate condition changes based on treatments administered by the students. The timing of such signal interactions can be varied and paused as appropriate for accomplishing the training objectives. For example, patient condition changes naturally occurring over several days can be compressed into training exercises corresponding to a class period.

Of course, many patient condition indicators and physiological parameters are interrelated. Such interrelated relationships and their visible/audible indicators can be programmed and presented to students for training purposes. For example, worsening conditions are often indicated by labored breathing, rapid pulse, fever, etc. Conversely, improving conditions can be indicated by restoring normal breathing patterns, normal heart rate, moderate blood pressure, normal temperature, etc. Visual indicators can include pale versus flushed skin appearance, pupil dilation, perspiration, etc. All of these parameters can be preprogrammed or manually manipulated by the instructors as appropriate for training exercise objectives.

It will be appreciated that such training exercises can occur remotely, with the instructors and students connected via the Internet or otherwise by telecommunications. By linking the participants with the Internet and other telecommunications technology, significant training efficiencies can be achieved. For example, instructors and students can be dispersed globally at remote locations with Internet access providing the interaction. Moreover, scenarios and student responses can be digitally stored for later replay and evaluation, e.g., via the I/O interface 320, in the cloud 322, etc.

Glucometer applications are shown in FIGS. 19-59. Glucometers, such as the portable example shown at 202, are frequently used by both trained medical personnel and untrained individuals, including patients. The present invention includes systems and methods for glucometer training. A glucometer training system 402 includes a computer 6, an I/O interface 320, software and participants (i.e., instructor, student and/or patient) as described above. The patient/subject role can be filled by an individual, a mannequin, or a device, such as a simulated fingertip 442 (FIGS. 24-27) described below.

Figure 19:
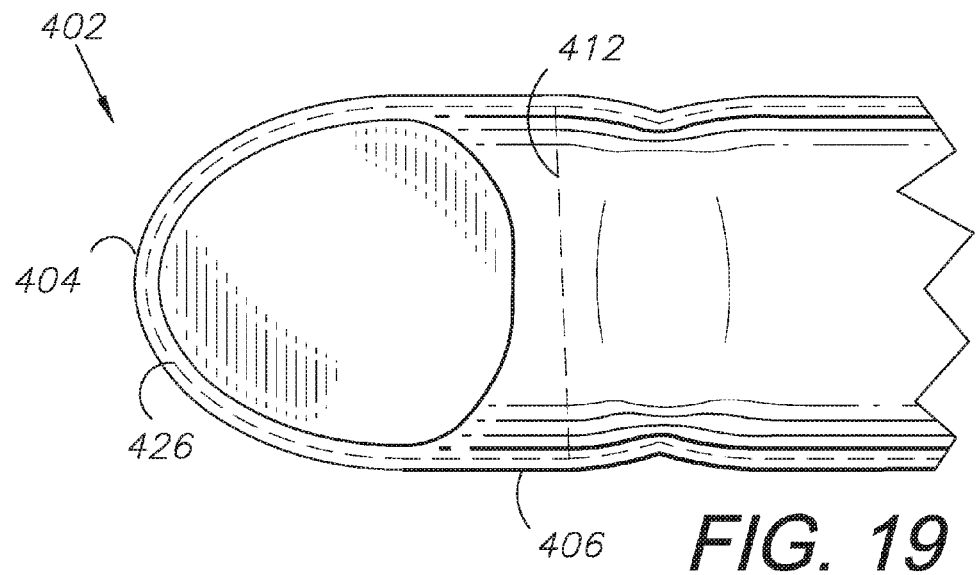
Figure 20:
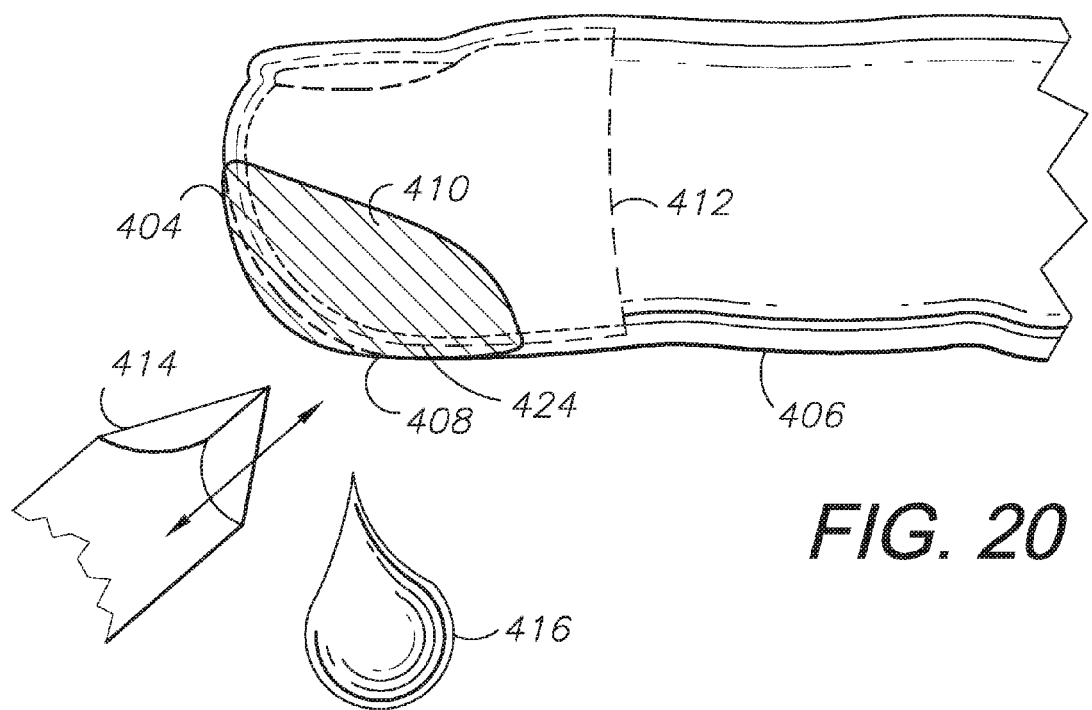

FIGS. 19 and 20 show a glucometer training system 402 with a blood serum simulation interface 404 including a finger cot 406 placed over a bleb 408, which can be filled with simulated blood serum 410. The interface 404 can include a thimble or fingertip shield 412, which protects an underlying part of the fingertip 426 from penetration by a lancet 414. The shield 412 can comprise any suitable material conformable to the fingertip. For example, metals and hard plastics can be used for forming the shield 412. Still further, padded shields can be provided. The bleb 408 is preferably filled with a semi-viscous fluid 410 forming a droplet 416 when discharged. The fluid 410 can include appropriate physiological composition characteristics, such as blood-sugar levels for glucose testing. Alternatively, the fluid 410 can be inert, with the characteristics preprogrammed and simulated by the computer 6.

Figure 21:
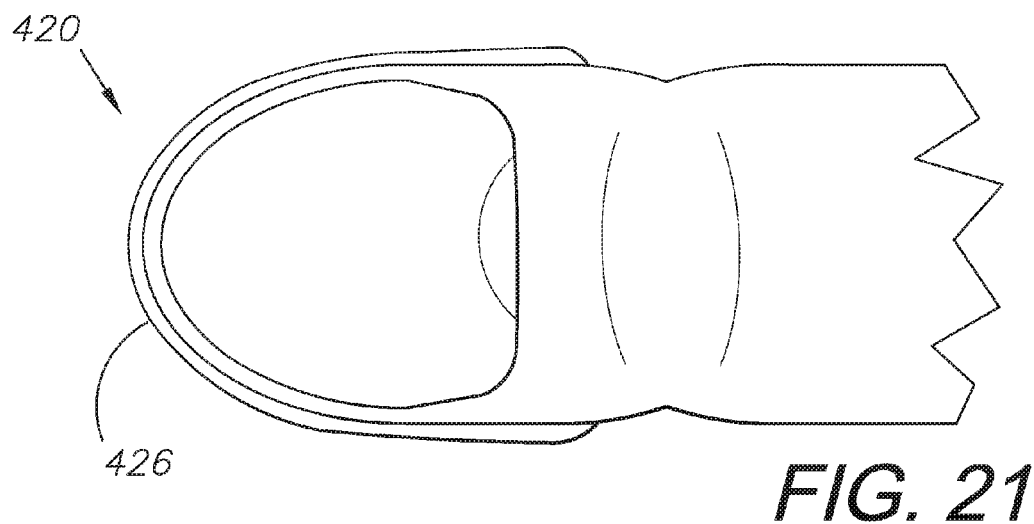
Figure 22:
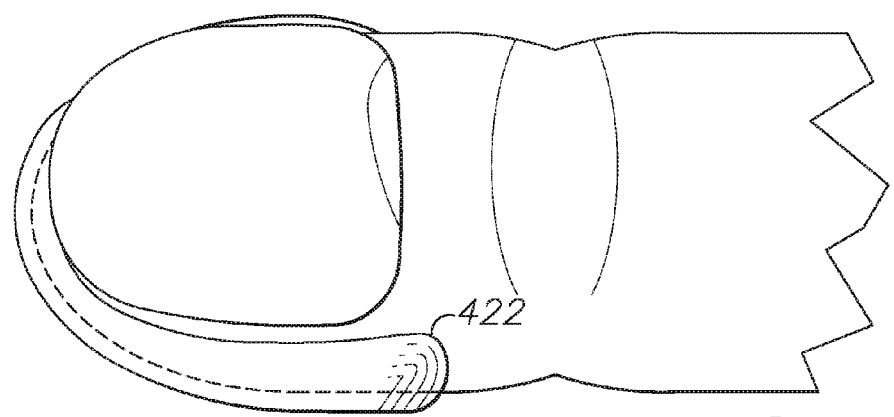
Figure 23:
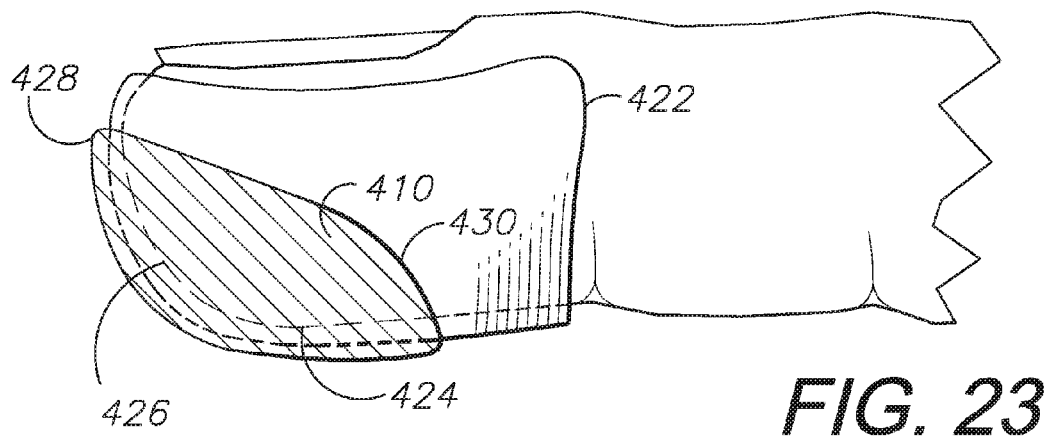
Figure 24:
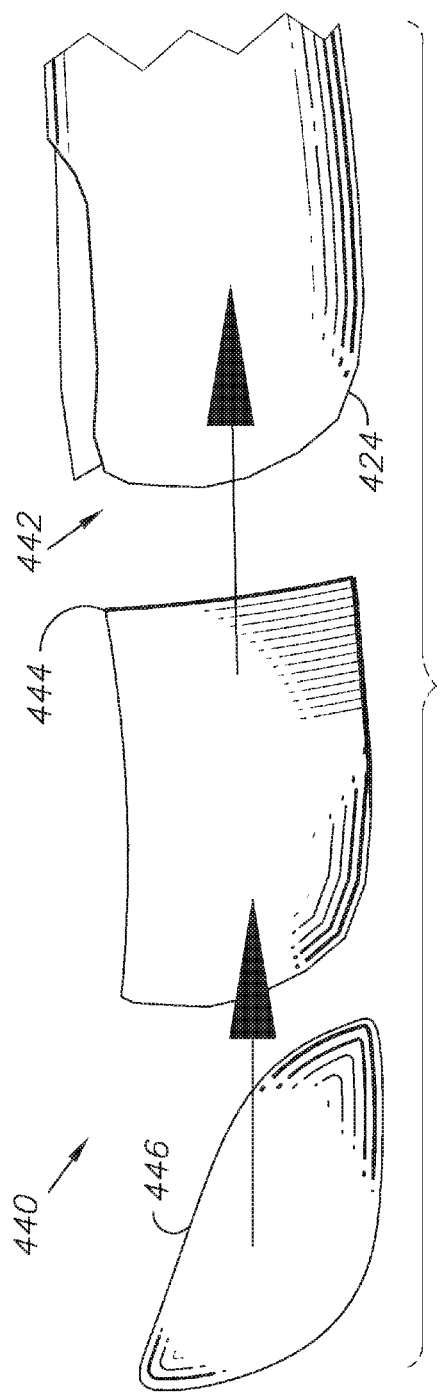

FIGS. 21-23 show another alternative aspect of the present invention comprising a glucometer training system 420 with a soft, protective gel or latex pad 422 placed on a volar portion 424 of the fingertip 426 with a bleb 428 placed on the pad 422. A suitable finger cot 430 can be placed over the pad 422 and the bleb 428, which is adapted for refilling with a syringe 432.

Figure 25:
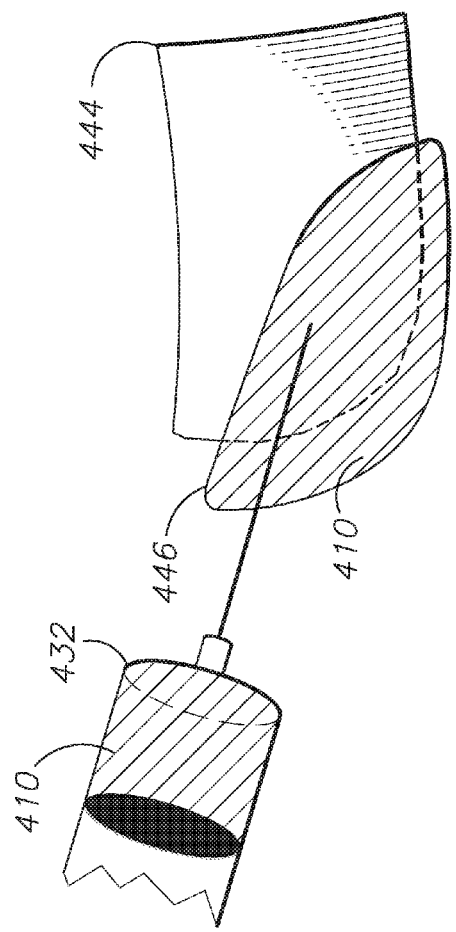
Figure 28:
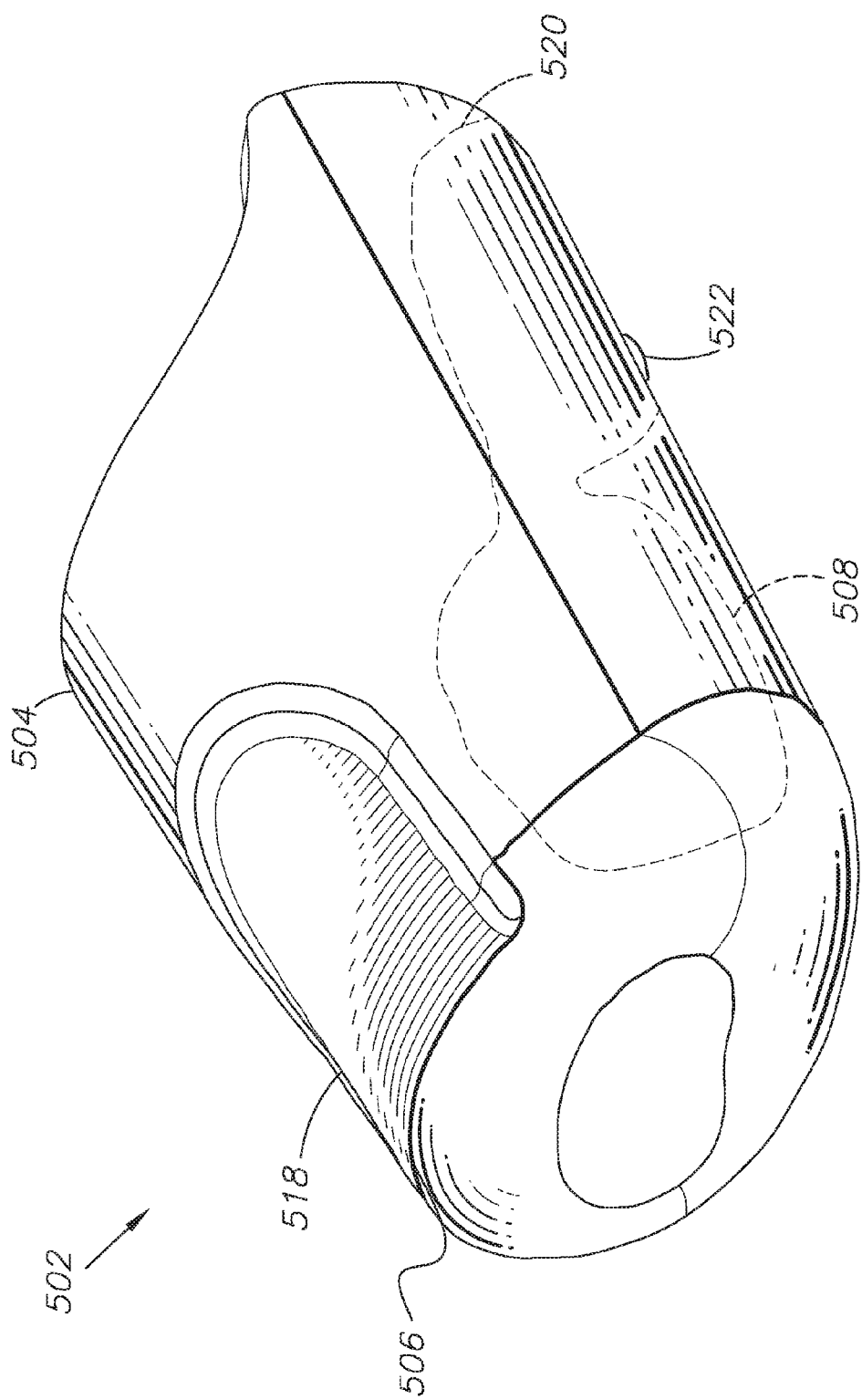
FIG. 28 shows a top, perspective view of an embodiment of a blood serum interface including a simulated finger with two fluid-holding blebs and a common fillable reservoir for training with a fluid analyzer.
Figure 29:
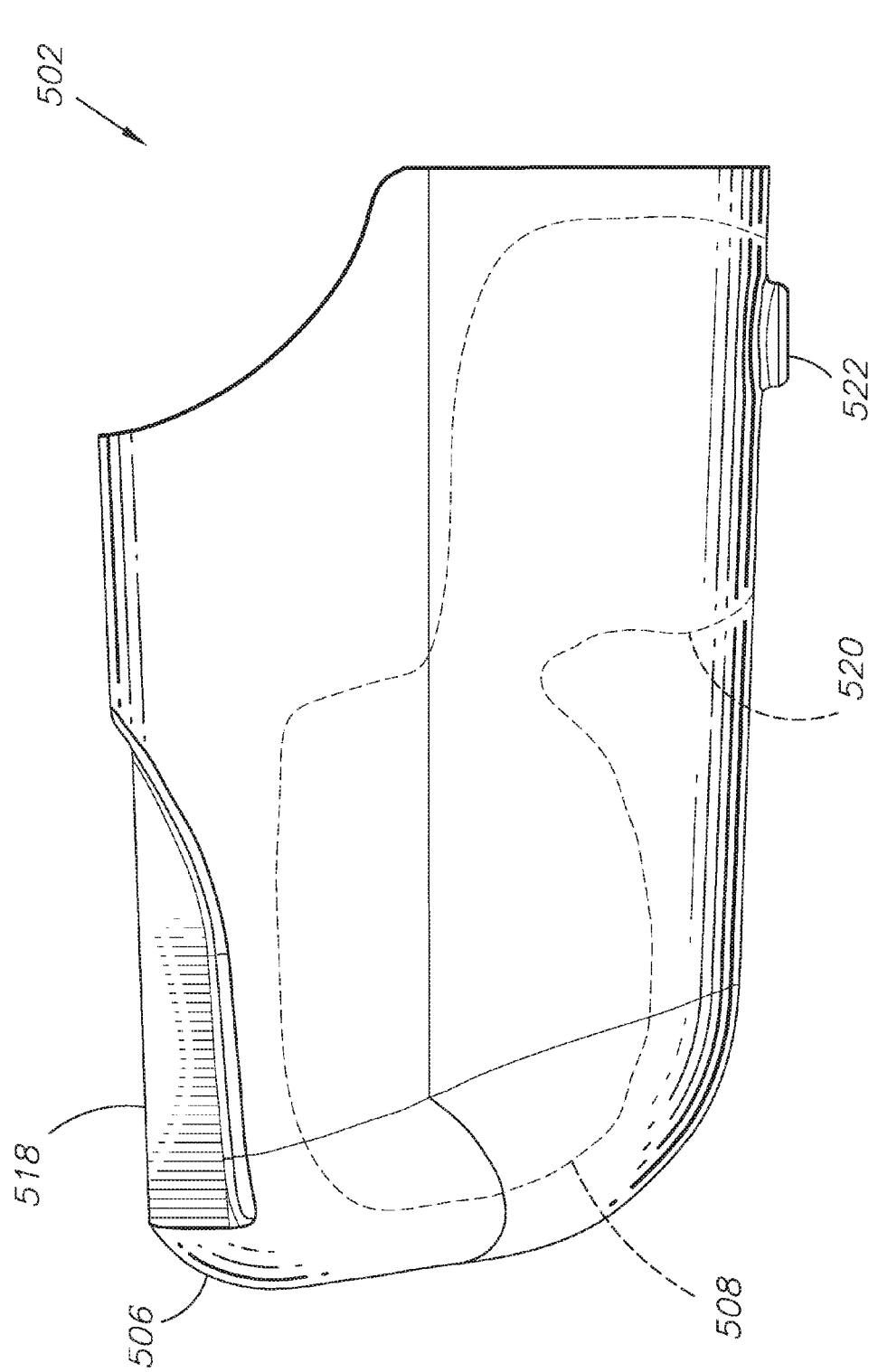
FIG. 29 is a side, elevational view of the blood serum interface including a simulated finger with two fluid-holding blebs and a common fillable reservoir.
Figure 30:
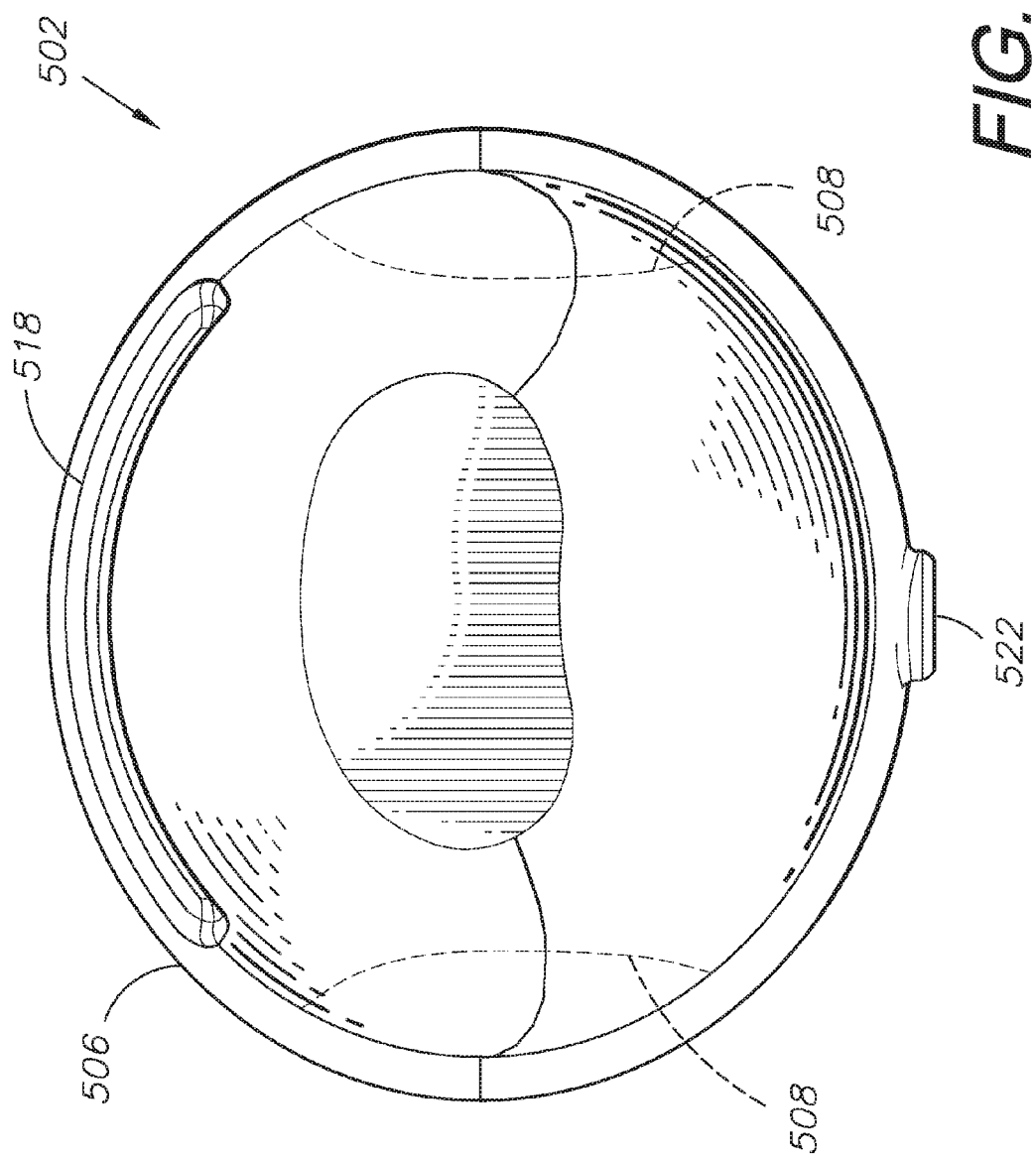
FIG. 30 is a front, elevational view of the blood serum interface including a simulated finger with two fluid-holding blebs and a common fillable reservoir.
Figure 31:
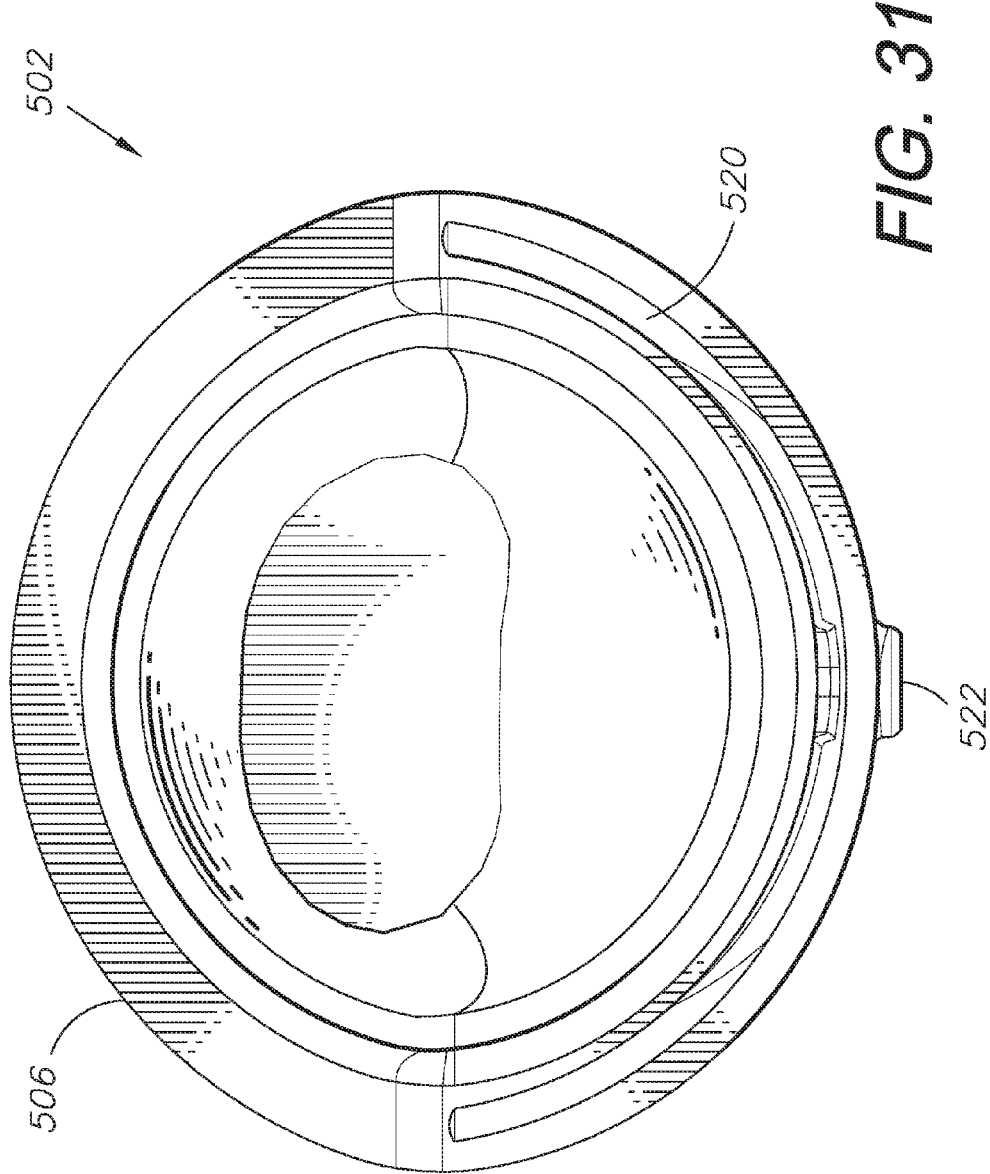
FIG. 31 is a back, elevational view of the blood serum interface including a simulated finger with two fluid-holding blebs and a common fillable reservoir.
Figure 32:
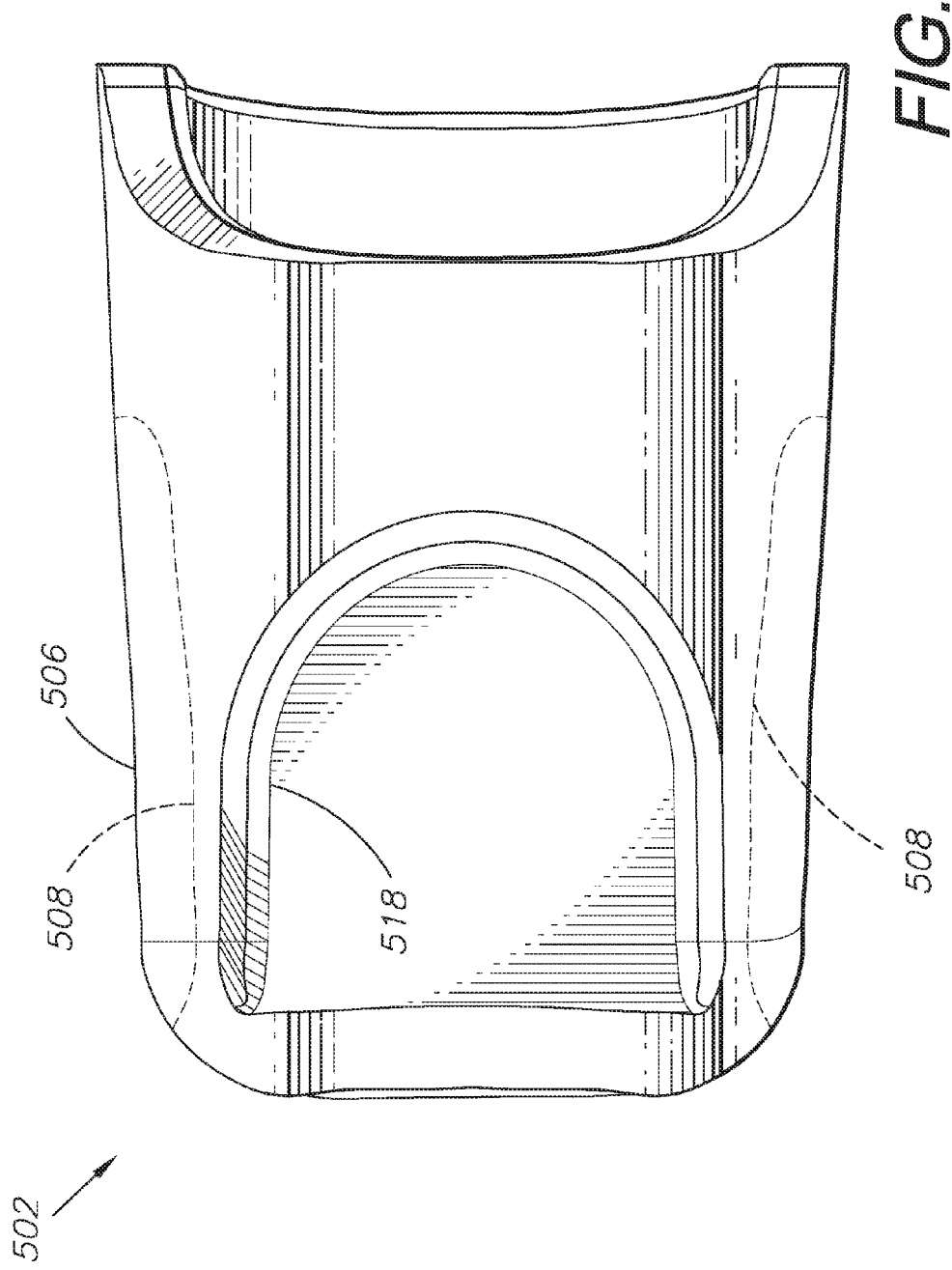
FIG. 32 is a top, plan view of the blood serum interface including a simulated finger with two fluid-holding blebs and a common fillable reservoir.
Figure 33:
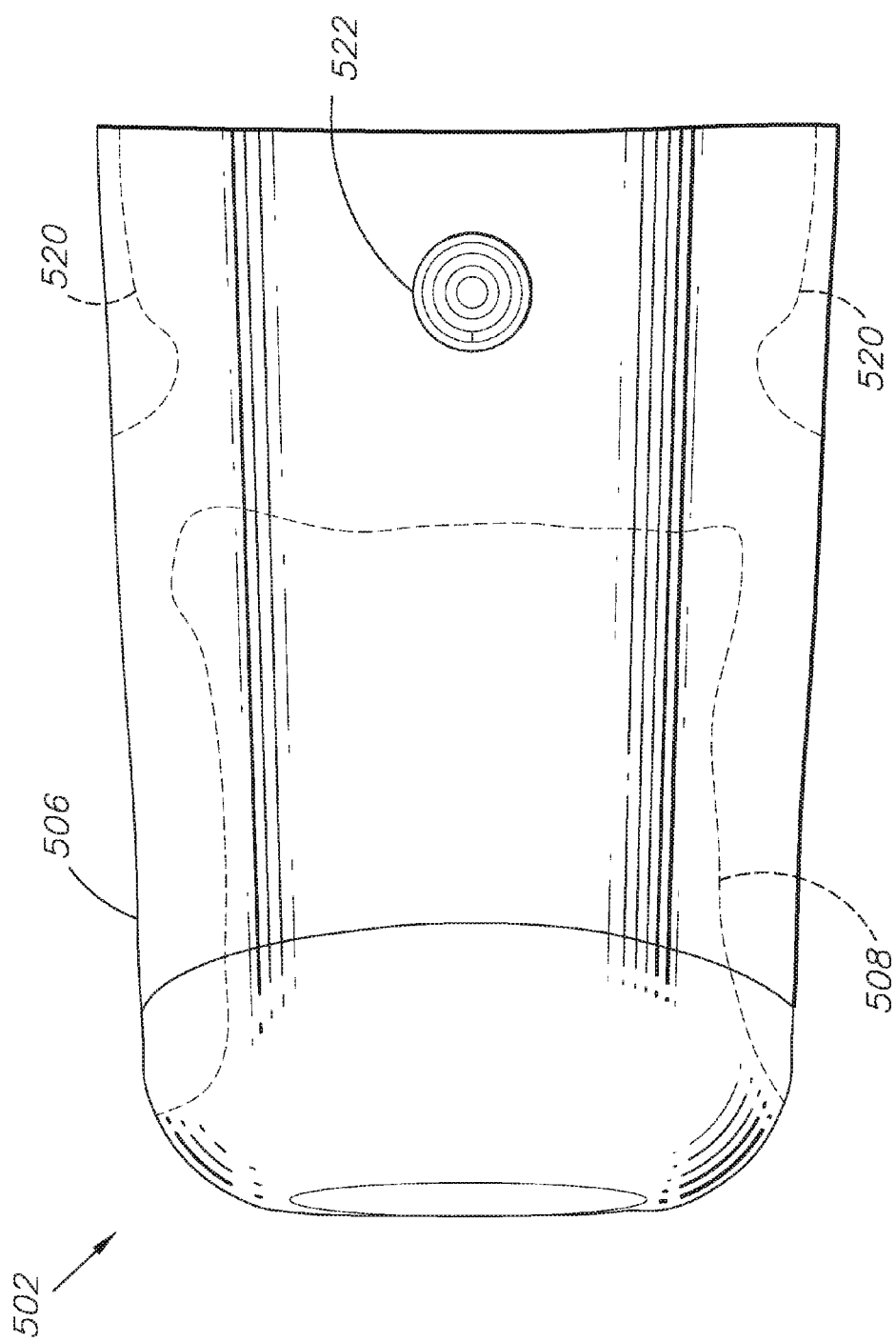
FIG. 33 is a bottom, plan view of the blood serum interface including a simulated finger with two fluid-holding blebs and a common fillable reservoir.

FIGS. 24-27 show another alternative aspect of the present invention comprising a glucometer training system 440 with a simulated fingertip 442 placed over an individual's fingertip, or used standalone. The simulated fingertip 442 is fitted with a pad 444, which is similar to the pad 422 described above. A bleb 446 is placed on the pad 444 and can be internally refilled with a syringe 432, as shown in FIG. 25. FIG. 26 shows the system 440 being placed on an actual fingertip. Optionally, a finger cot 430 can be placed over the system 440.

FIGS. 28-36a show an alternative embodiment of a glucometer simulation and training system 502 including a patient, a blood serum interface 504, and an analyzer. The patient may be an individual or a mannequin, and at least one of the patient's fingers is required for the glucometer simulation and training system 502. The analyzer may be a glucometer such as the portable example shown at 202, a computer programmed to simulate fluid analysis, or another type of fluid analyzer.

In this embodiment, the blood serum interface 504 includes a simulated finger 506 configured to hold semi-viscous fluid simulating blood and to slide over a simulated patient or mannequin's finger 526. The simulated finger 506 is preferably made of flexible, flesh-like material that is capable of sealing itself after puncture. In this embodiment, a protective shield 534 may optionally be placed on the patient/subject's finger 526 prior to sliding the simulated finger 506 over the patient/subject's finger 526 to provide protection from cuts. The protective shield 534 may be made of metals, hard plastics, and/or other materials capable of protecting a finger from being cut, and preferably, the protective shield 534 snaps around the patient/subject's finger 526. Alternatively, the protective shield may be built into the inside of the simulated finger 506 to protect the actual or mannequin finger 526.

In this application, finger joint is synonymous with knuckle. Additionally, anatomical terms are given their usual meanings. For example, when referring to the hand, dorsal means the top, or back, of the hand, and ventral means the bottom, or palm side, of the hand. Proximal means closer to the trunk of the body, and distal means further from the trunk of the body. So, in reference to a finger, distal is closer to the fingertip, and proximal is closer to the palm and back of the hand. There are two bones that make up the human forearm: the radius and the ulna. With palms facing towards the back of the body, the radius is closer to the torso, and the ulna is further from the torso. The terms radial and ulnar are references to the proximity to the radius and ulna bones, respectively. Thus, with palms facing back, the radial side of a hand or finger is the inside, and the ulnar side is the outside. The bones that make up the fingers are called phalanges, and a single finger bone is called a phalanx. The distal phalanges are the bones from fingertips to the most distal knuckles, the intermediate phalanges are bones between the most distal knuckles and the middle knuckles, and the proximal phalanges are the bones between the middle knuckles and the most proximal knuckles. The most distal knuckle of each finger, between the distal phalanx and the intermediate phalanx, is called the distal interphalangeal ("DIP") joint. The middle knuckle, between the intermediate phalanx and the proximal phalanx, is called the proximal interphalangeal ("PIP") joint. The most proximal knuckle is called the metacarpophalangeal ("MCP") joint. It is preferable for the simulated finger 506 to extend at least as long as halfway between the DIP and PIP joints of the finger, or halfway across the intermediate phalanx. Extension of the simulated finger 506 beyond the DIP joint helps ensure that the simulated finger 506 will stay on the patient/subject's finger 526 when the finger 526 is handled by a student or trainee.

Preferably, the simulated finger 506 has a nail-like indention 518 on its dorsal side or an open nail portion showing the patient/subject's nail underneath. This nail-like indention 518 or open nail portion gives the simulated finger 506 a more anatomically correct look, and more importantly, it helps with placing the simulated finger 506 on the patient/subject's finger 526 and using the simulated finger 506 in the proper orientation. FIGS. 28-36 show an embodiment of the simulated finger 506 having a nail-like indention 518. The simulated finger 506 can be placed on any finger 526 of a mannequin or simulated patient, with the middle (3rd) finger or ring (4th) finger being the preferred placement. Different sizes of simulated fingers 506 may be utilized to better fit different finger sizes.

Figure 34:
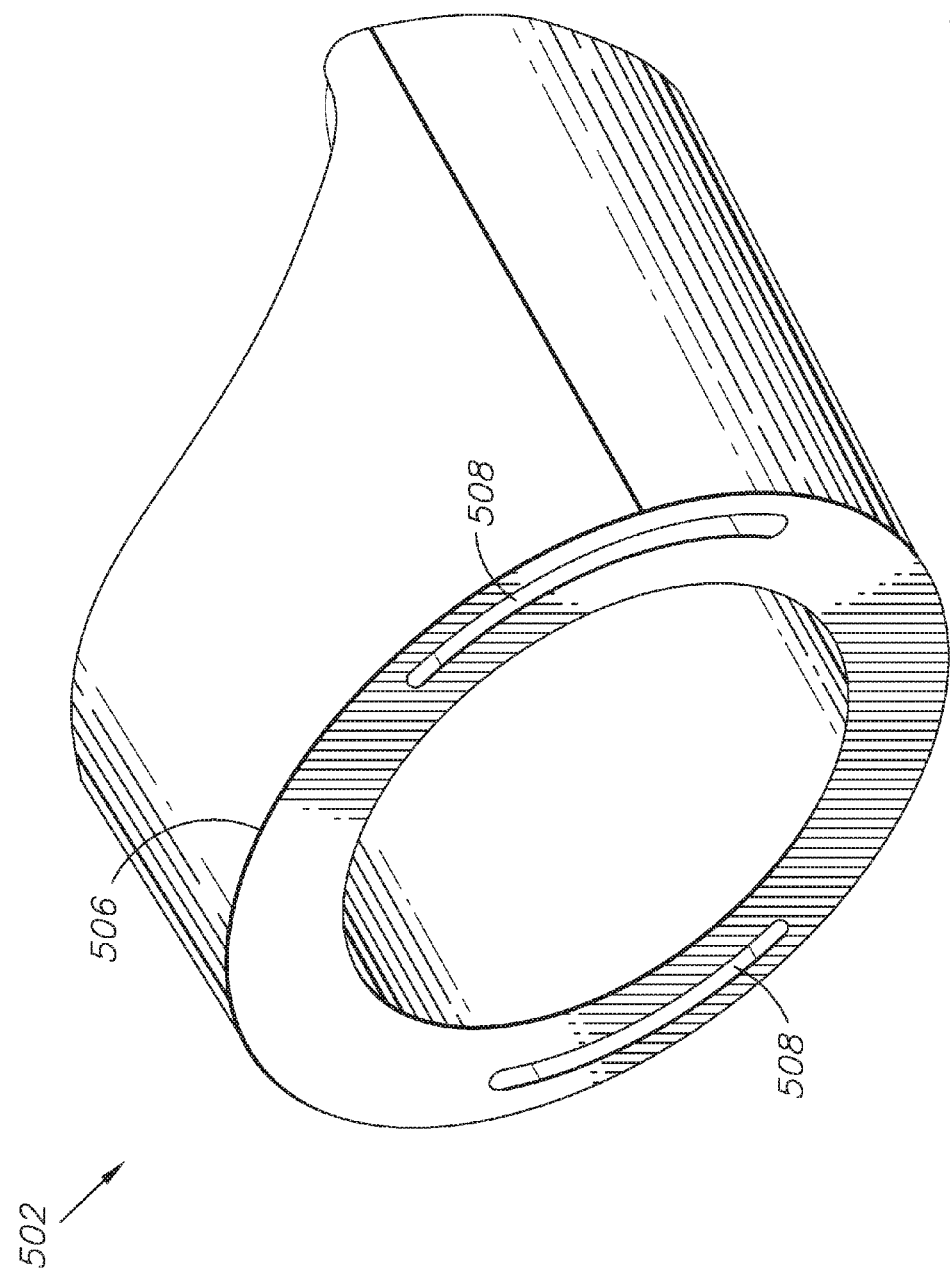
FIG. 34 is an XY-plane cross-sectional, top, perspective view of the back portion of the blood serum interface including a simulated finger with two fluid-holding blebs and a common fillable reservoir.
Figure 35:
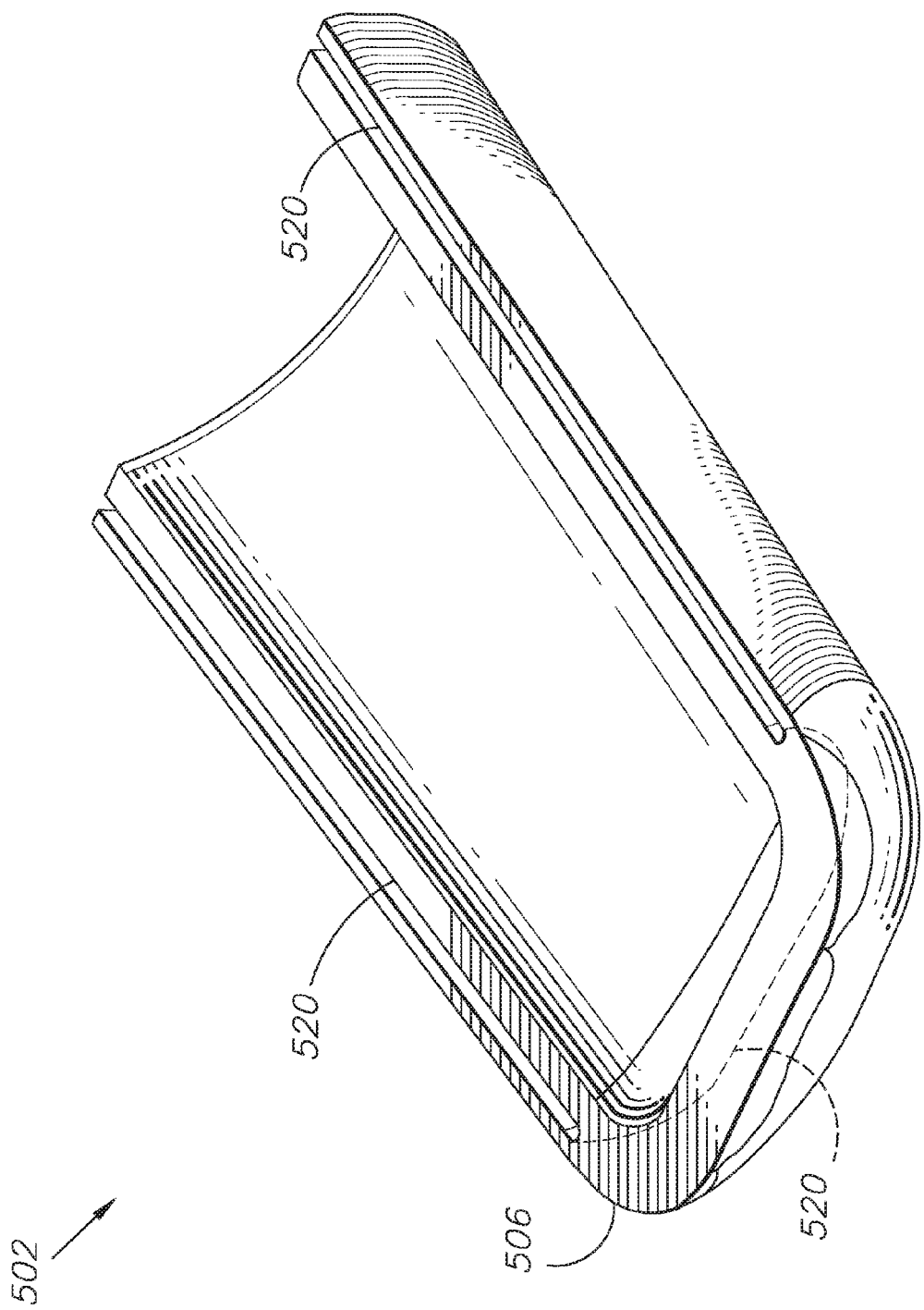
FIG. 35 is a XZ-plane cross-sectional, top, perspective view of the bottom portion of the blood serum interface including a simulated finger with two fluid-holding blebs and a common fillable reservoir.
Figure 36:
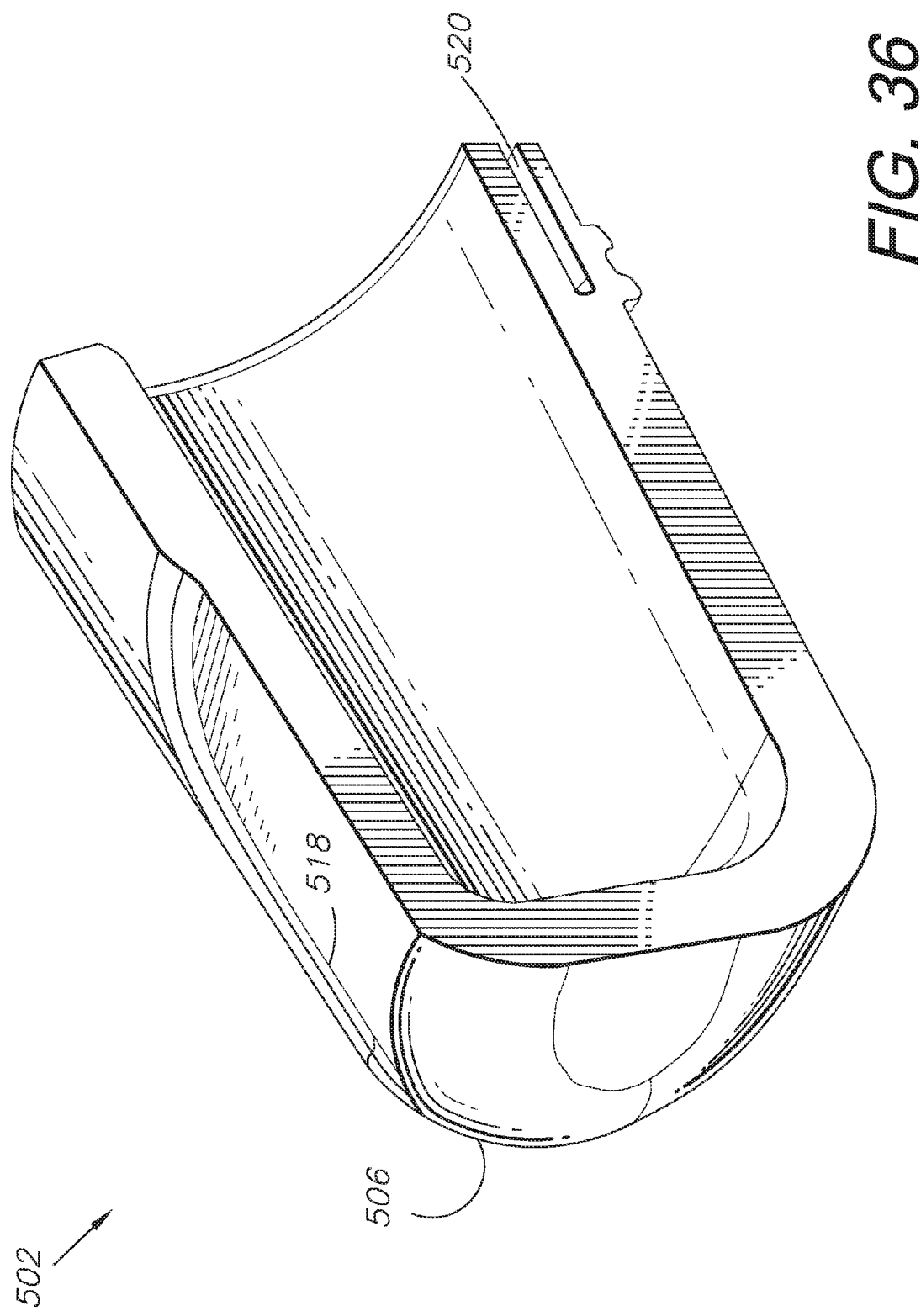
FIG. 36 is a YZ-plane cross-sectional, top, perspective view of one side of the blood serum interface including a simulated finger with two fluid-holding blebs and a common fillable reservoir.
Figure 38:
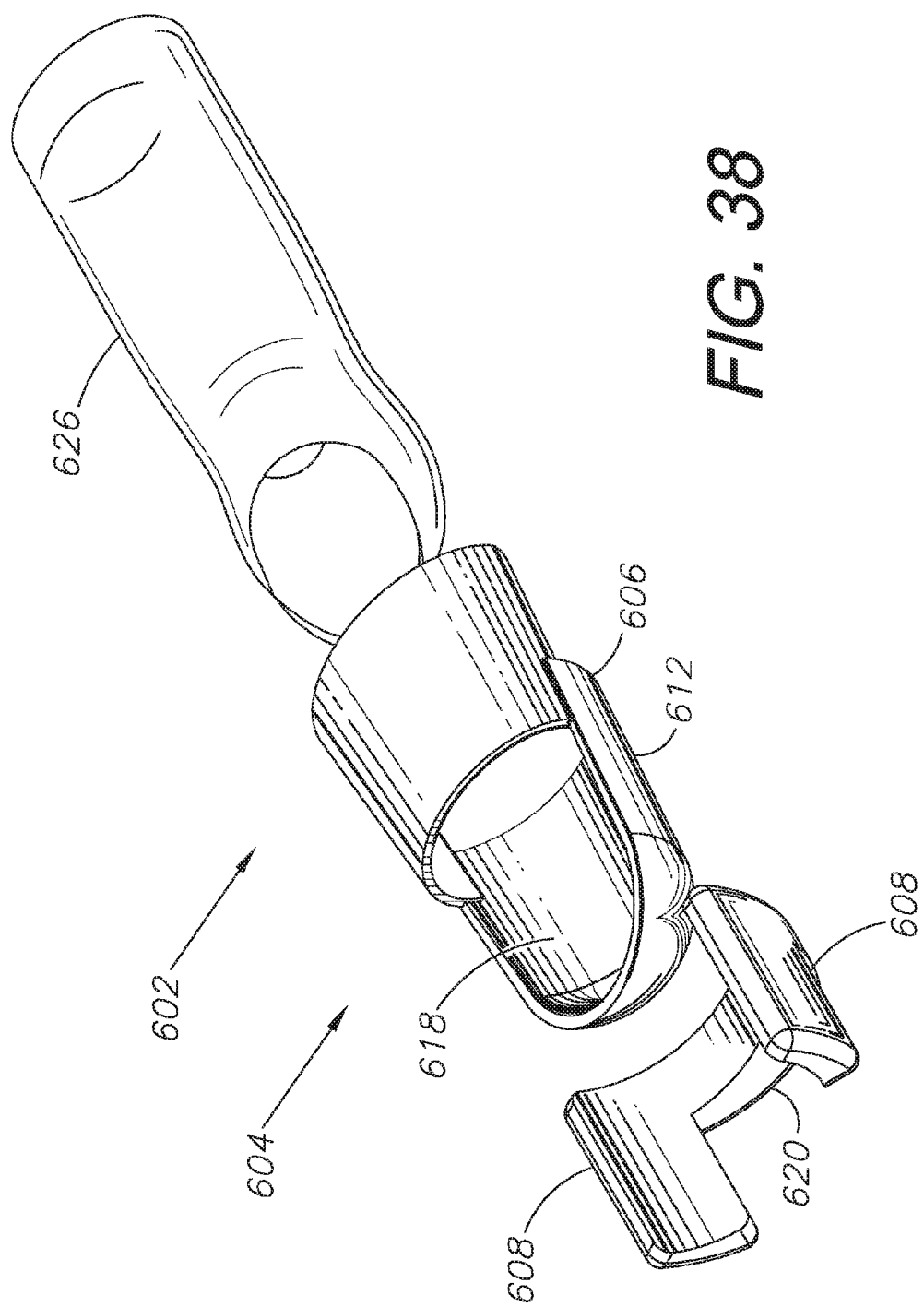
Figure 39:
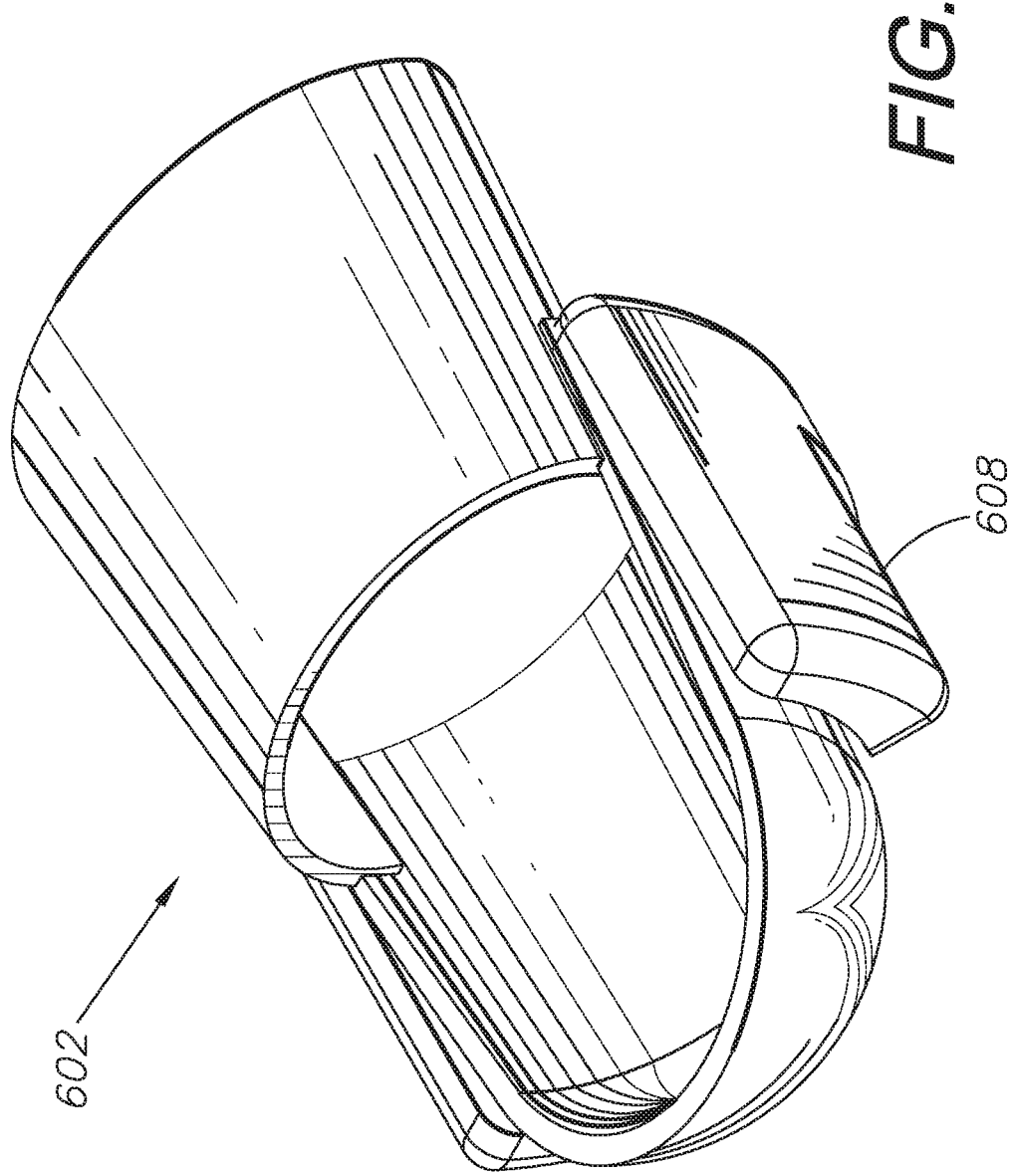
Figure 40:
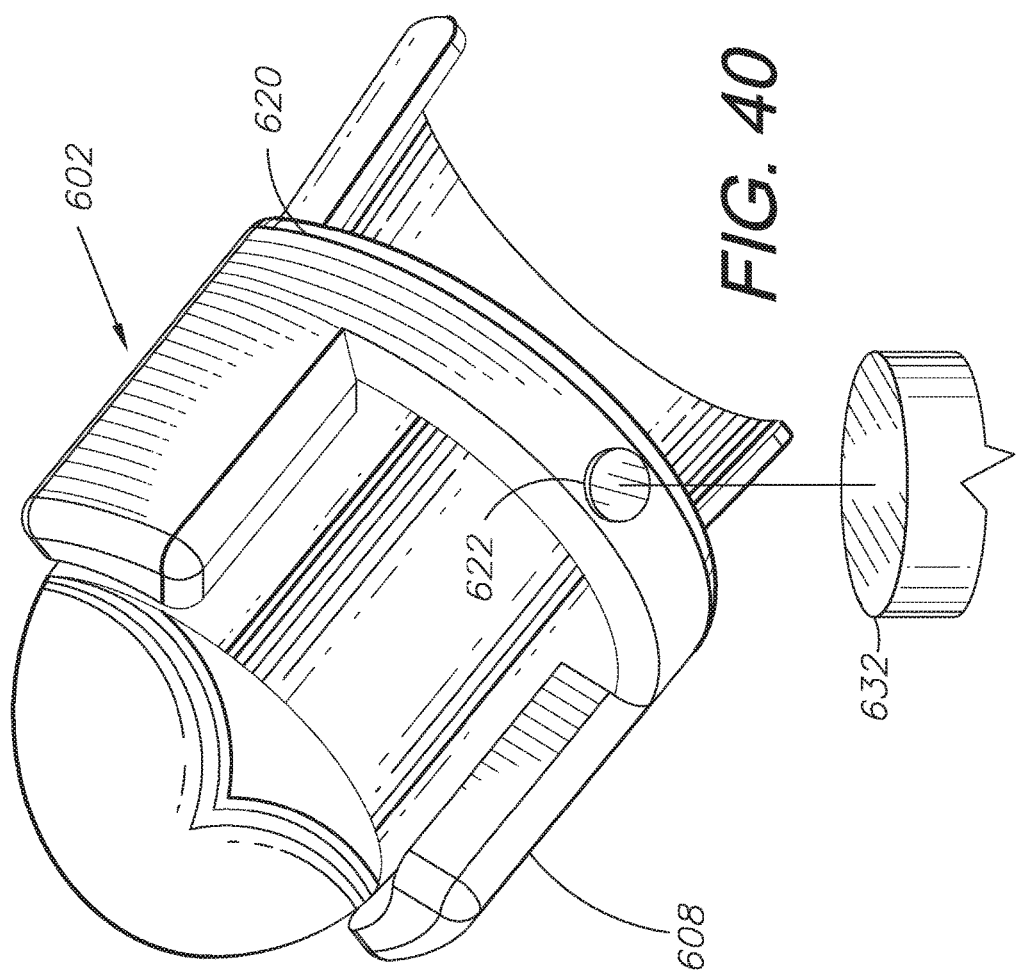
Figure 41:
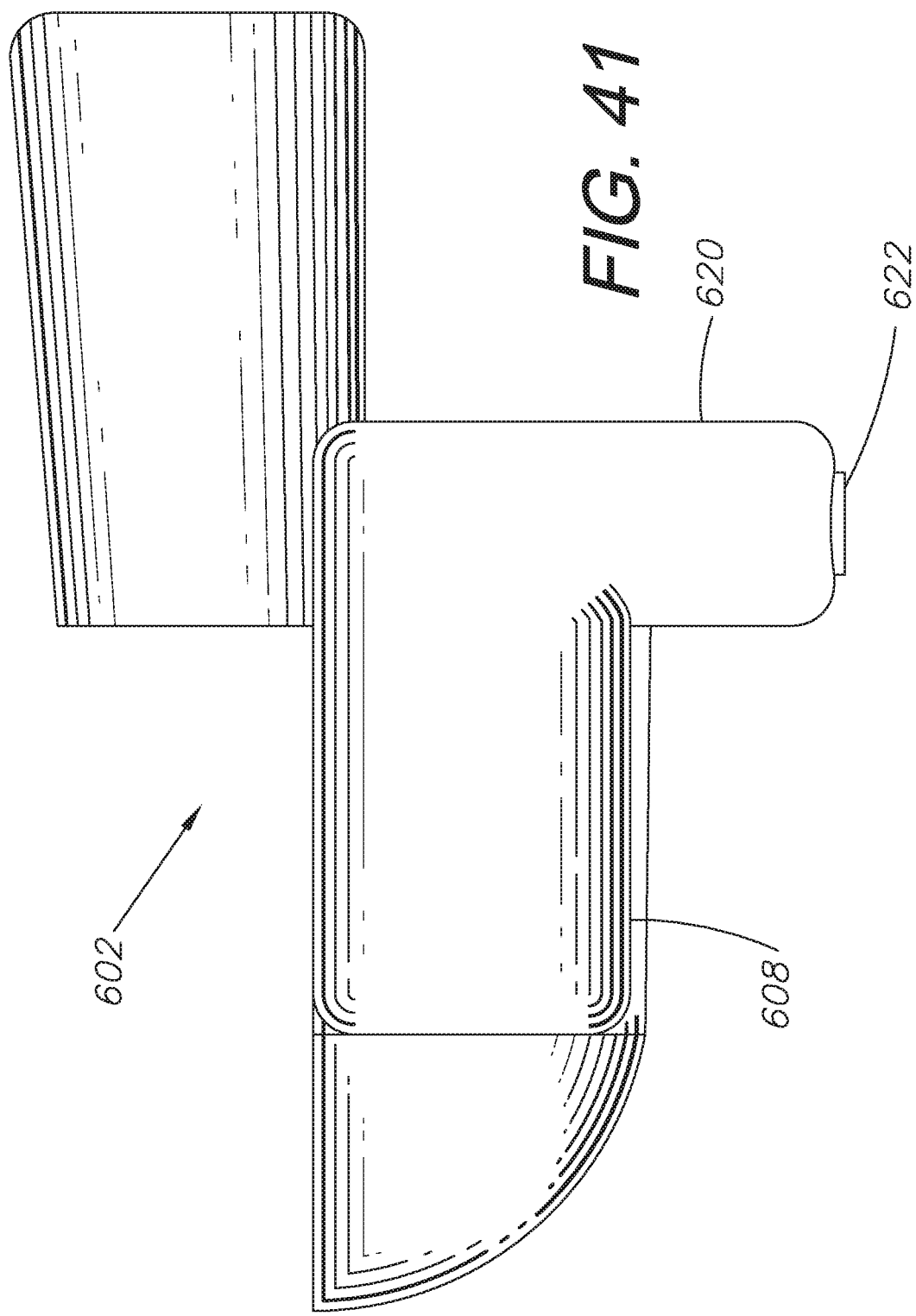
Figure 42:
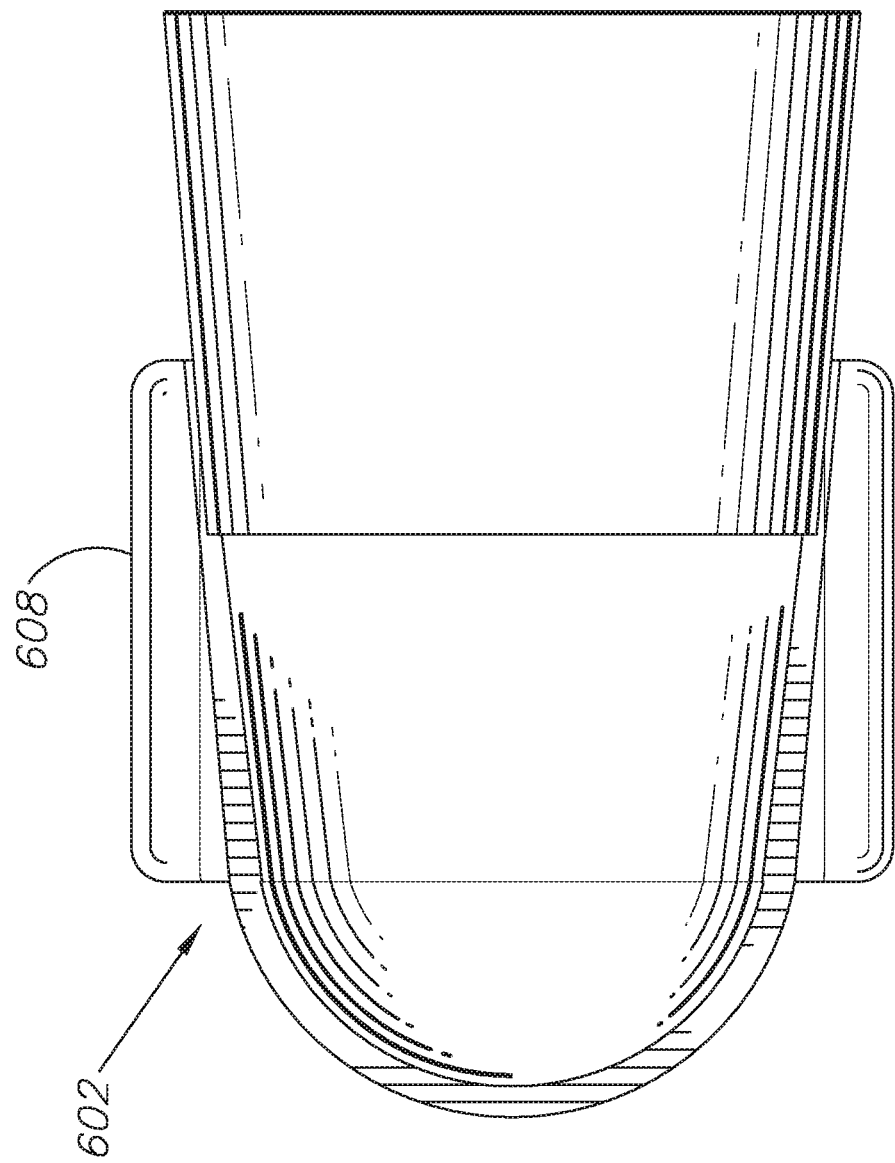
Figure 43:
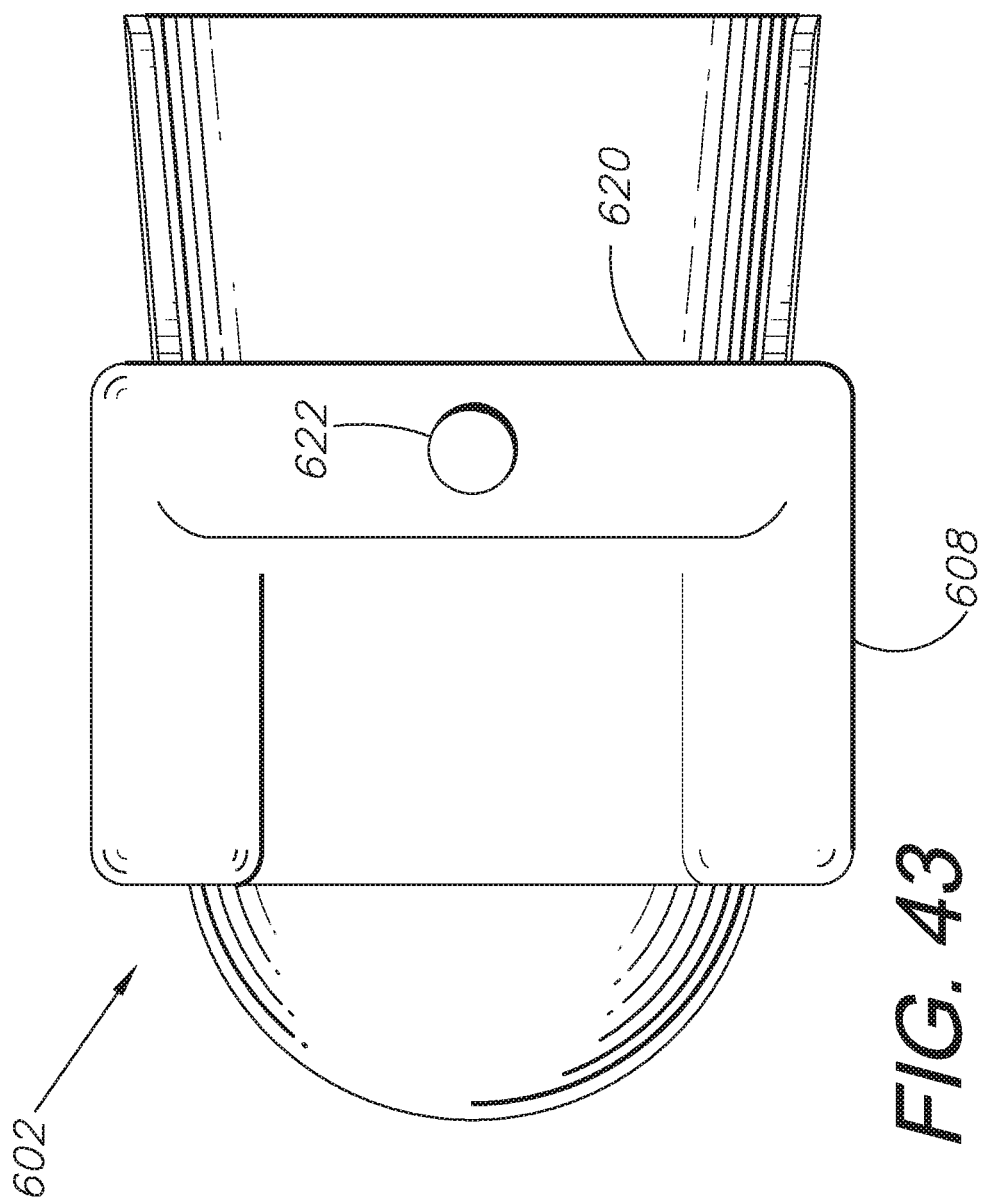
Figure 44:
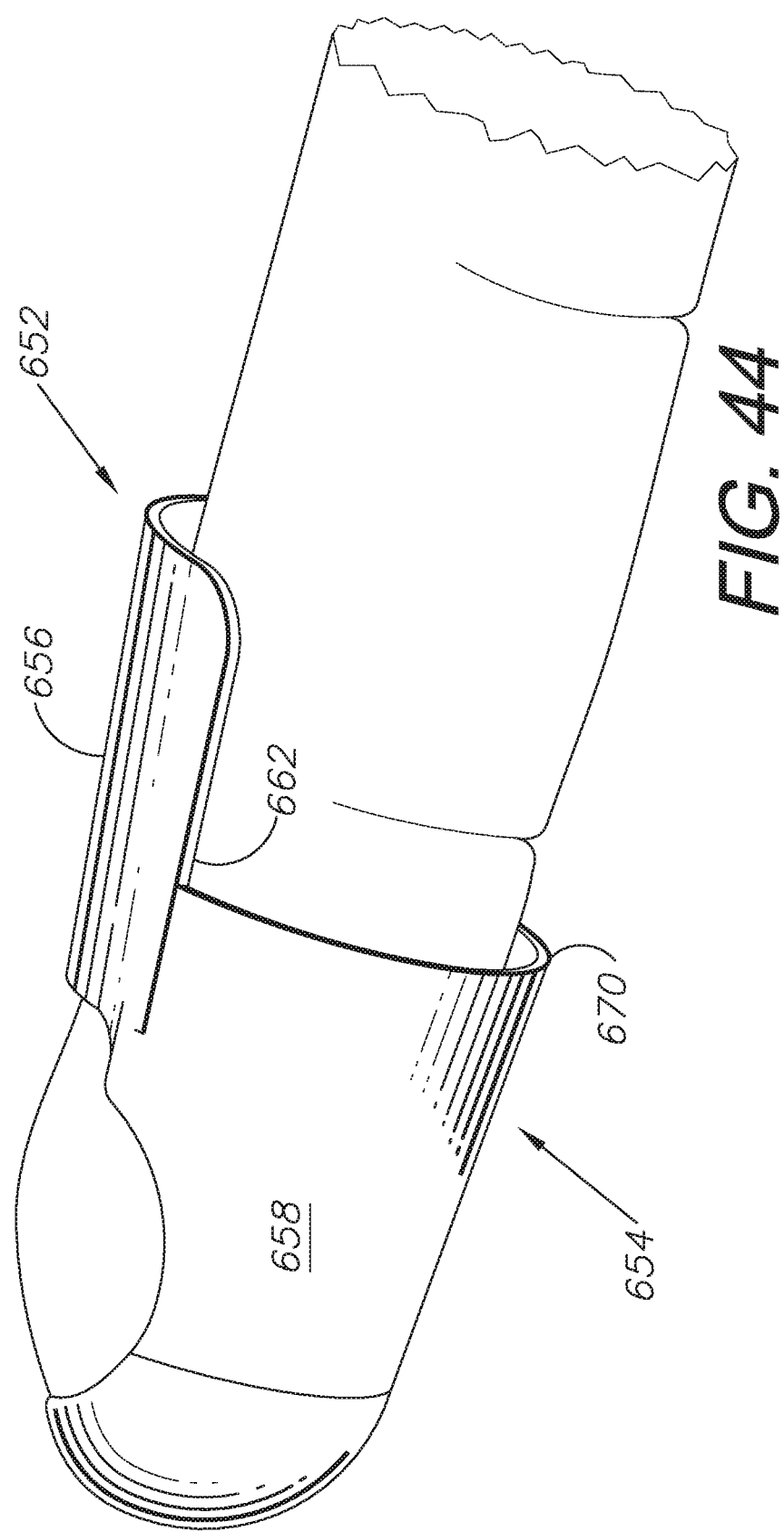
FIGS. 44-49 show another modified embodiment of a blood serum interface.
Figure 45:
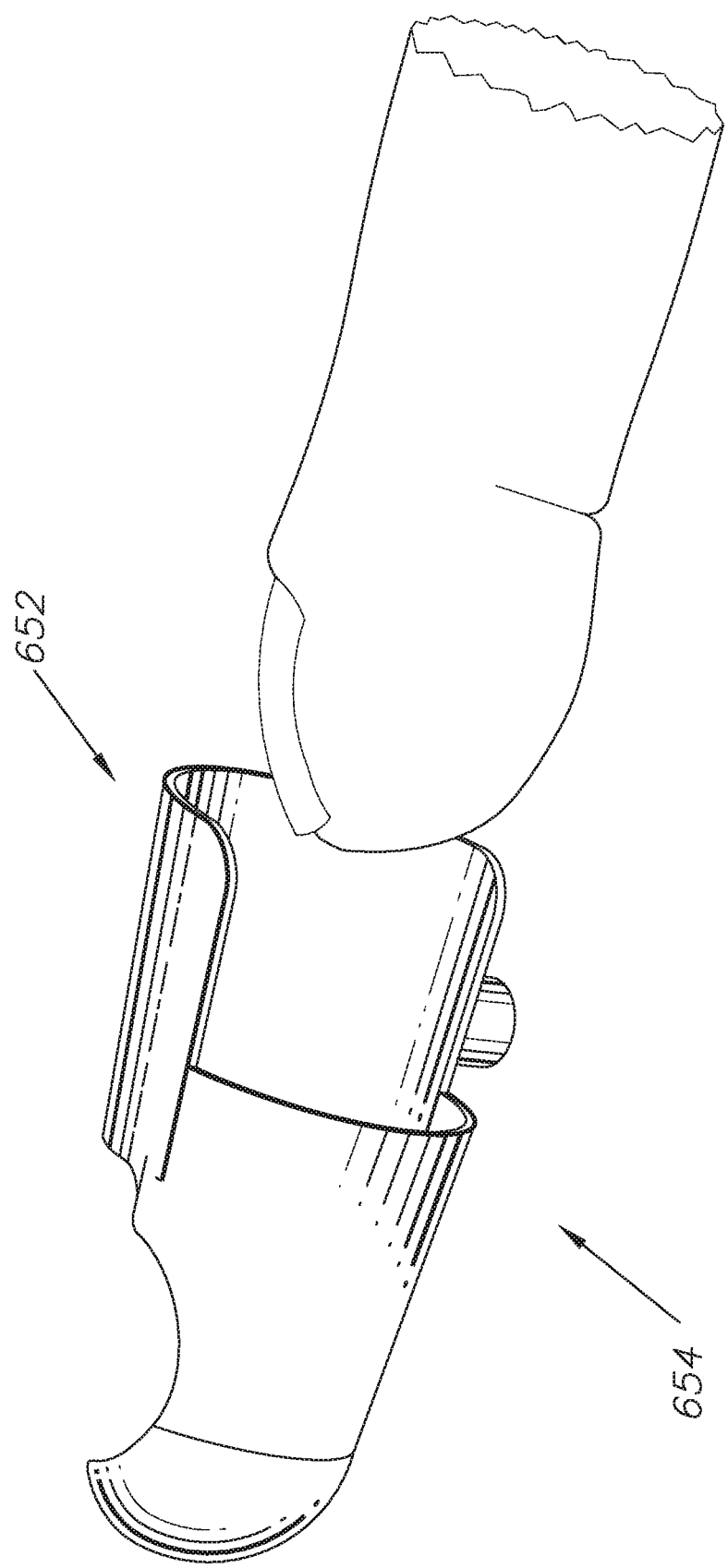
Figure 46:
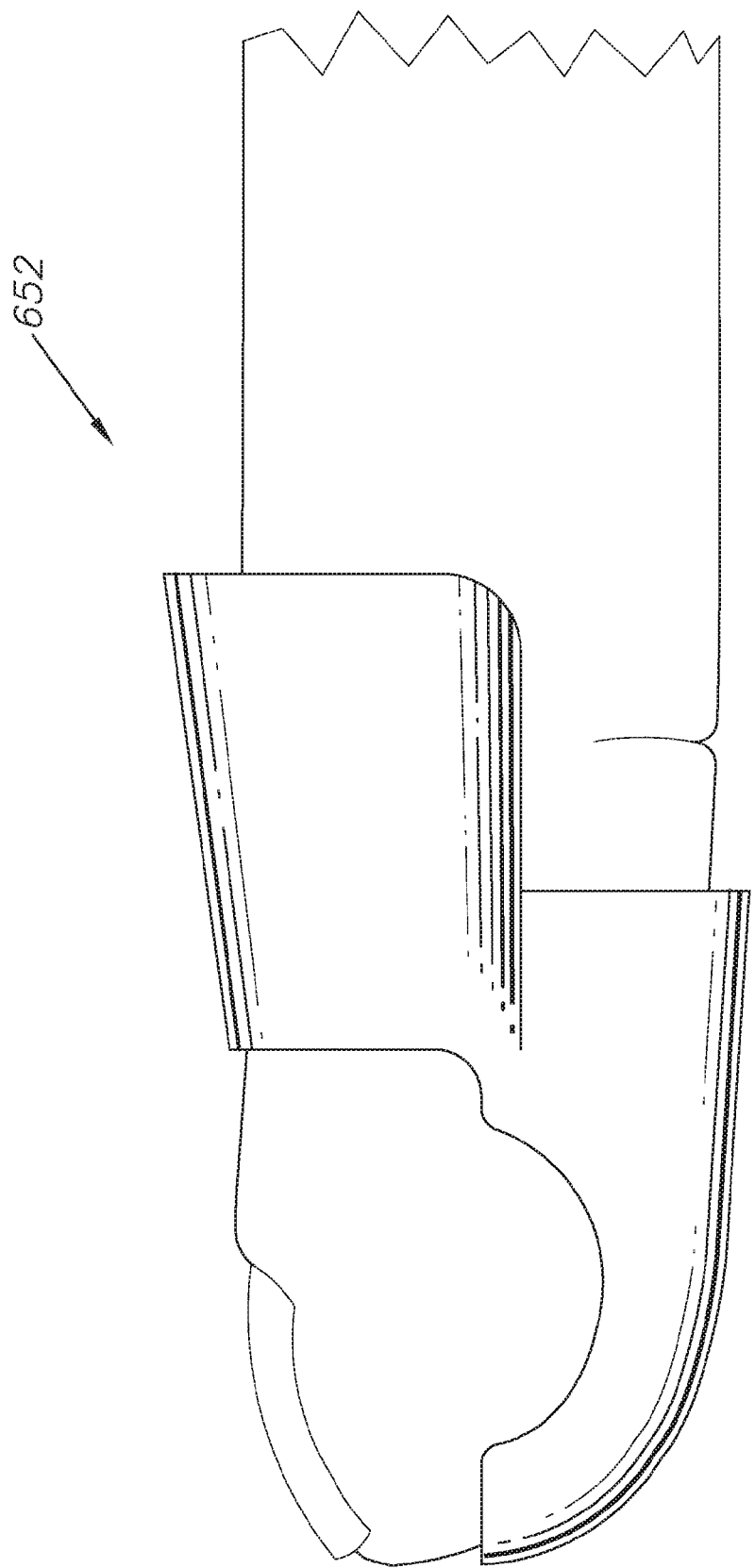
Figure 47:
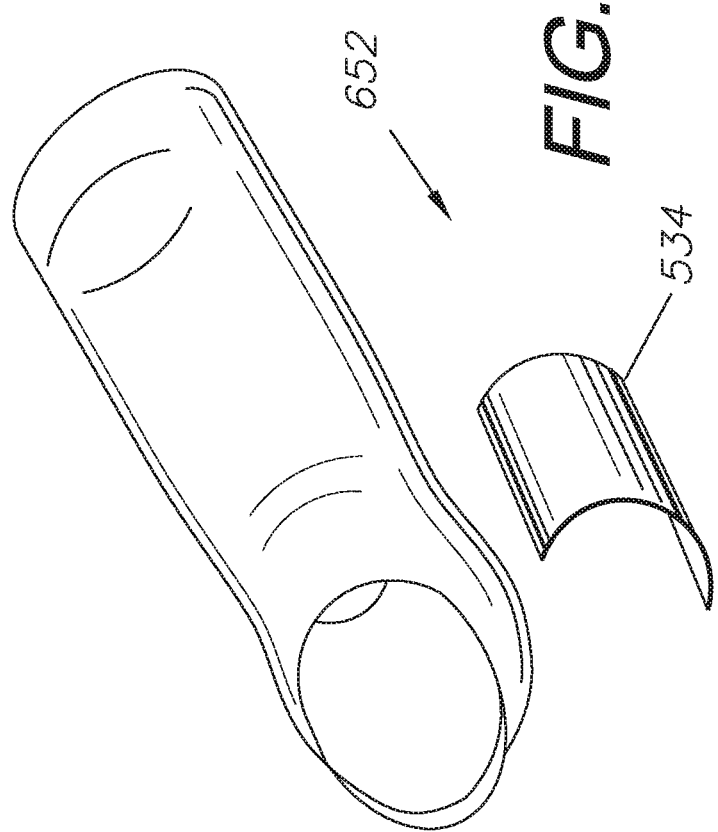
Figure 48:
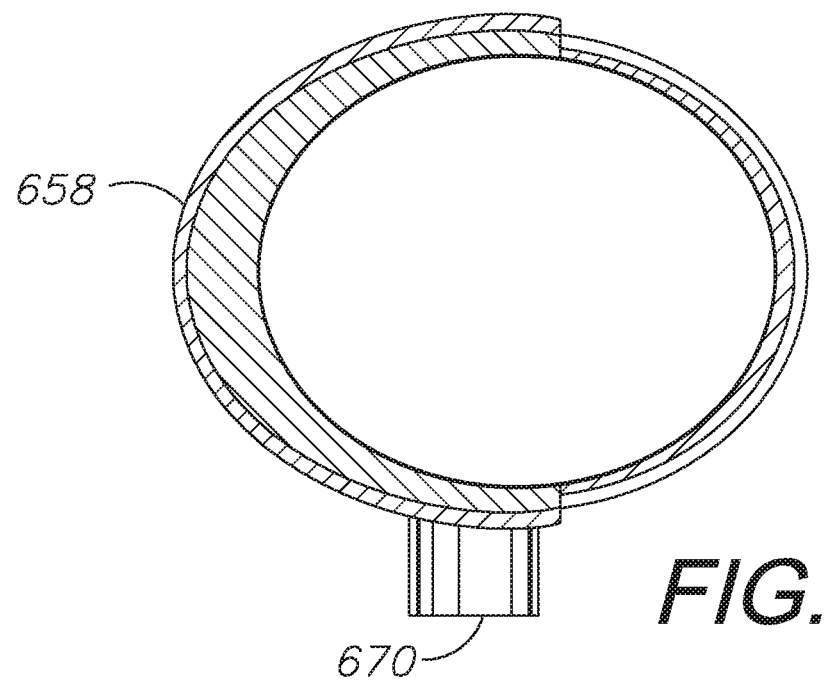
Figure 49:
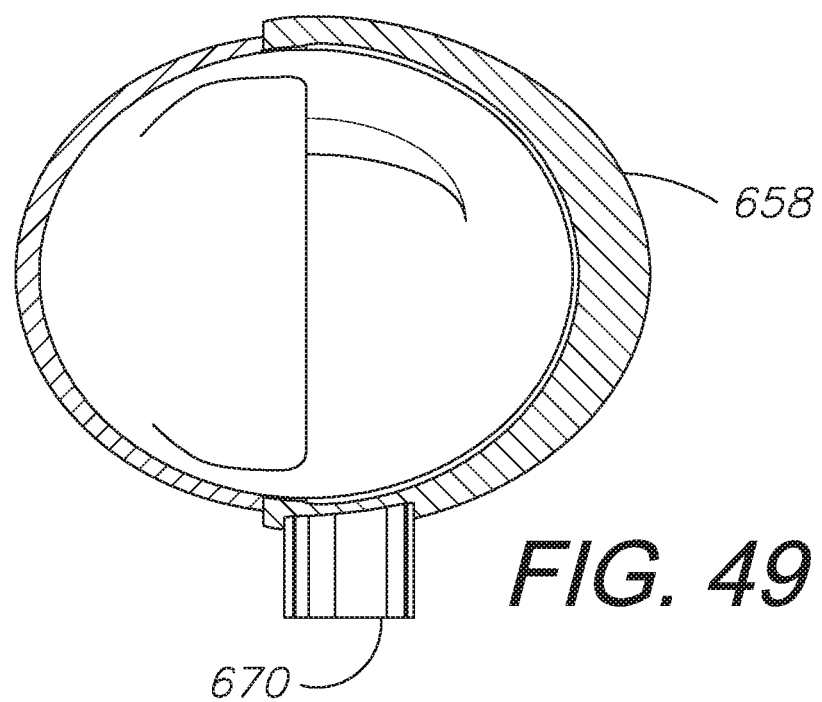

The simulated finger 506 includes a bleb 508, or stick site, below the nail on each of the radial and ulnar sides of the simulated finger 506. A bleb 508 is a cavity or receptacle configured to hold semi-viscous fluid to simulate blood. These blebs 508 cover a large portion of each of the radial and ulnar sides of the distal phalanx. In this embodiment, the blebs 508 are formed within the simulated finger 506. FIG. 34 shows a cross-sectional view of the blebs 508. The two blebs 508 share a common reservoir 520 configured to be filled with blood serum 510. After the common reservoir 520 is filled with simulated blood serum, blood serum can be pushed into the blebs 508 by applying pressure to the reservoir 520. The common reservoir 520 may be configured for injection with a syringe, or the reservoir 520 may be capable of filling via IV connectors, Leur-Lok hub connectors, or other tubing or bladder connectors. The common reservoir 520 may or may not have a specific fill site 522, and the common reservoir 520 could either be placed on the dorsal side or the ventral side of the simulated finger 506. FIGS. 28-36 show an embodiment including a common reservoir 520 on the ventral side of a simulated finger 506. This embodiment also has a fill site 522 for filling the reservoir 520 with blood serum. FIGS. 35 and 36 are cross-sectional views of the simulated finger 506 showing the inside of the common reservoir 520.

Alternatively, the simulated finger could have just one bleb with a separate filling reservoir on the dorsal or ventral side of the simulated finger. Another alternative would be for the simulated finger to have two reservoirs, each leading to a separate bleb. With dual reservoirs, one bleb could be filled with a simulated blood serum having one set of characteristics, and the other bleb could be filled with a simulated blood serum having a different set of characteristics.

In real practice, when using a glucometer to test blood-glucose levels, a patient or subject's finger is pricked with a lancet on the side of the finger in order to avoid nerve damage to the finger and to minimize pain. Thus, a glucometer training system 502 with stick sites 508 on the sides of the finger provides an anatomically correct simulation for training medical professionals and patients, such as those having diabetes.

The simulated blood fluid can include appropriate physiological composition characteristics, such as blood-sugar levels for glucose testing with a glucometer. Alternatively, the fluid, or simulated blood serum, can be inert with characteristics preprogrammed and simulated by a computer 6. To simulate testing blood glucose levels, an instructor can fill the common reservoir 520 with blood serum and apply pressure to the reservoir 520, filling the two blebs 508 with blood serum. A protective shield 534, optionally, and the simulated finger 506 can be placed on a patient or mannequin's finger 526 either before or after applying pressure to the reservoir 520 to fill the blebs 508. A student or trainee can then prick one of the blebs 508, or stick sites, with a lancet, extract a droplet of blood serum, and test the glucose level of the blood serum using a glucometer 202 or simulated glucometer. The simulated blood serum may include a sealant configured to seal off holes poked into the blebs 508, or the blood serum may include properties causing the blood serum to coagulate, or clot, around holes poked through the blebs 508.

For a simulated finger including two blebs with each having a separate fillable reservoir, the blebs could be filled with different simulated blood serums. The simulated finger can be placed on a patient/subject's finger, and a student or trainee can prick the radial side bleb with a lancet to test one of the fluids. The simulated finger can then be removed and placed on the corresponding finger of the patient/subject's other hand. The student or trainee can then prick the radial side bleb with a lancet to test the other fluid. Alternatively, the student or trainee can prick the ulnar side bleb for both tests, switching hands in between, to test the two different fluids, or the simulated finger could remain on the same finger with the student or trainee pricking the radial side bleb for one test and the ulnar side bleb for the other.

FIG. 36a shows an optional protective shield 534 with and outwardly-convex configuration adapted for placement over a finger. The shield 534 can comprise sheet metal, rigid plastic, puncture-resistant fabric or some other suitable puncture-resistant material. The shield 534 functions to avoid lacerating a test patient or mannequin if a lancet penetrates the interface 504. Alternatively, a suitable shield can be integrally formed with the interface 504.

FIGS. 37-43 show an alternative aspect of the present invention comprising a glucometer simulation and training system 602 with a patient, a blood serum interface 604, and an analyzer. The patient may be an individual or a mannequin, and at least one of the patient's fingers is required for the glucometer simulation and training system 602. The analyzer may be a glucometer such as the portable example shown at 202, a computer programmed to simulate fluid analysis, or another type of fluid analyzer.

The blood serum interface 604 in this embodiment includes a finger splint 606 with a layer of protective material 612 to protect a patient/subject's finger 626 and a membrane capable of forming blebs 608. The blebs 608 form adjacent to the protective layer 612 and are configured for holding semi-viscous fluid 610 simulating blood. The fluid 610 can include appropriate physiological composition characteristics, such as blood-sugar levels for glucose testing with a glucometer. Alternatively, the fluid, or simulated blood serum 610, can be inert with characteristics preprogrammed and simulated by a computer 6.

The protective layer 612 may consist of metals, hard plastics, and/or other materials capable of protecting a finger from being cut. Existing splints (e.g., DIP splints for ruptured extensor tendons, such as Stax-type splints) are readily available for use as a platform for adding simulated blood blebs. This embodiment of the blood serum interface 604 can be placed on any finger 626 of a mannequin or simulated patient, with the middle (3rd) finger or ring (4th) finger being the preferred placement. Different sizes of finger splints 606 may be utilized to better fit different finger sizes. It is important for the finger splint 606 to extend beyond the DIP joint of the patient/subject's finger 626 to help ensure that the interface 604 will stay on the finger 626 when the finger 626 is handled by a student or trainee. It is also preferable to have an open nail portion 618 or a nail-like indention on the finger splint 606 to make the simulation more anatomically correct and to aid in placing the finger splint 606 in the correct orientation on the patient/subject's finger 626. FIGS. 37-43 show an embodiment of the blood serum interface 604 having an open nail portion 618.

Preferably, the membrane is made of flexible, self-sealing material, capable of sealing itself after being punctured. In this embodiment, two blebs 608 form adjacent to the protective layer 612, one on the radial side and one on the ulnar side of the finger. The blebs 608 cover a large portion of the radial and ulnar sides of the distal phalanx, below the nail. In real practice, when using a glucometer to test blood-glucose levels, a patient or subject's finger is pricked with a lancet on the side of the finger in order to avoid nerve damage to the finger and to minimize pain. Thus, a glucometer training system 602 with blebs 608 on the side of the finger configured for being pricked with a lancet 614 provides an anatomically correct simulation.

In this embodiment, the two blebs 608 share a common reservoir 620 capable of being filled with simulated blood serum 610. The blebs 608 and common reservoir 620 may be adhered to the finger splint 606, or they may form a separate piece that clips over or attaches to the finger splint 606. Pressure can be applied to the common reservoir 620 to simultaneously fill both blebs 608 with fluid 610 from the reservoir 620. Placement of the common reservoir 620 can either be on the dorsal side or the ventral side of the finger splint 606. The common reservoir 620 can either be injectable with a syringe 632 or configured for filling with blood serum 610 via IV connectors, Leur-Lok hub connectors, or other tubing or bladder connectors. The common reservoir 620 may or may not have a specific fill site 622. FIGS. 37-43 show an interface 604 having a common reservoir 620 on the ventral side of a finger splint 606 with a fill site 622 for filling with simulated blood serum 610.

To simulate testing blood glucose levels, an instructor can fill the common reservoir 620 with simulated blood serum 610 and apply pressure to the reservoir 620 to fill the blebs 608 with blood serum 610. The finger splint 606 can be placed on a patient or mannequin's finger 626 either before or after applying pressure to the reservoir 620 to fill the blebs 606 with blood serum 610. A student can then prick a bleb 608 with a lancet 614, extract a droplet 616 of blood serum 610, and test the glucose level of the blood serum 610 using a glucometer 202 or simulated glucometer. The simulated blood serum 610 may include a sealant configured to seal off holes poked into the blebs 608, or the blood serum 610 may include properties causing the blood serum 610 to coagulate, or clot, around holes poked through the blebs 608.

Alternatively, a variation of the glucometer simulation and training system 652 could include a blood serum interface 654 with just one bleb 658 and a separate filling reservoir 670. In an embodiment having one bleb 658 with a separate filling reservoir 670, the layer of protective material 662 may only cover the side of the patient/subject's finger 626 which mounts the bleb 658, leaving the other side of the distal phalanx open, as shown in FIGS. 44-49. This embodiment would also include hard material on the opposite side of the finger 626 from the bleb 658 to provide a cantilever effect for the interface 654. This embodiment could be achieved by attaching a bleb 658 with a fillable reservoir 670 to the bottom of a Stax-type splint 656, and placing the splint 656 on a patient/subject's finger 626 turned 90 degrees. By turning the splint 656 sideways, the bleb 658 is located on the side of the patient/subject's finger 626 while still having at least part of the patient/subject's fingernail visible, making the simulation more anatomically correct.

Figure 50:
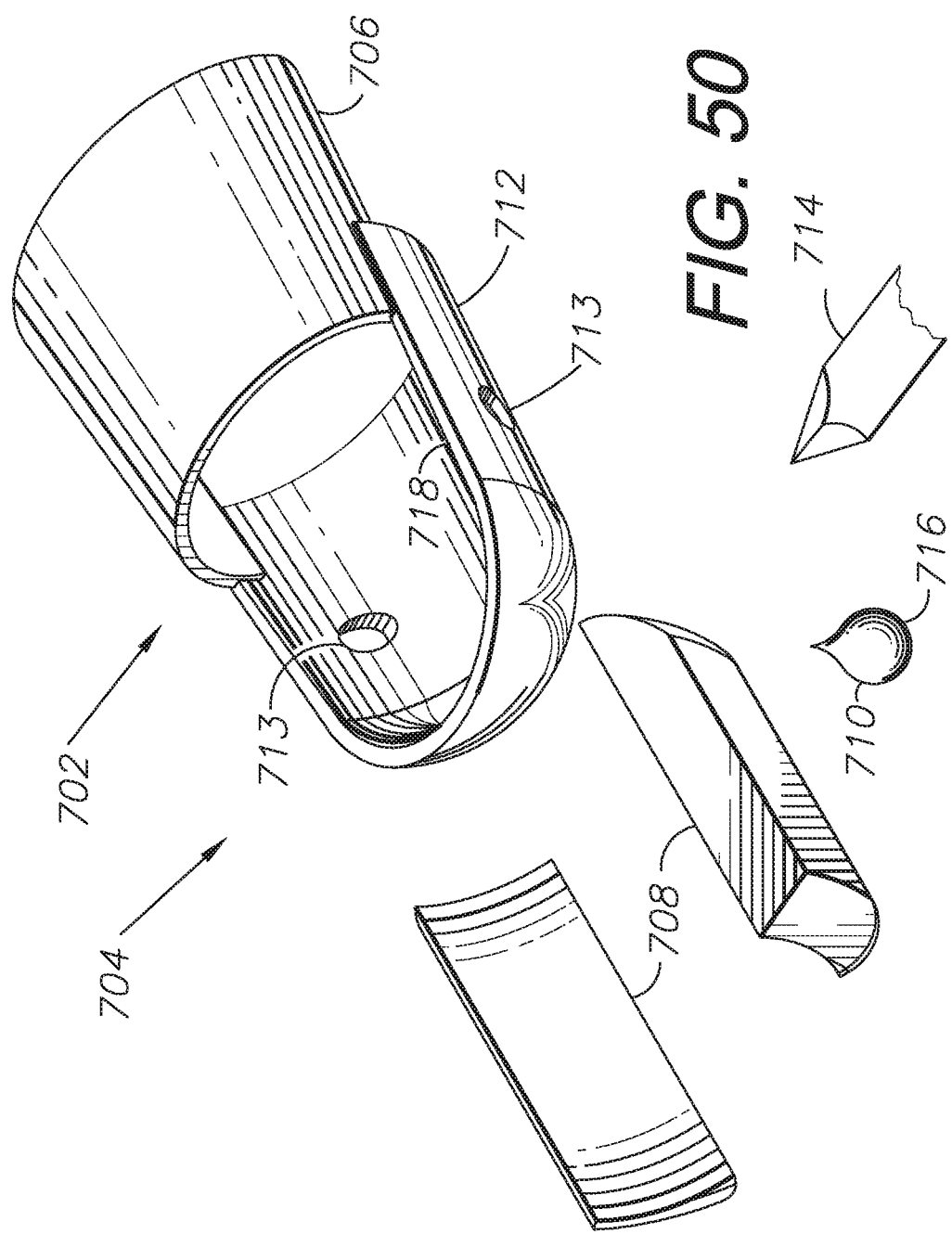

Another embodiment of a glucometer simulation and training system 702, shown in FIGS. 50-52, includes a patient, a blood serum interface 704, and an analyzer. The patient may be an individual or a mannequin, and at least one of the patient's fingers is required for the glucometer simulation and training system 702. The analyzer may be a glucometer such as the portable example shown at 202, a computer programmed to simulate fluid analysis, or another type of fluid analyzer.

This embodiment of a blood serum interface 704 includes a finger splint 706 with a layer of protective material 712. The interface 704 also includes a membrane adhered to the inside and to the ventral side of the finger splint 706 with an unadhered portion of the membrane on each of the radial and ulnar sides of the finger splint 706. The unadhered portions of the membrane are configured to form blebs 708 capable of holding semi-viscous fluid 710 simulating blood. The blebs 708 cover a large portion of the radial and ulnar sides of the distal phalanx of the finger. When really using a glucometer to test blood-glucose levels, a patient or subject's finger is pricked with a lancet on the side of the finger in order to avoid nerve damage to the finger and to minimize pain. Thus, a glucometer training system 702 with blebs 708 on the side of the finger configured for being pricked with a lancet 714 provides an anatomically correct simulation.

The protective layer 712 of the finger splint 706 may consist of metals, hard plastics, and/or other materials capable of protecting a finger from being cut. Existing splints (e.g., DIP splints for ruptured extensor tendons, such as Stax-type splints) are readily available for use as a platform for adding simulated blood blebs. The layer of protective material 712, in this embodiment, has at least one perforation 713 on each of the radial and ulnar sides of the finger splint 706, leading to the unadhered portions of the membrane, or blebs 708. The perforations 713 are large enough to allow a syringe needle to fit through but small enough to not allow a lancet 714 to fit through, protecting the patient/subject's finger.

Prior to training, the blebs 708 of the blood serum interface 704 can be filled with simulated blood serum 710 from the inside of the finger splint 706, using a syringe 732. The fluid 710 can include appropriate physiological composition characteristics, such as blood-sugar levels for glucose testing with a glucometer 202. Alternatively, the fluid, or simulated blood serum 710, can be inert with characteristics preprogrammed and simulated by a computer 6. The simulated blood serum 710 may include a sealant configured to seal off holes poked into the blebs 708, or the blood serum 710 may include properties causing the blood serum 710 to coagulate, or clot, around holes poked through the blebs 708.

The blebs 708 can be filled by placing a syringe needle through the membrane, through a perforation 713, and into an unadhered portion of the membrane; filling the bleb 708 with blood serum 710 from the syringe 732; and removing the syringe 732. Either one or both of the blebs 708 can be filled with blood serum 710 in this manner in preparation for training. After at least one bleb 708 has been filled with blood serum 710, the finger splint 706 can be placed on a patient/subject's finger. A student or trainee can then prick the outside of the bleb 708 with a lancet 714, obtain a droplet 716 of blood serum 710, and test the glucose level of the blood serum 710 using a glucometer 202 or simulated glucometer, thus simulating the actual process for checking someone's blood-glucose level.

The finger splint 706 can be placed on any finger of a mannequin or simulated patient, with the middle (3rd) finger or ring (4th) finger being the preferred placement. There may be different sizes of finger splints 706 to better fit different finger sizes. It is important for the finger splint 706 to extend beyond the DIP joint of the patient/subject's finger to help ensure that the splint 706 will stay on the finger when the finger is handled by a student or trainee. Additionally, it is preferable to have an open nail portion 718 or a nail-like indention on the finger splint 706 to make the simulation more anatomically correct and to aid in placing the finger splint 706 in the correct orientation on the patient/subject's finger. FIGS. 50-52 show the finger splint 706 having an open nail portion 718.

Figure 53:
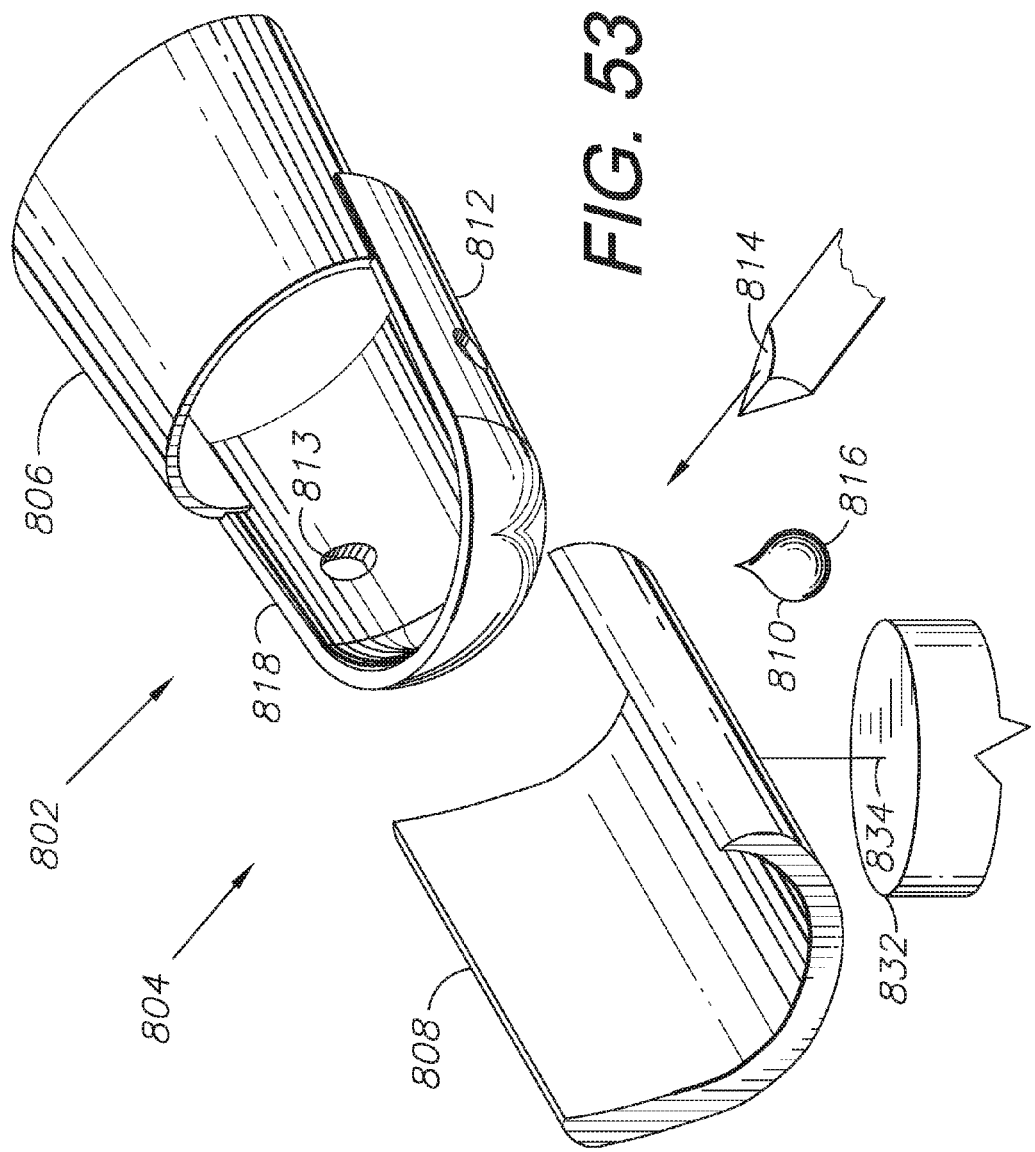
FIG. 53 shows another modified embodiment of a blood serum interface.

Another alternative embodiment of a glucometer simulation and training system 802, shown in FIG. 53, includes a patient, a blood serum interface 804, and an analyzer. The patient may be an individual or a mannequin, and at least one of the patient's fingers is required for the glucometer simulation and training system 802. The analyzer may be a glucometer such as the portable example shown at 202, a computer programmed to simulate fluid analysis, or another type of fluid analyzer.

The blood serum interface 804 includes a finger splint 806 with a layer of protective material 812 and a bleb 808 configured for holding a semi-viscous fluid 810 simulating blood. The protective layer 812 may consist of metals, hard plastics, and/or other materials capable of protecting a finger from being cut. Existing splints (e.g., DIP splints for ruptured extensor tendons, such as Stax-type splints) are readily available for use as a platform for adding a simulated blood bleb. The bleb 808, in this embodiment, spans both the inside and outside of the protective layer 812 of the finger splint 80. The protective layer 812 includes perforations 813 large enough for a syringe needle 834 to go through but small enough to prevent a lancet 814 from going through, protecting a patient/subject's finger from being cut.

The bleb 808 can be filled with simulated blood serum 810 from the inside of the finger splint 806 with a syringe 832 by pointing the syringe needle 834 through one of the perforations 813 in the protective layer 812. The fluid 810 can include appropriate physiological composition characteristics, such as blood-sugar levels for glucose testing with a glucometer. Alternatively, the fluid, or simulated blood serum 810, can be inert with characteristics preprogrammed and simulated by a computer 6. The simulated blood serum 810 may include a sealant configured to seal off holes poked into the bleb 808, or the blood serum 810 may include properties causing the blood serum 810 to coagulate, or clot, around holes poked through the blebs 808.

After being filled with blood serum 810, the blood bleb 808 sits underneath the patient/subject's finger. A filled bleb 808 can be pricked with a lancet 814, and a droplet 816 of the blood serum 810 can be tested for glucose levels using a glucometer 202 or simulated glucometer. The finger splint 806 can be placed on any finger of a mannequin or simulated patient, with the middle (3rd) finger or ring (4th) finger being the preferred placement. There may be different sizes of finger splints 806 to better fit different finger sizes. It is important for the finger splint 806 to extend beyond the DIP joint of the patient/subject's finger to help ensure that the interface 804 will stay on the finger when the finger is handled by a student or trainee. It is also preferable to have an open nail portion 818 or a nail-like indention on the finger splint 806 to make the simulation more anatomically correct and to aid in placing the finger splint 806 in the correct orientation on the patient/subject's finger. FIG. 53 shows the finger splint 806 having an open nail portion 818.

Alternatively, the finger splint 806 could be placed on the patient/subject's finger rotated 90 degrees. Turning the splint 806 sideways places the bleb 808 on the side of the patient/subject's finger, which is where an actual finger would be pricked when testing for blood glucose levels. With an open-nail 818 finger splint 806 configuration, at least part of the patient/subject's fingernail would be visible with the splint 806 turned sideways. A visible fingernail helps with training where to stick a finger when obtaining a droplet of blood serum for blood glucose testing.

In an embodiment of the glucometer simulation and training system 902, the blood serum interface 904 includes a simulated finger 906. The simulated finger 906, made up of a soft, flesh-like material, includes two proximal end openings, a finger opening for placement over a patient/subject's finger and a reservoir opening 942. The flesh-like material could be made up of polyurethane or other soft plastics or rubbers, such as silicone, latex, butyl rubber, etc. The proximal end reservoir opening 942 of the simulated finger 906 must be sealed in order for its fillable reservoir to hold simulated blood serum without leaking. Another layer of soft flesh-like material and/or sealant can be sealed to the back of the reservoir opening 942 of the simulated finger 906. Alternatively, a sealing wedge 936, shaped to match up with the reservoir opening 942 of the simulated finger 906 and preferably made of the same flesh-like material as the simulated finger 906, can be wedged into the reservoir opening 942 of the simulated finger 906. The wedge 936 seals off the fillable reservoir, allowing the reservoir to adequately hold simulated blood serum. Sealant may optionally be applied to the wedge 936 for optimum sealing.

Since the simulated finger 906 is made of soft material, the blood serum interface 904 in this embodiment includes a layer of protective material 934 or a thimble-like structure to protect the patient/subject's actual finger from being cut. The protective layer, or protective shield 934, may be made of rigid plastic, metal, fabric capable of resisting puncture, or some other puncture-resistant material. The protective layer 934 may cover only the areas of the patient/subject's finger directly underneath the blebs and reservoir of the simulated finger 906 to protect the patient/subject's actual finger from being cut with a lancet or syringe needle. Alternatively, the protective layer 934 may cover the entire surface area of the inside of the simulated finger 906, providing maximum protection to the patient/subject's actual finger. The layer of protective material 934 can either be integrated into the design of the simulated finger 906 or be a separate piece configured for sliding underneath the simulated finger 906.

If the protective layer 934 is not integrated into the structure of the simulated finger 906, the protective layer 934 can be connected to a wedge 936 for sealing the proximal end reservoir opening 942 of the simulated finger 906. A protective layer and sealing wedge combination 938 provides protection to the patient/subject's actual finger from being cut, and it also seals the reservoir opening 942 of the simulated finger 906. A protective shield and sealing wedge combination 938 is designed to slide within a simulated finger such as embodiment 506 with the external surface of the protective shield 934 matching up with the internal surface of the finger opening of the simulated finger. The sealing wedge portion 936 of the protective shield and wedge combination 938 fits into and seals the proximal end reservoir opening 942 of the simulated finger 906. Additional sealant may optionally be applied to the wedge 936.

Figure 54:
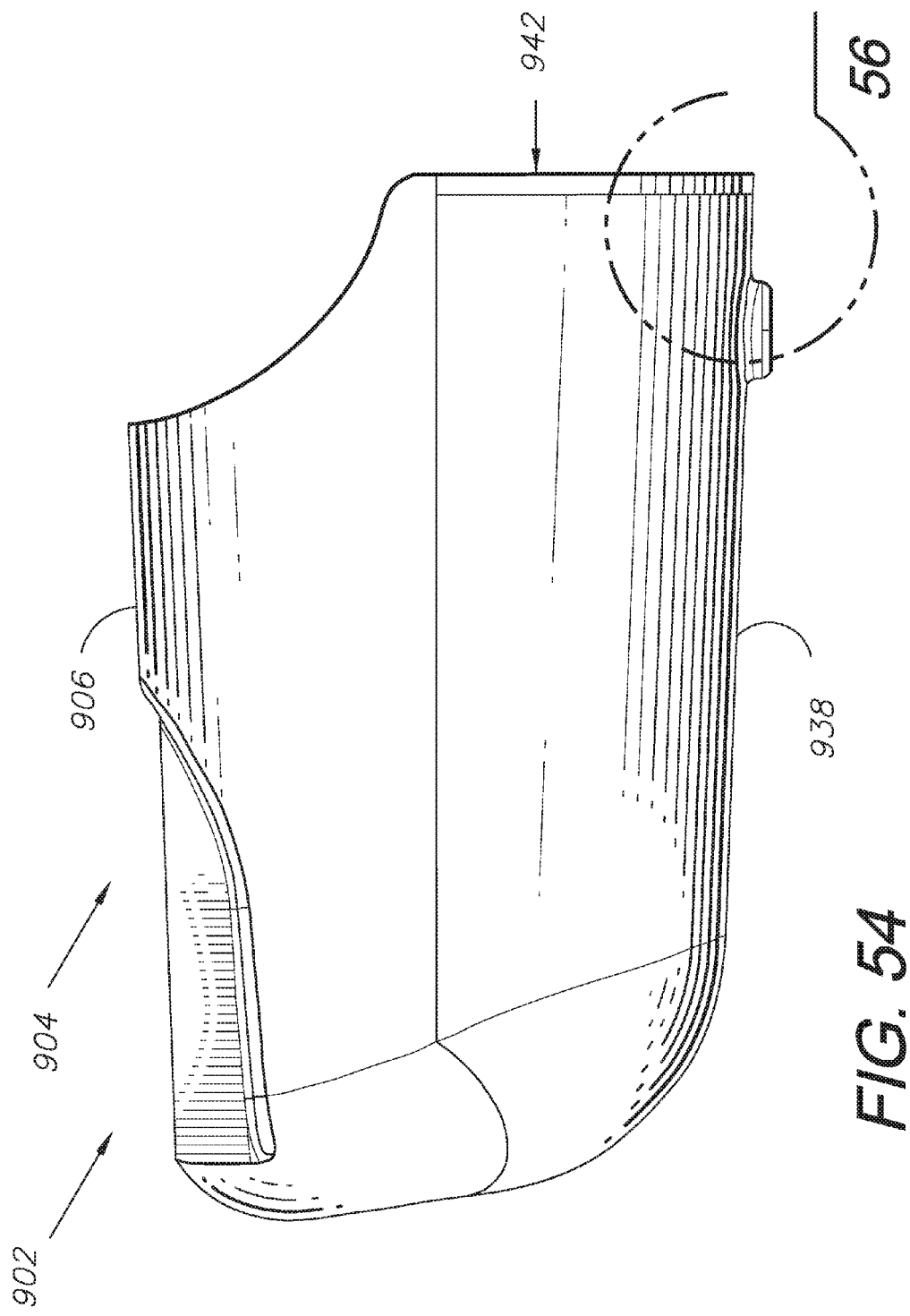
FIG. 54 shows a side, elevational view of an embodiment of a blood serum interface including a simulated finger and a protective shield and sealing wedge combination.
Figure 55:
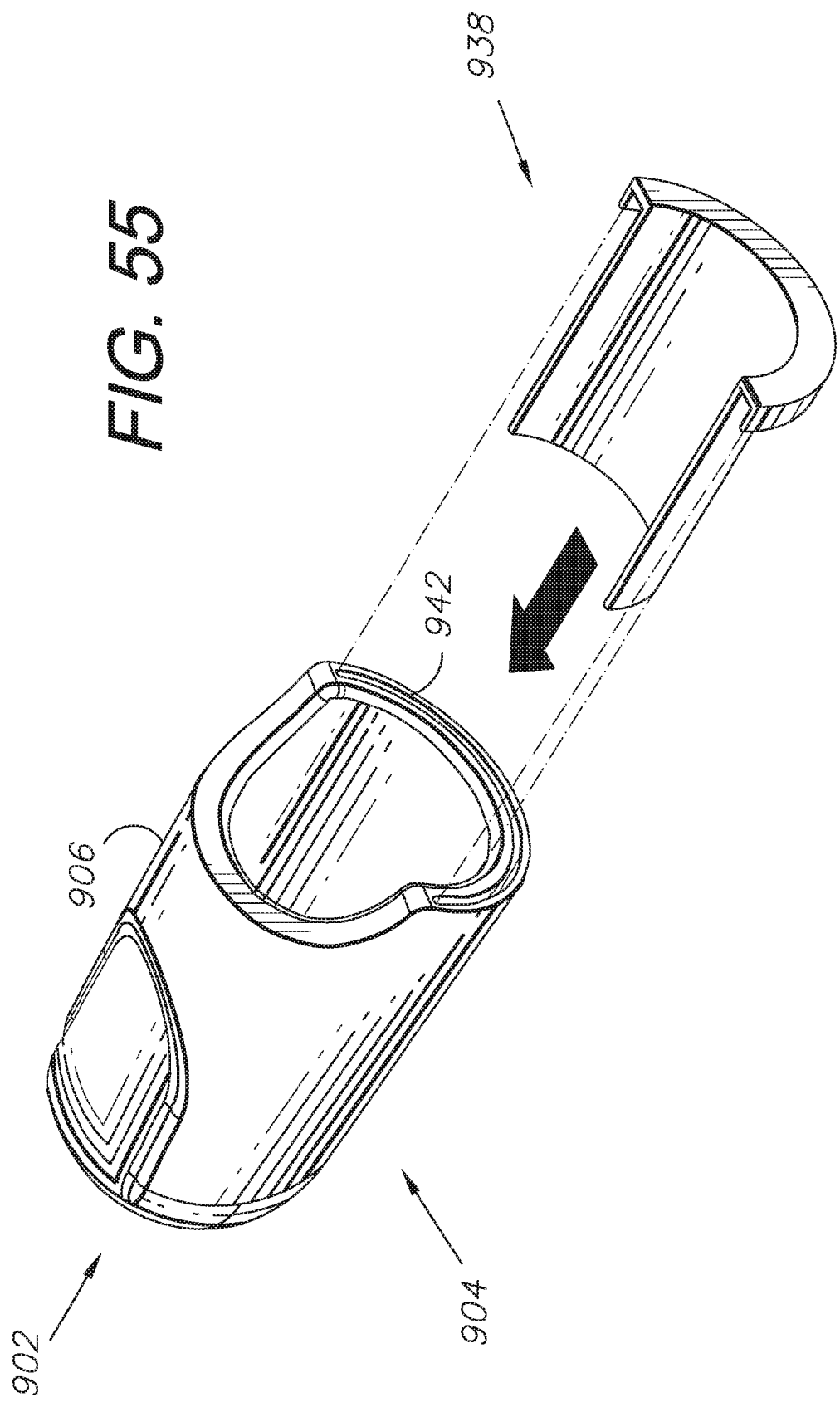
FIG. 55 shows a top, back, exploded, perspective view of the blood serum interface including a simulated finger and a protective shield and sealing wedge combination.
Figure 56:
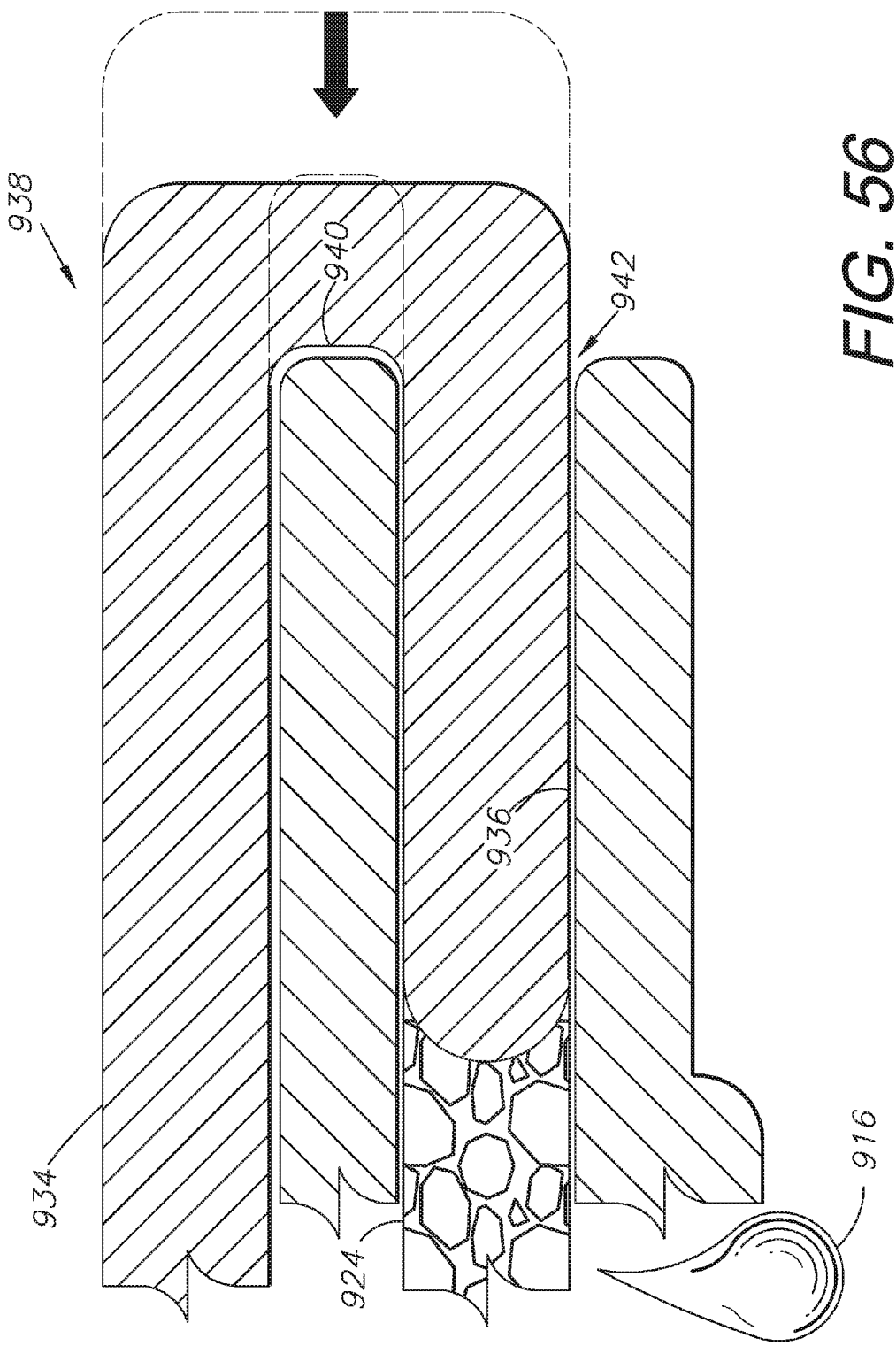
FIG. 56 is a cross-sectional view of the blood serum interface including a simulated finger and a protective shield and sealing wedge combination showing reticulated, open-cell foam within the simulated finger.

FIGS. 54-56 show the blood serum interface 904 including a protective shield and wedge combination 938 that is configured for being inserted into the simulated finger 906. In this embodiment, the wedge portion 936 of the shield/wedge combination 938 attaches to the protective shield portion 934 via a channel 940. When the shield/wedge combination 938 is inserted into the simulated finger 906, the channel 940 rests against the proximal end of the simulated finger 906, the wedge 936 is inserted into the open reservoir and seals off the reservoir opening 942 of the simulated finger 906, and the protective shield 934 lays directly against the interior surface of the finger opening of the simulated finger 906 arched in the shape of an actual finger.

This embodiment of the simulated finger 906 includes reticulated, open-cell foam 924 inserted within the empty spaces in the blebs and fillable reservoir. The foam 924 must be reticulated and open-cell, such as reticulated polyurethane foam, to allow the simulated blood fluid to flow freely through the foam. The simulated finger 906 can be injected with foam-forming material, or pre-manufactured foam can be placed inside the blebs and fillable reservoir of the simulated finger. A foam core 924 within the blebs and fillable reservoir helps to evenly disperse the blood serum, minimizing air pockets and helping to ensure that a droplet 916 of blood serum will form at whichever part of the bleb a student or trainee pricks.

Additionally, in this embodiment, the foam 924 aids in making the simulated finger 906 look and feel like an actual finger, and it allows the outer layer of soft, flesh-like material forming the blebs to be thinner. A thin outer layer of skin-like material on the blood serum interface 904 is important for glucometer simulation because of the popularity of spring-loaded lancets in real use. Spring-loaded lancets each have a button that, when pressed, shoots out a small needle or blade for puncturing skin for obtaining small blood samples. Typical spring-loaded lancets only expose about three millimeters of their needles, and as little as one millimeter of the lancet needle may actually pierce the skin. Thus, it is important for the simulated finger 906 to have a thin outer layer of flesh-like material forming the blebs so that the blood serum interface 904 can be used for simulating glucometer testing with real spring-loaded lancets. FIG. 56 shows a cross-sectional view of the simulated finger 906 having reticulated foam within the fluid-holding portions of the simulated finger 906. Reticulated, open-cell foam 924 can be inserted into the fluid-holding portions of any of the above-mentioned blood serum interfaces.

Figure 57:
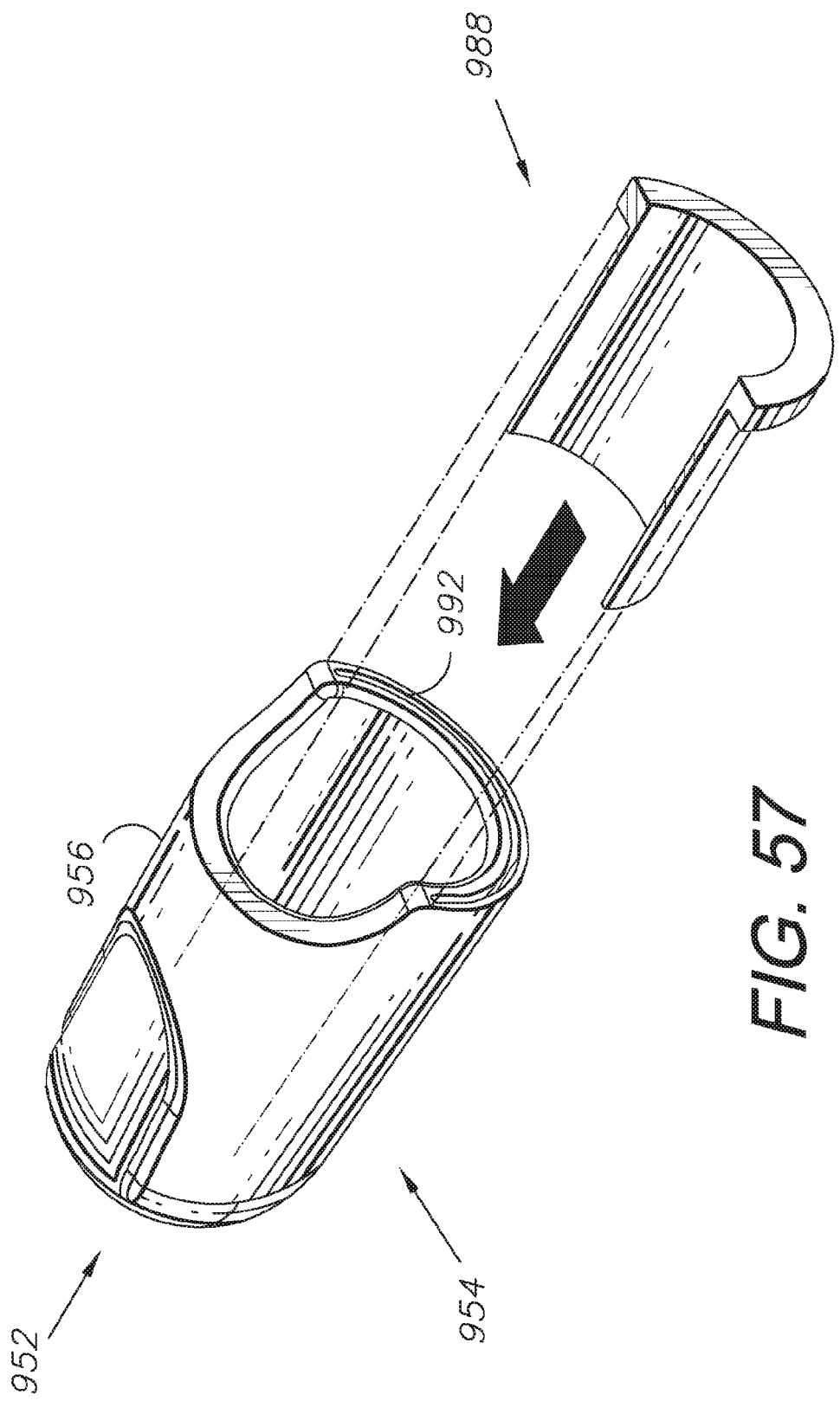
FIG. 57 shows a dorsal, proximal, exploded, perspective view of an alternative embodiment of a blood serum interface including a simulated finger and a protective shield and sealing cap combination.
Figure 58:
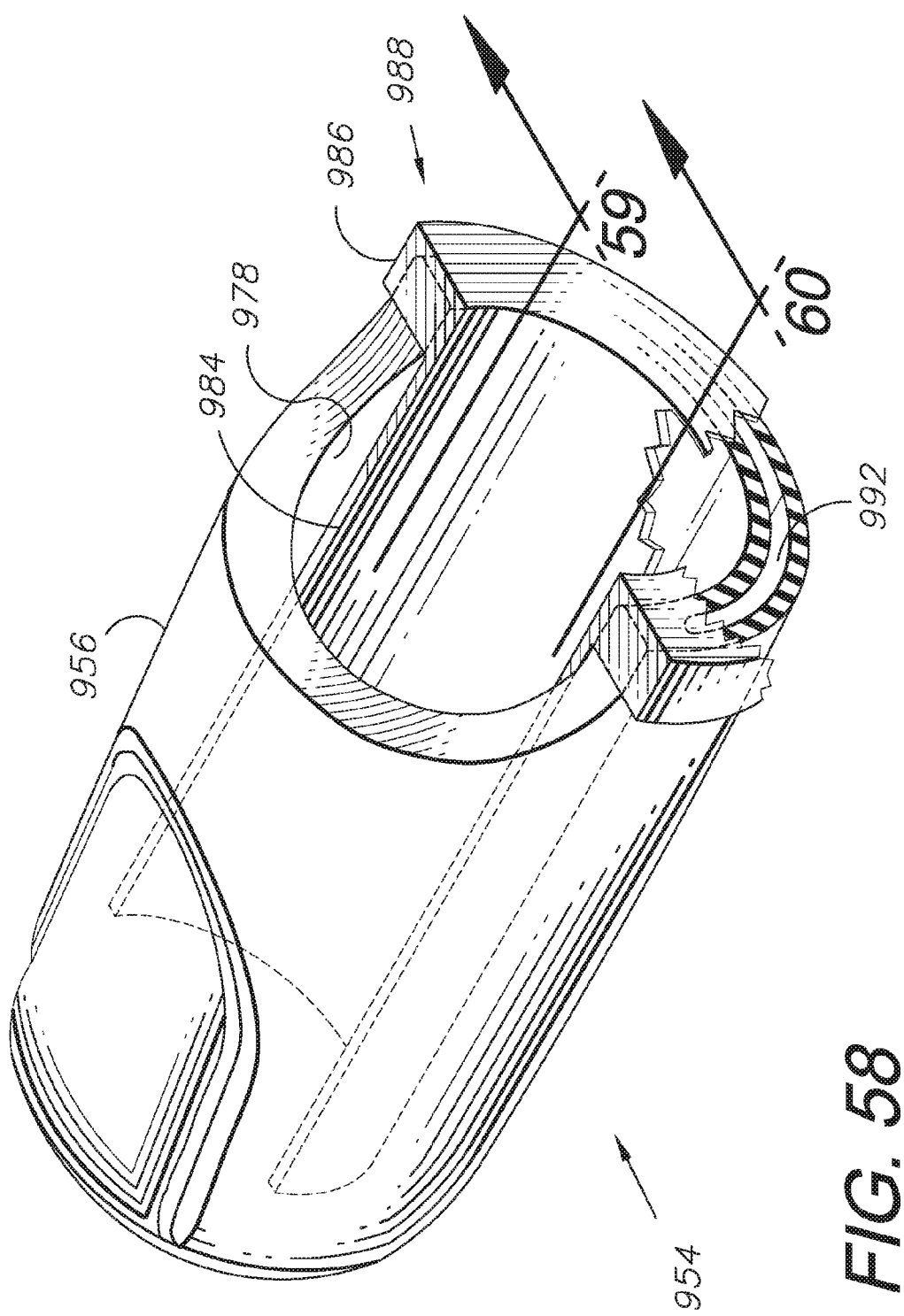
FIG. 58 shows dorsal, proximal, assembled, perspective view of the blood serum interface including a simulated finger and a protective shield and sealing cap combination with a cut out in the protective shield and cap.
Figure 59:
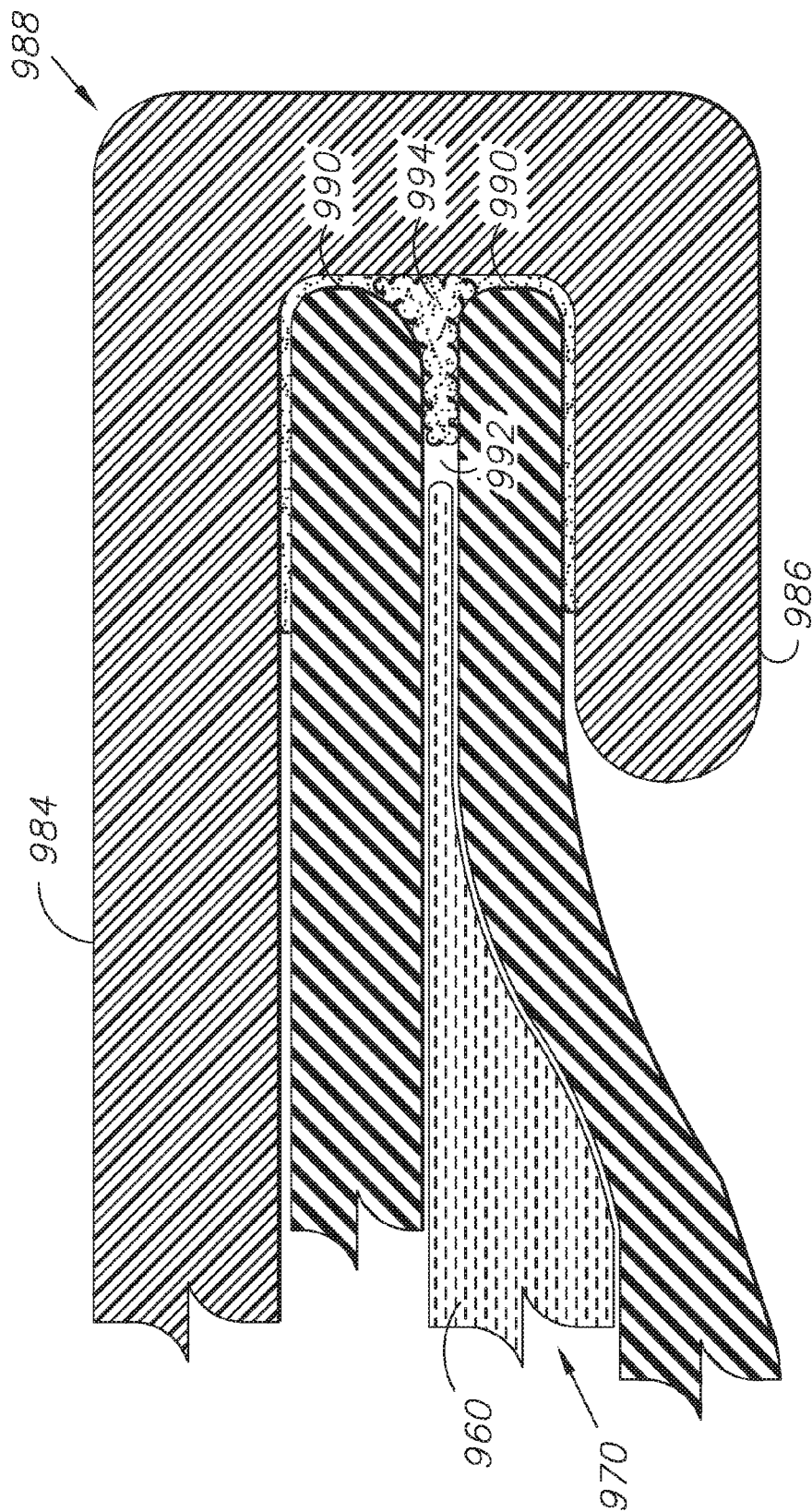
FIG. 59 shows a close-up, cross-sectional view of the protective shield and sealing cap combination sealing the proximal end of the simulated finger.

An alternative embodiment of a glucometer simulation system 952, shown in FIGS. 57-59, includes a blood serum interface 954 made up of a simulated finger 956 and a protective layer 984 which includes a cap 986. The cap 986 is configured for sealing the proximal end of the simulated finger 956. The simulated finger 956, in this embodiment, is configured for holding semi-viscous fluid simulating blood 960 and for sliding over and overlaying a standardized patient or mannequin's finger. Preferably, when placed over the patient or mannequin's finger, the simulated finger 956 covers at least the distal phalanx of the standardized patient or mannequin's finger. The simulated finger 956 may be configured to extend beyond the DIP joint of the patient/subject's finger for added stability. The simulated finger 956 is made of flexible, flesh- or skin-like material capable of sealing itself after puncture and includes two proximal end openings. These two proximal end openings are a finger opening 978 configured for placement over the patient/subject's finger and a reservoir opening 992 configured to hold simulated blood 960. The finger opening 978 has a contoured surface configured for mating with the contoured surface of the patient/subject's finger. In this embodiment, the flesh-like material may be made up of rubber such as silicone, latex, nitrile, neoprene, or butyl rubber; soft plastics such as polyurethane or polyvinyl chloride; or any related material.

In the preferred embodiment, the simulated finger 956 includes two internal blebs, or stick sites, configured for holding simulated blood serum 960 and for being punctured with a lancet by a user or trainee of the glucometer simulation system 952. One bleb is located on each of the radial and ulnar sides of the simulated finger 956. Each bleb is connected to a common reservoir 970 configured for being filled with and holding simulated blood serum 960. The common reservoir 970 may include a fill site 972 configured for filling with a syringe. Alternatively, the common reservoir can be configured for filling via IV connectors, Leur-Lok hub connectors, or other tubing or bladder connectors.

In this embodiment, the reservoir 970 must be sealed at the proximal end of the simulated finger 956 so that it can hold the simulated blood serum 960. Additionally, a layer of protective material 984, or a shield, is desired for placement within the finger opening 978 of the simulated finger 956 to protect the patient or mannequin's finger from lancet lacerations. In an embodiment, a protective layer 984 includes a cap 986 configured for sealing the reservoir opening 992 at the proximal end of the simulated finger 956. In one embodiment, the protective layer and cap combination 988 is made of rigid plastic. However, alternatively, the protective layer 984 may be made up of metal, fabric capable of resisting puncture, or some other puncture-resistant material. Both edges 990 of the reservoir opening 992 fit within the cap 986, and the cap 986 compresses the edges 990 together to seal the common reservoir 970. With the cap 986 in position for sealing the proximal end of the common reservoir 992, the protective layer 984 fits within the finger opening 978 of the simulated finger 956 and provides protection for the patient/subject's finger from lacerations. Liquid sealant 994, or glue, can be used to better seal the reservoir opening edges 990 together and to seal the protective layer and cap combination 988 to the simulated finger 956. Optionally, a vacuum press or alternative form of compression device can be used to compress the reservoir opening edges 990 together and/or bond the simulated finger 956 and liquid sealant 994 together. Alternatively, the reservoir opening edges 990 can be crimped together to seal the reservoir opening 992.

Figure 60:
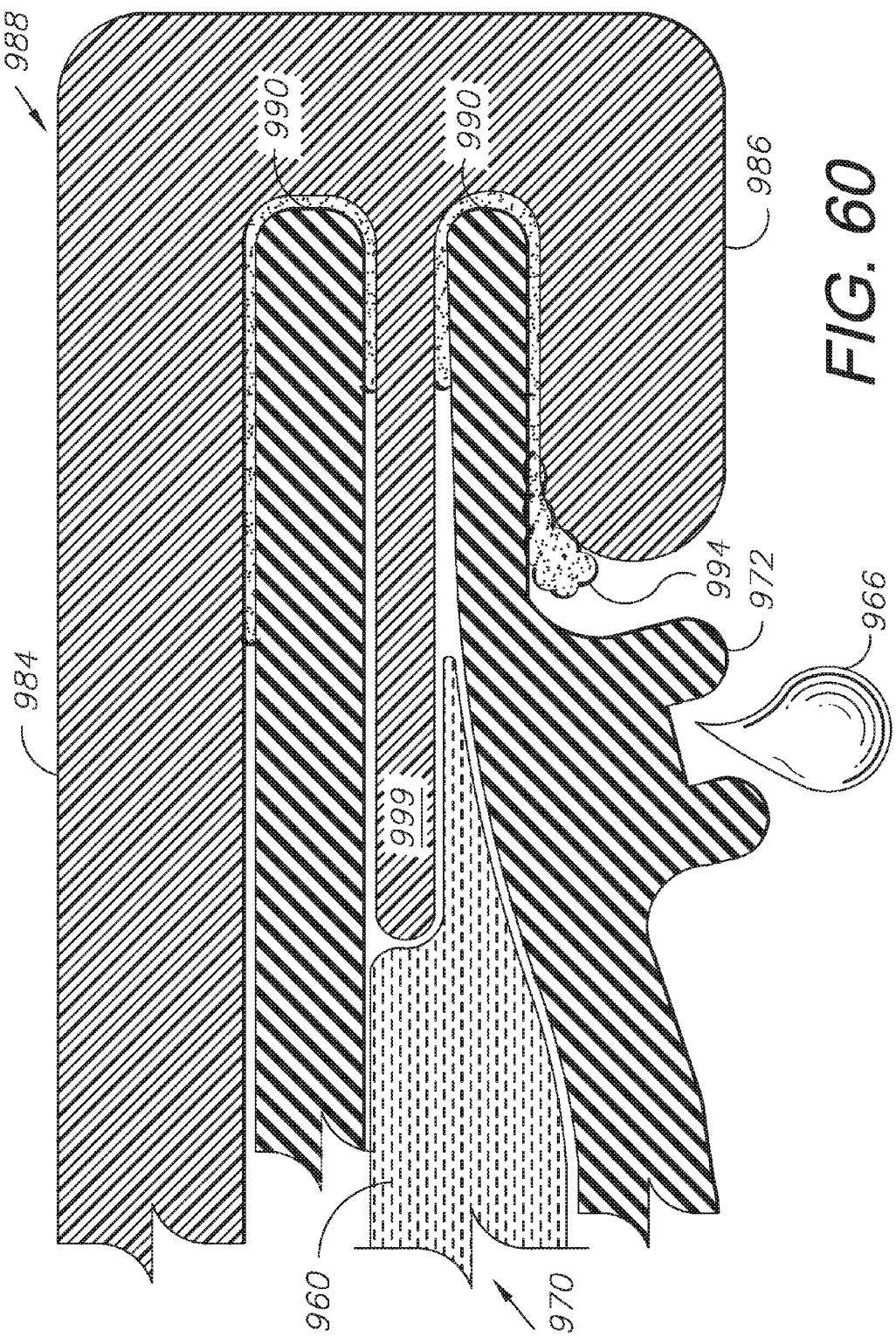
FIG. 60 shows a close-up, cross-sectional view of an alternative embodiment of a protective shield and cap combination including a sealing wedge configured for further sealing the proximal end of the simulated finger.
Figure 66:
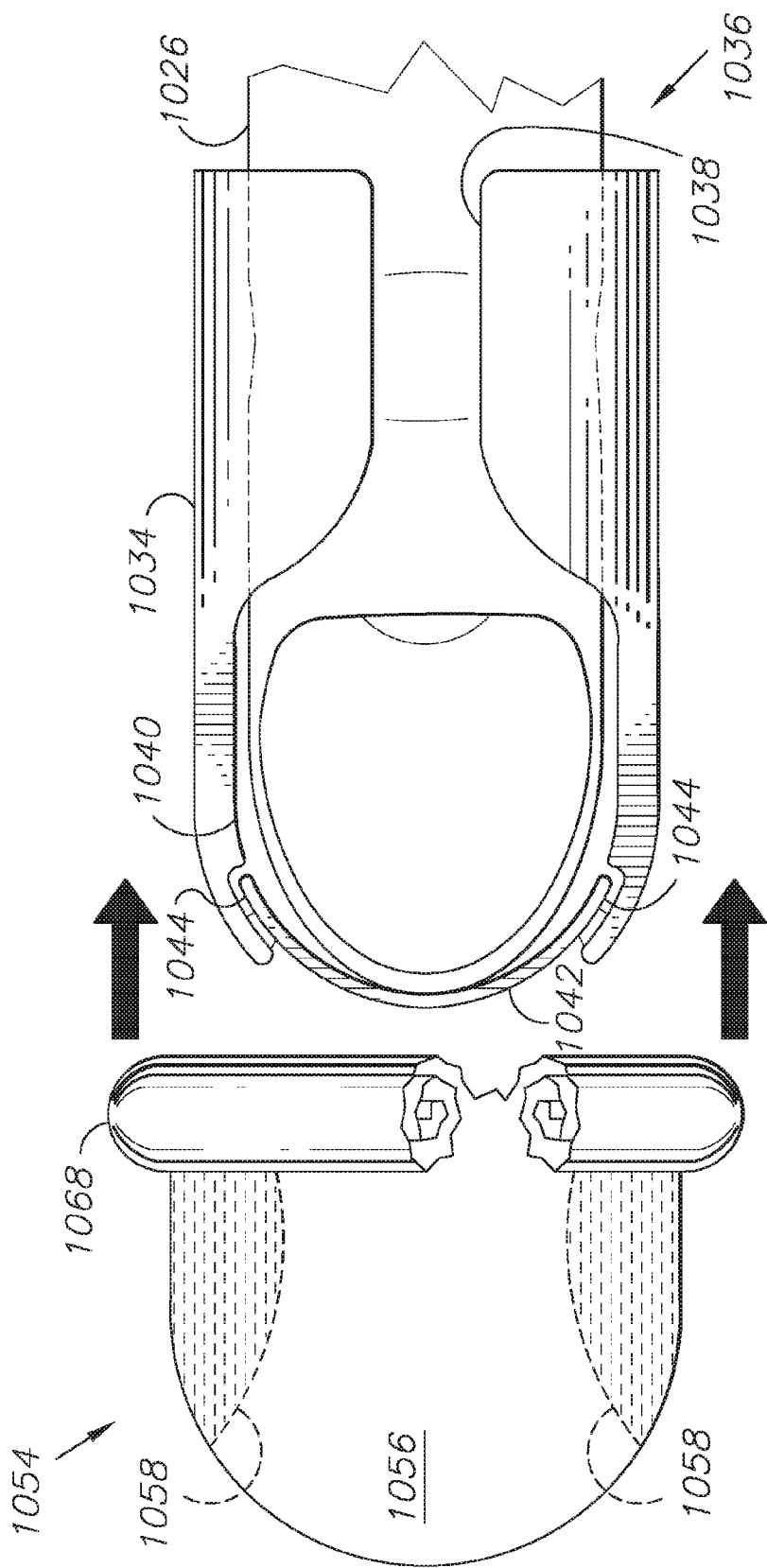
FIG. 66 is a dorsal, plan view of a blood serum interface with an alternative embodiment of a penetrable cover.

In an exemplary embodiment, the protective layer and cap combination 988 further includes a flange 999 configured for insertion into the reservoir opening 992 above the fill port 972 of the simulated finger 956, as shown in FIGS. 60-61. The flange 999 is configured to protect the inner layer of flesh-like material of the simulated finger 956 from puncture when filling the reservoir 992 with simulated blood 960. The flange 999 is preferably made of the same material as the protective shield and cap 988. In a common embodiment, the flange 999 is made of rigid plastic, but alternatively, it may be made up of metal fabric capable of resisting puncture, or some other puncture-resistant material. This flange 999 piece of the protective layer and cap combination 988 helps prevent leakage by protecting the inner edge of the simulated finger 956 from being poked through by a syringe needle. The fill port 972 is configured to have added thickness to provide sufficient sealing after syringe puncture when filling the reservoir 992 with blood serum 960. However, the other portions of the reservoir 970 and blebs of the simulated finger 956 have thin layers of flesh-like material to allow for a realistic simulation of pricking a finger to obtain a blood sample. The flange 999 protects from unneeded extra punctures in the simulated finger 956, decreasing the potential for leakage of blood serum 960 and extending the useful life of the simulated finger 956. In this embodiment, the flange 999 only covers a portion of the reservoir 992 around the fill site 972. Liquid sealant 994, or glue, is used to seal the edges of the reservoir opening 990 around the flange 999. In another embodiment, a flange can cover the entire reservoir opening and aid in sealing the proximal end. Alternatively, the protective shield and cap may not include a flange piece.

In the embodiments shown in FIGS. 57-61, with the blood serum interface 954 fully assembled and sealed, an instructor can fill the common reservoir 970 with simulated blood serum 960 through the fill site 972. The blood serum 960 can be filled into the blebs by applying pressure to the common reservoir 970, and the filled blood serum interface 954 can be placed over a standardized patient's or mannequin's finger. A student or trainee can then prick a bleb of the simulated finger with a standard lancet to obtain a droplet 966 of blood serum 960 in the same manner as one would prick an actual finger to obtain a droplet of actual blood. The student or trainee can extract a droplet from the blood serum interface 954 onto a glucometer testing strip. The testing strip can then be inserted into a real or simulated glucometer, simulating testing for blood glucose level.

An exemplary embodiment of a simulated glucometer includes a display screen, a microprocessor, a data storage and/or retrieval system, and an input system configured for allowing the simulated glucometer to be programmed with simulated blood glucose level readings. This embodiment of a simulated glucometer further includes a watertight sensor chamber configured for receiving a glucometer testing strip and a blood serum sample. The sensor chamber is configured to a suitable sensing and detection subsystem, such as an optical sensor and an electrical sensor. The optical sensor can be configured for detecting the placement of a testing strip or testing tape. The electrical sensor can be configured for detecting a liquid with high saline content, thus identifying the presence of simulated blood serum. The presence of a testing strip and blood serum triggers the display of a programmed simulated blood glucose level reading on the display screen. The simulated glucometer can further be programmed with the amount of time between displaying different programmed simulated blood glucose level readings. Alternatively, a simulated glucometer display can be connected to an instructor computing device via a hardwired connection, an internet connection, a Bluetooth connection, or any alternative form of computer connectivity. Such an instructor computing device is configured for allowing an instructor to control the display of simulated blood glucose level readings on a simulated glucometer display screen as part of a glucometer simulation or training scenario.

Preferred embodiments of simulated fingers 506, 906, 956 are intended for multiple uses. To allow for multiple uses, the puncture holes in the blebs must seal or be sealed after use. The flesh-like material making up the simulated finger 506, 906, 956 preferably has self-sealing properties so that puncture holes close after a blood serum droplet is obtained. However, sealant may also be applied to puncture sites so that the puncture holes do not leak when pressure is applied to the bleb. Liquid sealant, such as sealant used for patching holes in flat tires, could be internally integrated into the inside of the simulated finger blebs and reservoir or integrated into the simulated blood serum. Alternatively, a sealant can be externally applied to a puncture hole after use of the simulated finger 506, 906, 956 and given time to dry prior to subsequent use. Different embodiments of simulated fingers 906, 506, 956 may be configured for single use. Additionally, the internal layer of flesh-like material may optionally be made thicker opposite the fill site 522, 972 in these embodiments to further protect from a syringe needle puncturing through both layers of the simulated finger 506, 906, 956.

In certain embodiments of a glucometer training system and method, a single size of simulated finger 506, 906, 956 is used which is large enough to fit over any finger size. When using a one-size-fits-all simulated finger 506, 906, 956, the simulated finger 506, 906, 956 may be held in place to ensure that it stays in position over the standardized patient or mannequin's finger. When an actor, actress or standardized patient is being used in the glucometer training system, the individual can grasp the simulated finger 506, 906, 956 with the thumb and index finger of his or her opposite hand. The person acting as the standardized patient can place his or her thumb on top of the simulated finger 506, 906, 956 and his or her index finger on the bottom of the simulated finger 506, 906, 956 below the common reservoir 520, 970 to keep the simulated finger 506, 906, 956 in position over the standardized patient's actual finger. Additionally, this positioning allows the standardized patient to aid in the simulation by controlling the pressure applied to the reservoir 520, 970 with his or her opposite hand index finger. When the user or trainee is extracting a droplet of blood serum from the simulated finger 506, 906, 956, the standardized patient may apply pressure to the reservoir 520, 970 to help expose a droplet of simulated blood. Once the droplet is extracted, the standardized patient can release pressure from the reservoir 520, 970, helping to seal the puncture hole. In embodiments using a mannequin, an assistant may hold the simulated finger 506, 906, 956 on the mannequin's finger and control the pressure applied to the common reservoir 520, 970 in the same manner as a standardized patient, using the thumb and index finger of his or her opposite hand.

FIGS. 62-68 show an alternative embodiment of a glucometer simulation and training system 1002. This embodiment includes a two-part blood serum interface 1004 configured for placement over a standardized patient or mannequin's finger 1026. The blood serum interface 1004 is made up of a protective shield 1034 configured for placement over the standardized patient or mannequin's contoured finger surface and a penetrable cover 1006 including at least one fluid receptacle 1008 and configured for a close fit over the protective shield 1034. The protective shield 1034 is configured to protect the patient or mannequin's finger 1026 from puncture, and it can be made of metal, hard plastic, and/or any other material capable of protecting an underlying finger from being cut.

An exemplary embodiment of the protective shield 1034 is designed to have a proximal end finger opening 1036, an opening 1038 along the dorsal side of the protective shield 1034, and a nail opening 1040. The proximal end finger opening 1036 is configured for receiving and overlaying the standardized patient or mannequin's finger 1026. The opening 1038 along the dorsal side of the protective shield 1034 provides some flexibility for the rigid protective shield 1034 when placing the shield 1034 over the standardized patient or mannequin's finger 1026. The nail opening 1040 provides an opening around the fingernail of the standardized patient or mannequin's finger 1026. The protective shield 1034 further includes an extendable fingertip shield 1042 configured for protecting the distal portion of the standardized patient or mannequin's finger 1026. The ventral part of the fingertip shield 1042 is configured to be connected to the most distal part of the nail opening 1040. The fingertip shield 1042 is preferably made of a flexible material, allowing the fingertip shield 1042 to be extendable distally. Alternatively, the fingertip shield could be made of the same rigid material as the rest of the protective shield, with a hinge at the ventral part of the fingertip shield to allow for extendibility. The flexibility of the fingertip shield 1042 allows for a secure fit and adequate protection for all standardized patient or mannequin fingertip sizes. Additionally, the nail opening 1040 and flexible fingertip shield 1042 allow the glucometer training system 1002 to be used with any size of fingernail. To further protect the underlying finger, the fingertip shield 1042, preferably, includes an overlapping panel guard 1044 on each of the radial and ulnar sides of the fingertip shield 1042. The overlapping panel guards 1044 are configured to expand as the fingertip shield 1042 is extended and to retract behind an overlapping portion of the protective shield 1034 when the fingertip shield 1042 is retracted. The overlapping panel guards 1044 are configured to expand and retract in a similar manner to the overlapping panels of an airport luggage carousel. These guards 1044 allow for adequate protection from puncture for the standardized patient or mannequin's finger 1026 when the fingertip shield 1042 is extended.

The standardized patient or mannequin's actual fingernail provides protection for skin or simulated skin underneath the fingernail from laceration. Additionally, in real practice, the fingernail portion of an actual finger would not be used to obtain a droplet of blood for testing blood glucose level. Rather, a part of the fingertip not including the fingernail—preferably either the radial or ulnar side of the distal phalange—is pricked with a lancet to obtain a droplet of blood for testing. The protective shield 1034 provides protection from laceration to the portions of the finger not protected by the fingernail. Alternatively, the protective shield could have no nail opening and/or no opening along the dorsal side. Preferably, the protective shield 1034 extends beyond the DIP joint of the patient or mannequin's finger to provide a secure fit on the finger; however, lengths of the protective shield can vary. Additionally, the sizes of the protective shield finger opening 1036 and nail opening 1040 are scalable. The protective shield 1034 can be configured to be "one size fits all" or "one size fits most." Alternatively, there can be multiple sizes of protective shields 1034. The protective shield portion 1034 of the blood serum interface 1004 is configured for many, if not unlimited, uses.

The penetrable cover portion 1006 of the blood serum interface 1004 is preferably made of a flexible, skin-like material. This skin-like material could be made up of rubber such as silicone, latex, nitrile, neoprene, or butyl rubber; soft plastics such as polyurethane or polyvinyl chloride; or any related material. Optionally, coloration of the penetrable cover portion 1006 and/or the protective shield portion 1034 can be varied to represent different skin pigmentations. The penetrable cover 1006 includes at least one fluid receptacle 1008, or bleb, configured to hold simulated blood serum 1010. The fluid-filled penetrable cover 1006 is configured for placement on the standardized patient or mannequin's finger 1026 over the protective shield 1034. Preferably, the penetrable cover 1006 is configured to stretch and fit closely over the underlying finger 1026 and protective shield 1034, showing the natural shape of the fingernail underneath and thus providing for a realistic finger simulation.

The proximal end of the penetrable cover includes a furled, or rolled, end 1018 configured for unrolling over the protective shield 1034 and underlying finger 1026 like a finger cot or condom. The furled or rolled proximal end 1018 and flexible material allow for a secure fit of the penetrable cover 1006 over the finger 1026 and protective shield 1034, and the cover 1006 can be unrolled as far as desired. The penetrable cover 1006, in this embodiment, has one large fluid receptacle 1008 which fits over ventral, radial, ulnar, and distal portions of the distal phalange of the standardized patient or mannequin's finger 1026, as shown in FIGS. 62-65. An alternative embodiment of a two-part blood serum interface 1054, shown in FIGS. 66-68, includes protective shield 1034 and a penetrable cover 1056 having two separate fluid receptacles or blebs 1058 which cover the radial and ulnar portions of the standardized patient or mannequin's distal phalange, respectively. Penetrable cover 1056 also includes a rolled proximal end 1068 configured for unrolling over the protective shield 1034 and underlying finger 1026 like a finger cot or condom. The number, size, and location of fluid receptacles in the penetrable cover 1006, 1056 can be varied. Alternatively, one or more fluid receptacles, or blebs, can be separate from the cover and adhesive-backed. In such embodiments with adhesive-backed, separate blebs, the blebs can be attached to the outside of the cover or attached directly to the protective shield, without a cover component.

Once fully assembled onto the standardized patient or mannequin's finger 1026, the blood serum interface 1004, 1054 can be used in simulating extracting a droplet of blood from a real finger to test the blood glucose level. The penetrable cover 1006, 1056 is configured to be pricked with a lancet to obtain a droplet of blood serum 1010 from the fluid receptacle 1008, 1058 in the same manner as one would prick an actual finger to obtain a droplet of blood. Preferably, the skin-like material making up the cover 1006, 1056 has self-sealing properties, allowing the cover 1006, 1056 to seal itself and stop flow of blood serum 1010 at the puncture site. After lancet puncture of the penetrable cover 1006, 1056, a droplet of blood serum 1010 can be extracted onto a glucometer testing strip by a trainee or user. The simulated blood serum 1010 is configured to resemble blood in color, consistency, and viscosity. In an embodiment, the simulated blood serum 1010 is inert and configured to be inserted into a simulated glucometer which simulates testing blood glucose levels with a real glucometer. Different blood glucose readings can be programmed into such a simulated glucometer as part of the simulation. Alternatively, the simulated blood serum 1010 can include predetermined levels of glucose and be configured for testing with a real glucometer. The penetrable cover 1006, 1056 may be designed for single use or for multiple uses. Once a penetrable cover portion's maximum number of uses has been exhausted, the cover 1006, 1056 can be replaced with a new penetrable cover portion 1006, 1056.

FIGS. 69-73 show a further embodiment of a glucometer simulation and training system 1102 including a blood serum interface 1104 having three parts: a protective shield 1134, a skin-like cover 1106, and a prefilled blood serum overlay cap 1107. The protective shield 1134 in this embodiment is just like protective shield 1034 described above and shown in FIGS. 62-68. The protective shield 1134 includes a proximal end finger opening 1136, a nail opening 1140, a dorsal side opening 1138, and a fingertip shield 1142, and it is configured for overlaying a standardized patient or mannequin's finger 1126. The protective shield 1134 is made of a rigid material capable of resisting puncture and is configured for many, if not unlimited, uses. The rigid material may be hard plastic, metal, puncture-resistant fabric, or some other suitable puncture-resistant material.

The skin-like cover 1106 in this embodiment is made up of a flexible, skin-like material and configured for tightly fitting over the protective shield. This skin-like material may be made up of rubber such as silicone, latex, nitrile, neoprene, or butyl rubber; soft plastics such as polyurethane or polyvinyl chloride; or any related material. The cover 1106 includes a furled or rolled proximal end 1118 configured to be unrolled over the protective shield 1134 and standardized patient or mannequin's finger 1126 like a finger cot or condom. The cover 1106 can be unrolled on the underlying finger 1126 as far proximally as desired. Preferably, each cover 1106 is colored like skin, and optionally, the coloration of covers 1106 can be varied to represent different skin pigmentations. The skin-like cover 1106 can be configured for single use or for multiple uses.

The prefilled blood serum overlay cap 1107 is configured to include at least one fluid receptacle or bleb 1108 and to fit over the skin-like cover 1106 like a thimble. Preferably, the overlay cap 1107 is made of flexible, skin-like material configured to stretch and fit over any finger size. The skin-like material may be made of rubber such as silicone, latex, nitrile, neoprene, or butyl rubber; soft plastics such as polyurethane or polyvinyl chloride; or any related material. The overlay cap 1107 is configured to be prefilled with simulated blood serum before use in a glucometer simulation. As part of a glucometer simulation scenario, the overlay cap 1107 is configured to be punctured or pricked with a lancet, allowing a user or trainee to obtain a droplet of blood serum in the same manner as pricking an actual finger to obtain a droplet of blood. Each overlay cap 1107 is designed to be disposable and replaced with a new prefilled blood serum overlay cap 1107 after use. However, alternatively, an overlay cap 1107 can be configured for multiple uses prior to disposal and replacement.

Figure 69:
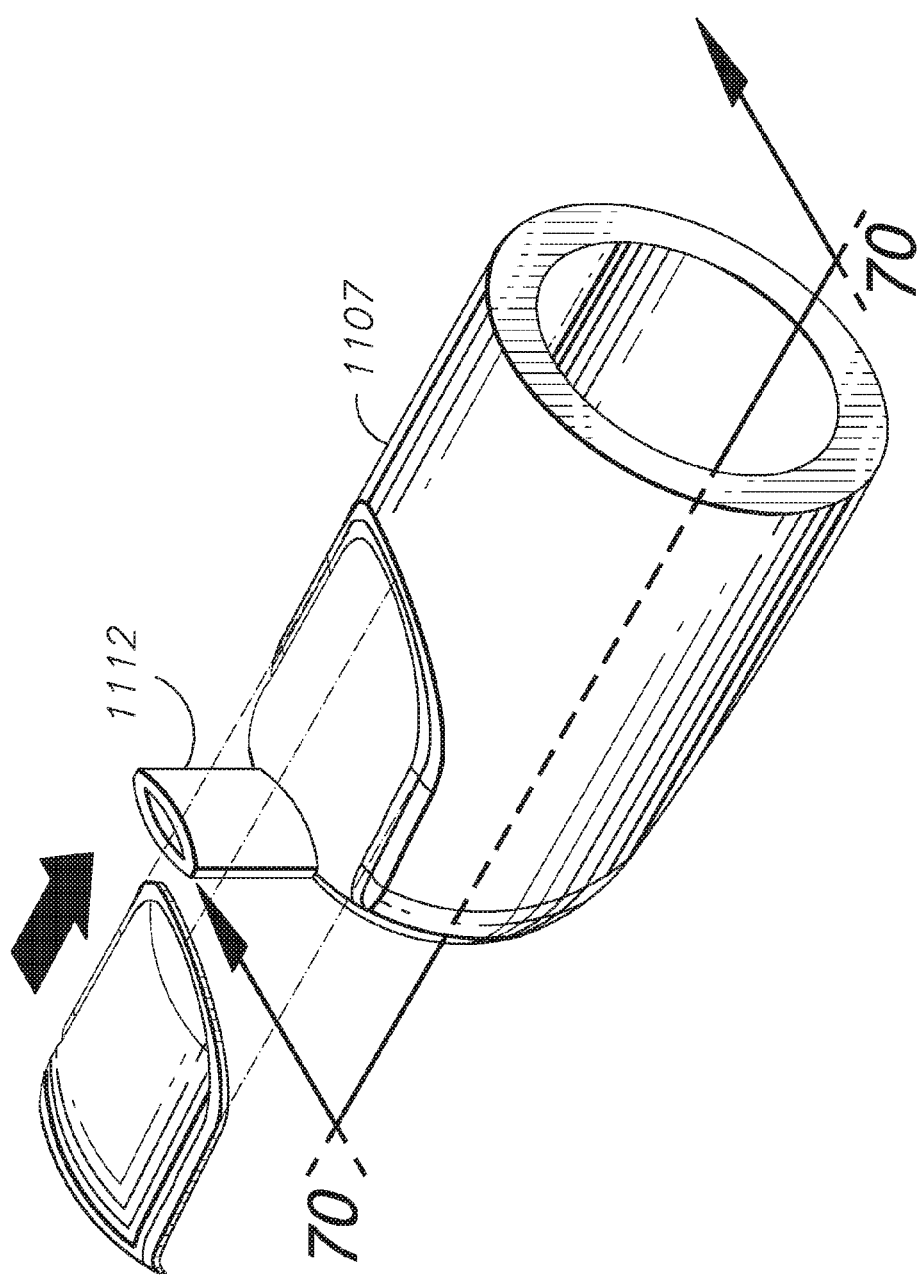
FIG. 69 shows a dorsal, proximal, exploded, perspective view of a blood serum overlay cap portion of a further embodiment of a blood serum interface embodying the present invention.
Figure 70:
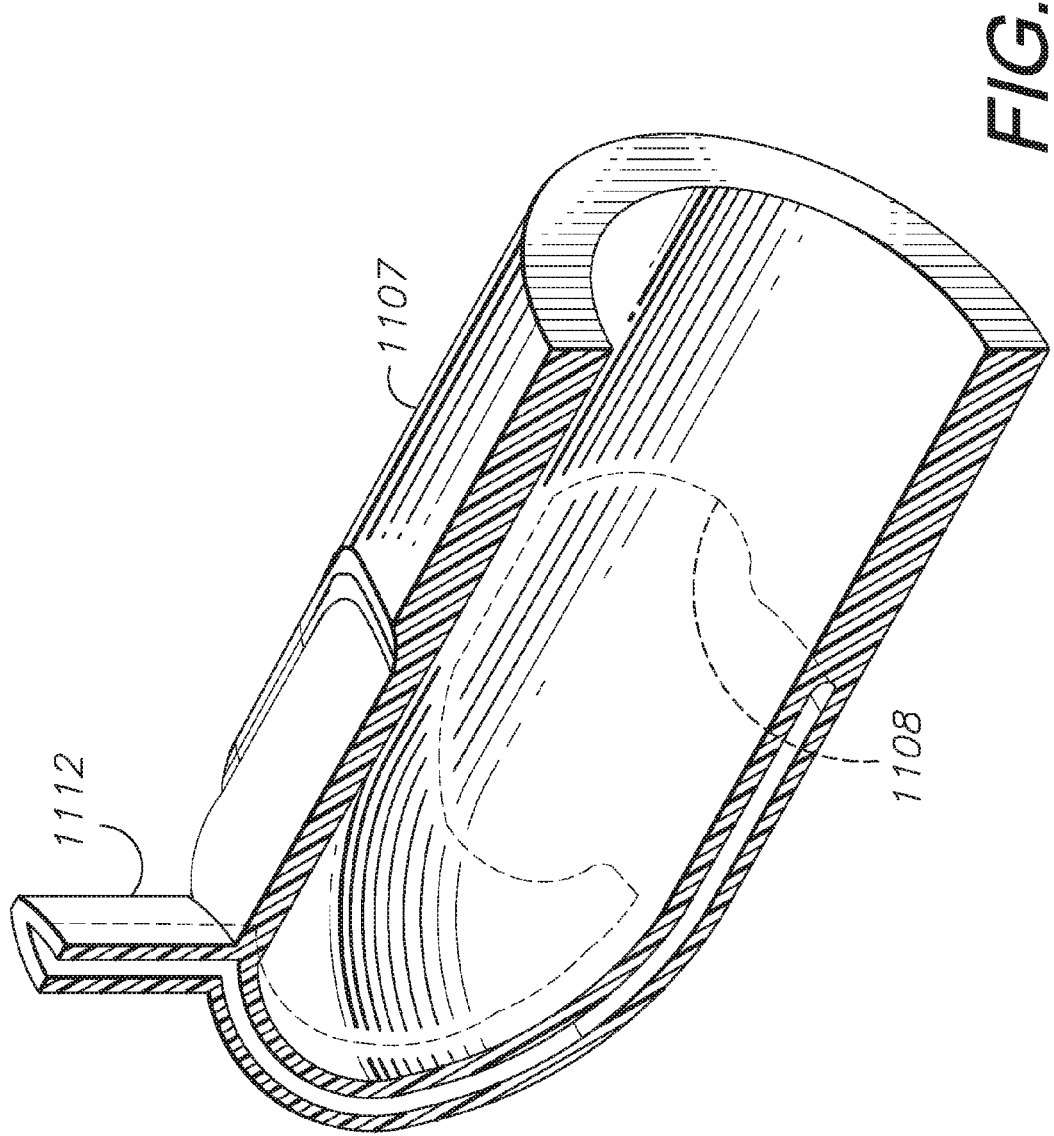
FIG. 70 is a YZ-plane cross-sectional, dorsal, proximal, perspective view of the overlay cap portion of the blood serum interface.
Figure 71:
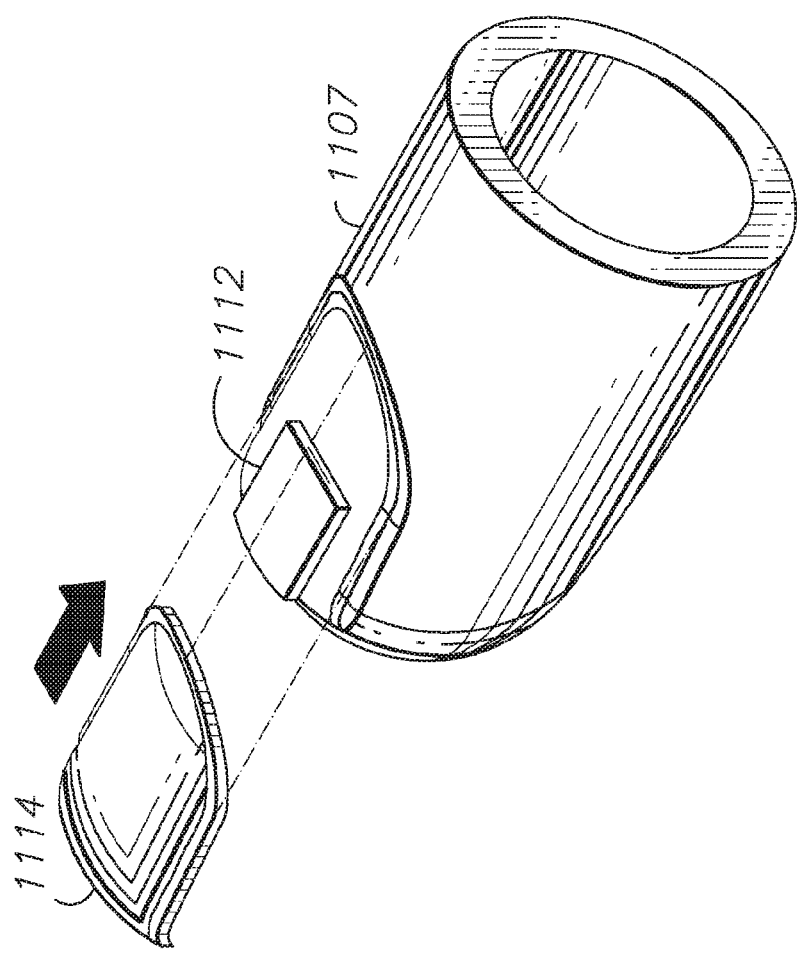
FIG. 71 shows a dorsal, proximal, exploded, perspective view of the overlay cap with a sealed filling spout.
Figure 72:
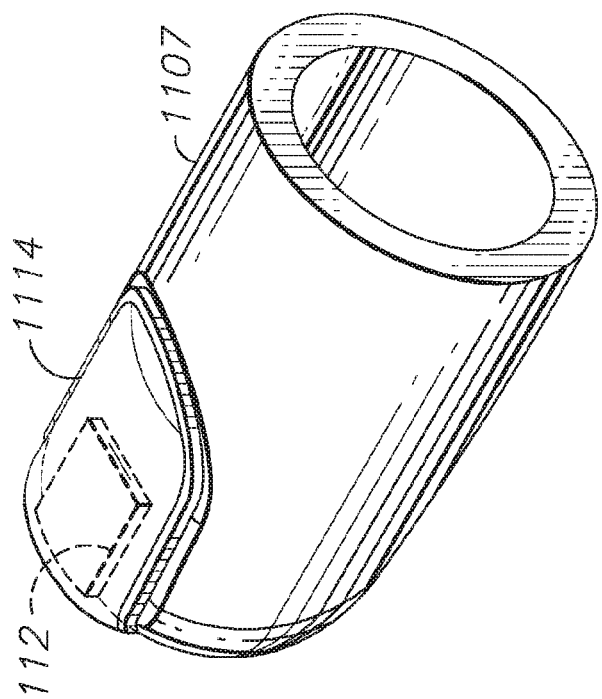
FIG. 72 shows a dorsal, proximal, perspective, assembled view of the overlay cap portion of the blood serum interface.
Figure 73:
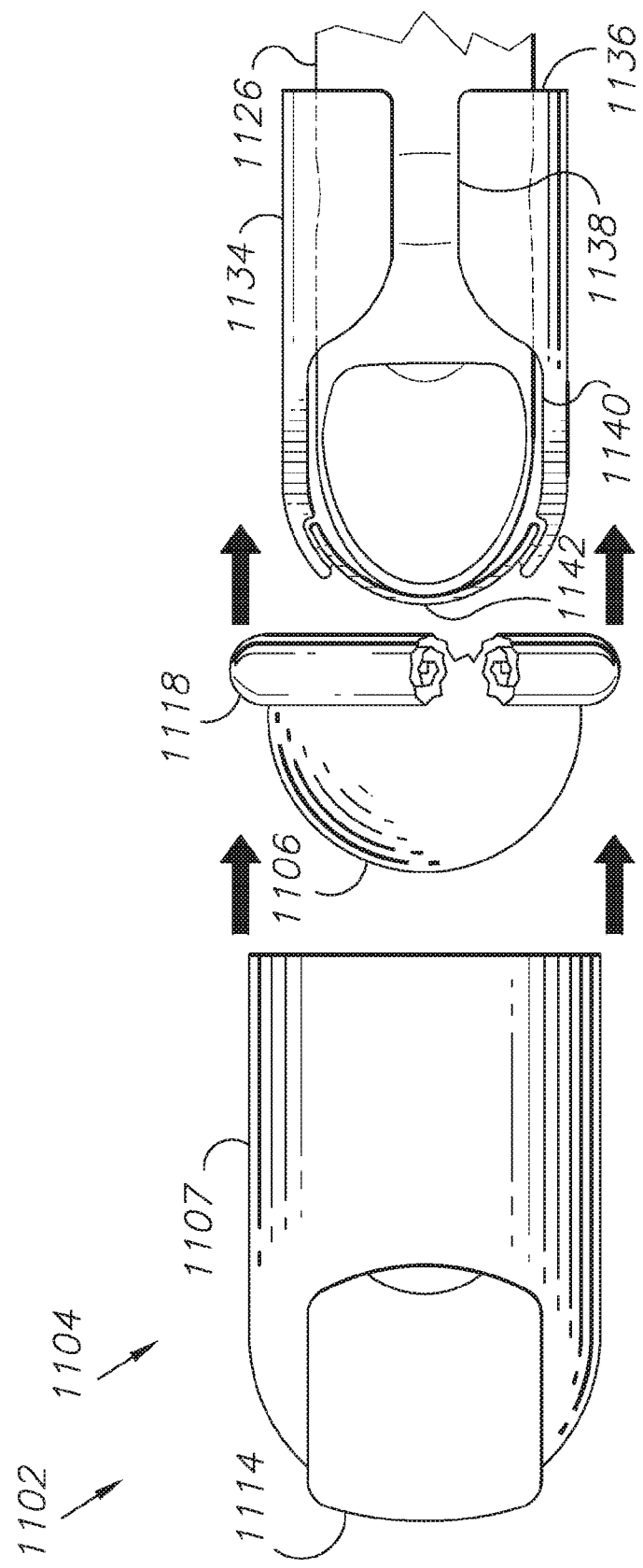
FIG. 73 shows a dorsal, plan view of the blood serum interface including a protective shield, a skin-like cover, and a blood serum overlay cap.

In production, each overlay cap 1107 is configured to include a filling spout 1112 for the fluid receptacle 1108 at the distal part of the dorsal side of the overlay cap 1107, as shown in FIGS. 69-71. The fluid receptacle 1108 of the overlay cap 1107 is configured to be filled with simulated blood serum through the filling spout 1112. After the fluid receptacle 1108 is filled, the filling spout 1112 is designed to be permanently sealed, either by crimping, vacuum sealing, or any other form of permanent sealing. After being sealed shut, the filling spout 1112 is configured to be folded over proximally and attached to the dorsal side of the overlay cap 1107 with liquid sealant or glue, as shown in FIG. 71. The overlay cap 1107 further includes a rigid simulated nail portion 1114, which is configured to be glued or sealed to over the folded filling spout 1112. The rigid simulated nail portion 1114 gives the appearance of a human fingernail and is preferably made of hard plastic. Alternatively, the rigid nail portion 1114 can be made of metal or another rigid material. The simulated nail 1114 gives the blood serum interface 1104 a further realistic appearance. The overlay cap 1107 is configured to cover the distal phalange of the underlying finger 1126, or approximately the length of a thimble.

An alternative embodiment of a blood serum overlay cap includes a proximal end fluid receptacle opening, like the proximal end reservoir opening of simulated fingers 506, 906, 956 shown in FIGS. 28-36 and 54-61, rather than a filling spout. In such an embodiment, the overlay cap fluid receptacle can be filled through the proximal end fluid receptacle opening. Once the fluid receptacle is filled with simulated blood serum, the proximal end of the overlay cap—which is made of stretchy, skin-like material—can be stretched and crimped to permanently seal the proximal end fluid receptacle opening. Alternatively, the proximal end fluid receptacle opening can be sealed via a vacuum seal or any other method of sealing.

To simulate testing blood glucose level, the protective shield 1134 is first placed over a standardized patient or mannequin's finger 1126. The skin-like cover 1106 is rolled on over the protective shield 1134. Lastly, the prefilled blood serum overlay cap 1107 is placed over the skin-like cover 1106, with the rigid nail portion 1114 above the actual nail of the underlying finger 1126. With the blood serum interface 1104 fully assembled on a standardized patient or mannequin's finger 1126, a user or trainee can puncture the overlay cap 1107 with a lancet and obtain a droplet of blood serum. A droplet of the blood serum can be extracted onto a glucometer testing strip. In an embodiment, the blood serum includes a predetermined level of glucose and is configured for use with a real glucometer. Alternatively, the blood serum can be inert and used with a simulated glucometer, as described above. After use, the prefilled blood serum overlay cap 1107 can be disposed and replaced with a new prefilled overlay cap 1107 for subsequent simulations. The blood serum interface 1104 may also be used with only the protective shield and overlay and no skin-like cover. The skin-like cover provides added realism, but the simulation can be conducted without the cover.

The glucometer training systems 402, 420, 440, 502, 602, 652, 702, 802, 902, 952, 1002, and 1102 are adapted for use with a wide variety of training protocols and procedures. Moreover, the components can be customized, e.g. with 3-D printing, for specific individuals and different digits. Still further, other training exercises and protocols within the scope of the present invention can simulate obtaining samples, e.g., fluid and tissue, for extracting medical information from real and virtual patients. Such sampling exercises can be used in conjunction with other training protocols, as described above. Moreover, fluid can be added via various connections, such as IV tubing connected to the bleb. Additionally, fluids simulating other relevant bodily fluids could be used instead of simulated blood serum for different types of medical training. Instead of using testing strips and a glucometer, droplets of blood serum could be taken in a capillary tube from the blood serum interface and brought into a lab for microchemistry and/or histology testing.

Further, the fluid and other simulation characteristics can be located at various parts of a mannequin. For example, mannequin arms, elbows, wrists, etc. can be placed within the mannequins for supplying simulated fluid. Still further, the connections can be accomplished via commonly available medical devices, including standard Leur-Lok hub connectors, IV connections, etc.

In alternative embodiments of a glucometer training system and method, the blood serum interface may be made up of a simulated limb or body part which is not an overlay designed to fit over an actual or mannequin body part. Rather, theses blood serum interfaces are lifelike replicas of body parts which can act as task trainers and/or mannequin part substitutes. Such embodiments may include, but are not limited to, a simulated whole finger, a simulated hand, a simulated forearm, a simulated infant foot, and a simulated ear. The simulated body parts are hollow and configured for housing reservoirs and tubing for holding simulated blood serum. Each simulated limb or body part includes at least one stick site for simulating obtaining a blood sample. Each simulated limb or body part embodiment also includes a pressure control system configured for controlling the application of pressure to the internal reservoir and/or tubing.

The pressure control systems in these embodiments help to facilitate effective simulations by applying more pressure when a user or trainee is sticking a stick site to obtain a simulated blood sample and releasing or decreasing pressure to the system after the sample is obtained, helping to re-seal the stick site. The pressure control system may be computerized or manually controlled by an instructor or teacher. If manual, the pressure control system may be comprised of a pressure bulb similar to that of a common blood pressure cuff and monitor or any other type of manual pressure system. For embodiments used as mannequin part substitutes, the pressure control systems include internal pressure controls configured for being adjusted by an instructor or teacher using a computer system. The computer controls may be connected to the pressure control system through the Internet, either via a wireless or hardwired connection, or through a Bluetooth connection.

Life-Pak simulation units, such as that shown in FIG. 15, can be utilized for simulation and training. Dedicated units can be labeled "Simulation Only." Other functions, such as defibrillator simulations can be provided with such units. Vital sign machines can be simulated with hydraulic models providing pulsing and respiratory simulations, all of which are variable and controllable. Beeps can be utilized to indicate pulse and other functions, including emergency "no pulse" conditions indicating emergency measures. Temperature probes and pulse-oximetry functions can be included. Simulated electronic medical records (EMRs) can be output. The systems described herein can be installed on new "OEM" mannequins, or retrofit onto existing mannequins.

It is to be understood that the invention can be embodied in various forms, and is not to be limited to the examples discussed above. Other components and configurations can be utilized in the practice of the present invention. For example, various combinations of mannequins, standardized patients, computers, outputs, signals, sensors, memories, software, inputs, and diagnostic instruments can be utilized in configuring various aspects of the system 2 comprising the present invention.

Having thus described the invention, what is claimed as new and desired to be secured by Letters Patent is:

1. A simulated human body part configured for placing on a subject and supplying a simulated body fluid sample, which body part includes: a shield configured for placing in a protective position on the subject; a bleb configured for placing on the shield and containing a quantity of simulated body fluid; said bleb for puncturing and discharging a simulated body fluid sample; and a retaining structure securing said bleb on the subject in a fixed position relative to said shield.

2. The simulated part according to claim 1, which includes:
said shield having a contoured configuration forming a receiver configured for receiving a subject finger.

3. The simulated part according to claim 2, which includes:
said bleb including inner and outer layers; and
said simulated fluid being placed between said bleb layers.

4. A fluid analysis simulation and training system comprising: an interface having a contoured surface configured for placement over a standardized patient or mannequin's finger having a contoured finger surface; wherein said interface contoured surface is configured for mating with said contoured finger surface; wherein said interface includes a simulated finger having at least one bleb configured for containing a quantity of liquid simulating a patient fluid; and an extracting instrument for puncturing and extracting said simulated body fluid from said at least one bleb.

5. The fluid analysis simulation and training system according to claim 4, further comprising: a glucometer configured for analyzing said extracted fluid; wherein said simulated body fluid is configured for simulating blood; and wherein said glucometer is configured for determining glucose levels of said simulated blood.

6. The fluid analysis simulation and training system according to claim 4, wherein said simulated finger further comprises: a fillable reservoir connected to said at least one bleb configured for being filled with said simulated body fluid; and wherein said at least one bleb is configured for being filled by applying pressure to said fillable reservoir.

7. The fluid analysis simulation and training system according to claim 6, wherein:
said interface further comprises a layer of protective material configured for protecting said standardized patient or mannequin's finger from puncture;
said simulated finger includes a proximal end reservoir opening; and
said layer of protective material includes a cap configured for fitting over, compressing, and sealing the edges of said proximal end reservoir opening.

8. The fluid analysis simulation and training system according to claim 7, wherein said layer of protective material further comprises: a flange configured for insertion inside said proximal end reservoir opening and for preventing puncture through both sides of said reservoir when said reservoir is filled with said simulated body fluid.

9. The fluid analysis simulation and training system according to claim 7, further comprising liquid sealant configured for further sealing said edges of said proximate end reservoir opening together and to said layer of protective material.

10. The fluid analysis simulation and training system according to claim 1, which includes: an output subsystem including a monitor configured for displaying a standardized patient condition.

11. A fluid analysis simulation and training method including a simulated finger having at least one bleb configured for containing a quantity of liquid simulating a patient fluid, which method comprises the steps of: filling said at least one bleb with standardized patient fluid; placing said simulated finger on a standardized patient or mannequin's finger; pricking one of said blebs with an extracting instrument; extracting a droplet of said standardized patient fluid from said pricked bleb; and a glucometer analyzing said extracted fluid.

12. The method according to claim 11, wherein said simulated finger further comprises a fillable reservoir connected to said at least one bleb, the method further comprising the steps of:
filling said fillable reservoir with standardized patient fluid; and
wherein said filling said at least one bleb with standardized patient fluid comprises applying pressure to said fillable reservoir, pushing said standardized patient fluid into said at least one bleb.

13. The method according to claim 11, wherein said simulated finger includes a proximal end reservoir opening, the method further comprising the step of:
sealing said simulated finger proximal end reservoir opening.

14. The method according to claim 13, wherein said simulated finger includes a layer of protective material configured for resisting puncture and including a proximal end cap configured for sealing said simulated finger proximal end reservoir opening, the method further comprising the steps of:
applying sealant to the edges of said simulated finger proximal end reservoir opening and said layer of protective material;
inserting said reservoir opening edges into said cap; and
said cap compressing said reservoir opening edges and sealing said reservoir opening.

15. The method according to claim 11, further comprising the steps of:
applying sealant to the outside of the puncture hole in said pricked bleb; and
allowing said sealant to dry prior to subsequent use of said simulated finger.

* * * * *